US011431370B2

(12) United States Patent
Choi et al.

(10) Patent No.: US 11,431,370 B2
(45) Date of Patent: Aug. 30, 2022

(54) VEHICLE RECEPTION APPARATUS FOR RECEIVING BROADCAST SIGNAL AND VEHICLE RECEPTION METHOD FOR RECEIVING BROADCAST SIGNAL

(71) Applicant: LG Electronics Inc., Seoul (KR)

(72) Inventors: Hyoungkyu Choi, Seoul (KR); Taekwon Kang, Seoul (KR); Hyunsang Park, Seoul (KR); Jaegu Yoon, Seoul (KR)

(73) Assignee: LG Electronics Inc., Seoul (KR)

( * ) Notice: Subject to any disclaimer, the term of this patent is extended or adjusted under 35 U.S.C. 154(b) by 112 days.

(21) Appl. No.: 16/770,247

(22) PCT Filed: Jan. 18, 2018

(86) PCT No.: PCT/KR2018/000855
§ 371 (c)(1),
(2) Date: Jun. 5, 2020

(87) PCT Pub. No.: WO2019/124626
PCT Pub. Date: Jun. 27, 2019

(65) Prior Publication Data
US 2020/0389196 A1 Dec. 10, 2020

(30) Foreign Application Priority Data
Dec. 19, 2017 (KR) ........................ 10-2017-0175127

(51) Int. Cl.
*H04B 1/16* (2006.01)
*H04W 4/40* (2018.01)
*H04H 20/53* (2008.01)

(52) U.S. Cl.
CPC ............... *H04B 1/16* (2013.01); *H04H 20/53* (2013.01); *H04W 4/40* (2018.02)

(58) Field of Classification Search
CPC .......... H04B 1/16; H04H 20/53; H04H 20/57; H04W 4/40; H04W 4/80; H04N 21/23605; H04N 21/41407; H04N 21/2343
See application file for complete search history.

(56) References Cited

U.S. PATENT DOCUMENTS 5,933,568 A * 8/1999 Higurashi ............ H04N 9/8042
386/314
7,840,077 B2 * 11/2010 Choi .................. H04N 21/2383
375/321
(Continued)

FOREIGN PATENT DOCUMENTS

CA 2818852 A1 * 10/2011 ........... H04B 7/0413
CA 2819221 A1 * 5/2012 ............. H04H 20/72
(Continued)

OTHER PUBLICATIONS

PCT International Search Report in International Application No. PCT/KR2018/000855 dated Sep. 17, 2018, 28 pages (with English translation).

*Primary Examiner* — Berhanu Tadese
(74) *Attorney, Agent, or Firm* — Fish & Richardson P.C.

(57) ABSTRACT

A vehicle reception apparatus can receive a broadcast signal through a receiver, perform data communication for receiving and displaying a broadcast service without transmission loss, and maximize memory efficiently by controlling an encoder and an interface in a vehicle. For example, the vehicle reception apparatus includes a receiver configured to receive a broadcast signal, a demodulator configured to extracting a baseband (BB) frame including service data and a BB frame size based on the received broadcast signal, an encoder configured to receive, from the demodulator, the extracted BB frame and the extracted BB frame size, and store the extracted BB frame in a buffer, and an interface
(Continued)

configured to receive, from the encoder, the stored BB frame and the BB frame size.

18 Claims, 26 Drawing Sheets

(56) References Cited

U.S. PATENT DOCUMENTS

| | | | | |
|---|---|---|---|---|
| 7,889,695 B2* | 2/2011 | Song | H04H 20/72 | 725/62 |
| 8,220,026 B2* | 7/2012 | Choi | H04H 20/57 | 725/62 |
| 8,589,772 B2* | 11/2013 | Song | H04H 20/57 | 725/62 |
| 9,854,279 B2* | 12/2017 | Petrov | H04N 21/23608 | |
| 2002/0186797 A1* | 12/2002 | Robinson | H04N 21/4382 | 714/795 |
| 2003/0188028 A1* | 10/2003 | Kawamura | H04W 28/06 | 709/249 |
| 2007/0140390 A1* | 6/2007 | Nguyen | H04N 21/42607 | 375/350 |
| 2008/0222485 A1* | 9/2008 | Cheng | H03M 13/1515 | 714/756 |
| 2009/0028331 A1* | 1/2009 | Millar | H04N 7/17318 | 380/255 |
| 2009/0052580 A1* | 2/2009 | Song | H04N 21/643 | 375/316 |
| 2009/0055875 A1* | 2/2009 | Lee | H04N 21/4345 | 725/62 |
| 2009/0059087 A1* | 3/2009 | Kim | H04L 27/02 | 375/E7.076 |
| 2009/0080573 A1* | 3/2009 | Song | H04H 20/57 | 375/321 |
| 2009/0083783 A1* | 3/2009 | Park | H04H 20/55 | 725/25 |
| 2012/0242687 A1* | 9/2012 | Choi | G09G 5/005 | 345/660 |
| 2012/0307842 A1* | 12/2012 | Petrov | H04L 49/9094 | 370/474 |
| 2013/0223328 A1* | 8/2013 | Obuchi | H04W 36/0072 | 370/315 |
| 2014/0108893 A1* | 4/2014 | Song | H03M 13/2966 | 714/776 |
| 2015/0043666 A1* | 2/2015 | Hwang | H04L 27/2602 | 375/260 |
| 2015/0049844 A1* | 2/2015 | Stott | H03M 13/2732 | 375/320 |
| 2015/0071153 A1* | 3/2015 | Hong | H04L 5/0023 | 370/312 |
| 2015/0078473 A1* | 3/2015 | Ko | H04L 1/0048 | 375/267 |
| 2015/0085951 A1* | 3/2015 | Shin | H04N 21/426 | 375/295 |
| 2015/0146802 A1* | 5/2015 | Shin | H04L 1/009 | 375/260 |
| 2015/0155967 A1* | 6/2015 | Kim | H04L 1/0058 | 375/295 |
| 2015/0163082 A1* | 6/2015 | Mun | H04L 1/0047 | 375/295 |
| 2015/0195067 A1* | 7/2015 | Kim | H04L 27/2601 | 375/295 |
| 2015/0256291 A1* | 9/2015 | Shin | H04L 1/0045 | 375/295 |
| 2015/0341054 A1* | 11/2015 | Myung | H04L 1/0057 | 714/776 |
| 2015/0349871 A1* | 12/2015 | Baek | H04L 5/0044 | 375/267 |
| 2015/0349997 A1* | 12/2015 | Baek | H04L 1/0054 | 375/267 |
| 2015/0358941 A1* | 12/2015 | Hwang | H04N 21/434 | 370/312 |
| 2015/0365204 A1* | 12/2015 | Baek | H04N 21/4382 | 375/267 |
| 2016/0037192 A1* | 2/2016 | Petrov | H04N 21/23608 | 725/116 |
| 2016/0105222 A1* | 4/2016 | Baek | H04L 27/2626 | 375/267 |
| 2016/0134454 A1* | 5/2016 | Hwang | H04N 21/23611 | 370/537 |
| 2016/0191204 A1* | 6/2016 | Kim | H04L 27/2627 | 714/776 |
| 2016/0197708 A1* | 7/2016 | Mun | H04L 5/0048 | 375/295 |
| 2016/0197757 A1* | 7/2016 | Baek | H04L 27/2613 | 375/295 |
| 2016/0198240 A1* | 7/2016 | Kim | H04L 1/0041 | 725/33 |
| 2016/0204967 A1* | 7/2016 | Choi | H03M 13/6356 | 375/340 |
| 2016/0212503 A1* | 7/2016 | Kwon | H04N 21/2381 | |
| 2016/0219312 A1* | 7/2016 | Mun | H04N 21/2389 | |
| 2016/0226687 A1* | 8/2016 | Kim | H04L 27/2656 | |
| 2016/0226939 A1* | 8/2016 | Kwak | H04L 12/1881 | |
| 2016/0234355 A1* | 8/2016 | Lee | H04L 65/4076 | |
| 2016/0234532 A1* | 8/2016 | Lee | H04N 21/64322 | |
| 2016/0241924 A1* | 8/2016 | Kwak | H04N 21/8586 | |
| 2016/0255394 A1* | 9/2016 | Yang | H04N 21/4345 | 725/131 |
| 2016/0277198 A1* | 9/2016 | Kwak | H04L 69/22 | |
| 2016/0277778 A1* | 9/2016 | Kwon | H04N 21/615 | |
| 2016/0285661 A1* | 9/2016 | Kim | H04L 5/005 | |
| 2016/0285933 A1* | 9/2016 | Lee | H04L 65/4076 | |
| 2016/0302214 A1* | 10/2016 | Yun | H04L 65/4092 | |
| 2016/0330495 A1* | 11/2016 | Kwak | H04N 21/6175 | |
| 2016/0345033 A1* | 11/2016 | Kwak | H04N 21/6106 | |
| 2016/0353136 A1* | 12/2016 | Lee | H04N 21/43 | |
| 2016/0359574 A1* | 12/2016 | Lee | H04L 65/607 | |
| 2016/0359744 A1* | 12/2016 | Kwak | H04N 21/2381 | |
| 2016/0360014 A1* | 12/2016 | Kwak | H04N 21/6112 | |
| 2016/0373489 A1* | 12/2016 | Lee | H04N 21/4345 | |
| 2016/0373807 A1* | 12/2016 | Kwak | H04N 21/482 | |
| 2017/0006070 A1* | 1/2017 | Lee | H04N 21/6125 | |
| 2017/0006355 A1* | 1/2017 | Kim | H04L 1/0057 | |
| 2017/0013026 A1* | 1/2017 | Kwak | H04L 67/16 | |
| 2017/0013028 A1* | 1/2017 | Yang | H04L 67/02 | |
| 2017/0019285 A1* | 1/2017 | Baek | H04L 1/0045 | |
| 2017/0048013 A1* | 2/2017 | Kwak | H04L 67/16 | |
| 2017/0048294 A1* | 2/2017 | Kwak | H04L 65/607 | |
| 2017/0054520 A1* | 2/2017 | Kwak | H04H 20/59 | |
| 2017/0164070 A1* | 6/2017 | Yang | H04N 21/4882 | |
| 2017/0171575 A1* | 6/2017 | Moon | H04N 21/235 | |
| 2017/0180077 A1* | 6/2017 | Kwak | H04L 1/0041 | |
| 2017/0188062 A1* | 6/2017 | Oh | H04N 21/8456 | |
| 2017/0195153 A1* | 7/2017 | Kwak | H04L 29/08 | |
| 2017/0272691 A1* | 9/2017 | Song | H04N 21/4363 | |
| 2017/0374429 A1* | 12/2017 | Yang | H04N 21/647 | |
| 2018/0063561 A1* | 3/2018 | Kwon | H04N 21/2343 | |
| 2019/0052385 A1* | 2/2019 | Poulain | H04H 20/67 | |
| 2020/0136877 A1* | 4/2020 | Kim | H04L 27/2649 | |
| 2020/0204525 A1* | 6/2020 | Shamsaasef | H04L 63/102 | |
| 2020/0389196 A1* | 12/2020 | Choi | H04B 1/16 | |

FOREIGN PATENT DOCUMENTS

| | | | | |
|---|---|---|---|---|
| CA | 2950574 A1 * | 12/2015 | | G06F 11/10 |
| JP | 2000349667 A * | 12/2000 | | |
| KR | 2003047440 A * | 6/2003 | | |
| KR | 2006078486 A * | 7/2006 | | |
| KR | 2008034647 A * | 4/2008 | | |
| KR | 2008079949 A * | 9/2008 | | |
| KR | 1020090001402 | 1/2009 | | |
| KR | 1020130119787 | 11/2013 | | |
| KR | 1020160040703 | 4/2016 | | |
| KR | 2016097032 A * | 8/2016 | | B60K 28/02 |
| WO | WO-2011096759 A2 * | 8/2011 | | H04H 20/02 |
| WO | WO-2011096760 A2 * | 8/2011 | | H04B 7/06 |
| WO | WO-2011096761 A2 * | 8/2011 | | H04B 7/0413 |
| WO | WO-2011096762 A2 * | 8/2011 | | H04H 20/33 |
| WO | WO-2011096765 A2 * | 8/2011 | | H04L 27/2613 |

(56) References Cited

FOREIGN PATENT DOCUMENTS

| WO | WO-2011096766 A2 | * | 8/2011 | ......... H04L 27/2613 |
|---|---|---|---|---|
| WO | WO-2011096767 A2 | * | 8/2011 | ......... H04L 27/2602 |
| WO | WO-2011096768 A2 | * | 8/2011 | .......... H03M 13/255 |
| WO | WO-2011096769 A2 | * | 8/2011 | ........... H04B 7/0413 |
| WO | WO-2011096772 A2 | * | 8/2011 | .......... H03M 13/255 |
| WO | WO-2011096773 A2 | * | 8/2011 | ............. H04H 20/72 |
| WO | WO-2011096774 A2 | * | 8/2011 | ............. H04H 20/72 |
| WO | WO-2011155741 A2 | * | 12/2011 | ............. H04H 20/33 |
| WO | WO-2014148785 A1 | * | 9/2014 | .......... H04H 20/423 |
| WO | WO-2014193160 A1 | * | 12/2014 | ........... H04B 7/0413 |
| WO | WO-2015160137 A1 | * | 10/2015 | ........... H04B 7/0413 |
| WO | WO-2015167186 A1 | * | 11/2015 | ............. H04N 19/30 |
| WO | WO-2016122060 A1 | * | 8/2016 | ............... H04B 7/04 |
| WO | WO-2016153117 A1 | * | 9/2016 | ........... H04L 1/0041 |
| WO | WO-2016186426 A1 | * | 11/2016 | ............. H04N 13/00 |
| WO | WO-2016200213 A1 | * | 12/2016 | ........ H04L 12/1845 |
| WO | WO-2017034258 A1 | * | 3/2017 | ........... H04B 17/103 |
| WO | WO-2017034324 A1 | * | 3/2017 | ........... H04L 5/0069 |
| WO | WO-2017043940 A1 | * | 3/2017 | ............ H04W 16/10 |
| WO | WO-2017078473 A1 | * | 5/2017 | ............. B60L 53/12 |

* cited by examiner

FIG. 1
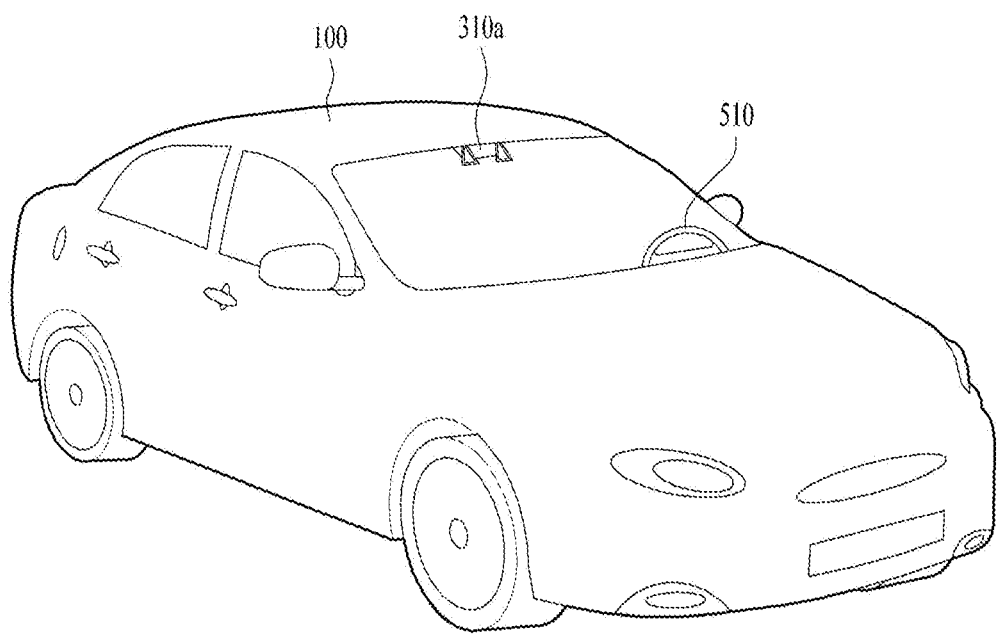
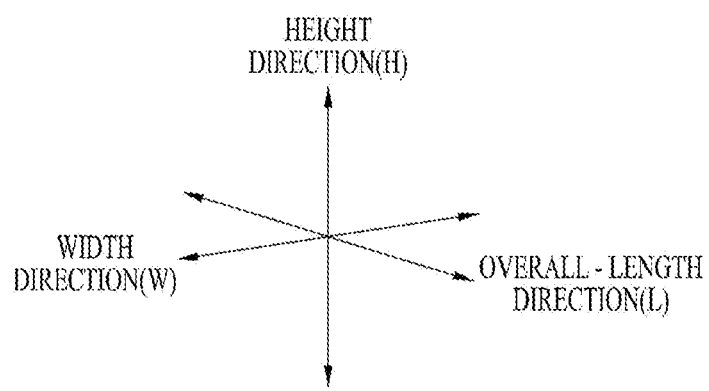

| Content | Bits |
|---|---|
| PHY_PROFILE | 3 |
| FFT_SIZE | 2 |
| GI_FRACTION | 3 |
| EAC_FLAG | 1 |
| PILOT_MODE | 1 |
| PAPR_FLAG | 1 |
| FRU_CONFIGURE | 3 |
| RESERVED | 7 |

FIG. 17

| Content | Bits |
|---|---|
| PREAMBLE_DATA | 20 |
| NUM_FRAME_FRU | 2 |
| PAYLOAD_TYPE | 3 |
| NUM_FSS | 2 |
| SYSTEM_VERSION | 8 |
| CELL_ID | 16 |
| NETWORK_ID | 16 |
| SYSTEM_ID | 16 |
| for i = 0:3 | |
|     FRU_PHY_PROFILE | 3 |
|     FRU_FRAME_LENGTH | 2 |
|     FRU_GI_FRACTION | 3 |
|     RESERVED | 4 |
| end | |
| PLS2_FEC_TYPE | 2 |
| PLS2_MOD | 3 |
| PLS2_SIZE_CELL | 15 |
| PLS2_STAT_SIZE_BIT | 14 |
| PLS2_DYN_SIZE_BIT | 14 |
| PLS2_REP_FLAG | 1 |
| PLS2_REP_SIZE_CELL | 15 |
| PLS2_NEXT_FEC_TYPE | 2 |
| PLS2_NEXT_MOD | 3 |
| PLS2_NEXT_REP_FLAG | 1 |
| PLS2_NEXT_REP_SIZE_CELL | 15 |
| PLS2_NEXT_REP_STAT_SIZE_BIT | 14 |
| PLS2_NEXT_REP_DYN_SIZE_BIT | 14 |
| PLS2_AP_MODE | 2 |
| PLS2_AP_SIZE_CELL | 15 |
| PLS2_NEXT_AP_MODE | 2 |
| PLS2_NEXT_AP_SIZE_CELL | 15 |
| RESERVED | 32 |
| CRC 32 | 32 |

FIG. 18

| Content | Bits |
|---|---|
| FIC_FLAG | 1 |
| AUX_FLAG | 1 |
| NUM_DP | 6 |
| for i = 1: NUM_DP | |
|     DP_ID | 6 |
|     DP_TYPE | 3 |
|     DP_GROUP_ID | 8 |
|     BASE_DP_ID | 6 |
|     DP_FEC_TYPE | 2 |
|     DP_COD | 4 |
|     DP_MOD | 4 |
|     DP_SSD_FLAG | 1 |
|     if PHY_PROFILE == '010' | |
|         DP_MIMO | 3 |
|     end | |
|     DP_TI_TYPE | 1 |
|     DP_TI_LENGTH | 2 |
|     DP_TI_BYPASS | 1 |
|     DP_FRAME_INTERVAL | 2 |
|     DP_FIRST_FRAME_IDX | 5 |
|     DP_NUM_BLOCK_MAX | 10 |
|     DP_PAYLOAD_TYPE | 2 |
|     DP_INBAND_MODE | 2 |
|     DP_PROTOCOL_TYPE | 2 |
|     DP_CRC_MODE | 2 |
|     if DP_PAYLOAD_TYPE == TS('00') | |
|         DNP_MODE | 2 |
|         ISSY_MODE | 2 |
|         HC_MODE_TS | 2 |
|         if HC_MODE_TS == '01' or '10' | |
|             PID | 13 |
|         end | |
|     if DP_PAYLOAD_TYPE == IP('01') | |
|         HC_MODE_IP | 2 |
|     end | |
|     RESERVED | 8 |
| end | |
| if FIC_FLAG == 1 | |
|     FIC_VERSION | 8 |
|     FIC_LENGTH_BYTE | 13 |
|     RESERVED | 8 |
| end | |
| if AUX_FLAG == 1 | |
|     NUM_AUX | 4 |
|     AUX_CONFIG_RFU | 8 |
|     for - 1: NUM_AUX | |
|         AUX_STREAM_TYPE | 4 |
|         AUX_PRIVATE_CONF | 28 |
|     end | |
| end | |

FIG. 28

| 64k | Coderate | | | BB Frame Size |
|---|---|---|---|---|
| | B | C | D | ( 64800 * B / C - D ) / 8 |
| | 2 | 15 | 192 | 1056 |
| | 3 | 15 | 192 | 1596 |
| | 4 | 15 | 192 | 2136 |
| | 5 | 15 | 192 | 2676 |
| | 6 | 15 | 192 | 3216 |
| | 7 | 15 | 192 | 3756 |
| | 8 | 15 | 192 | 4296 |
| | 9 | 15 | 192 | 4836 |
| | 10 | 15 | 192 | 5376 |
| | 11 | 15 | 192 | 5916 |
| | 12 | 15 | 192 | 6456 |
| | 13 | 15 | 192 | 6996 |

| 64k | Coderate | | | BB Frame Size |
|---|---|---|---|---|
| | B | C | D | ( 16200 * B / C - D ) / 8 |
| | 2 | 15 | 168 | 249 |
| | 3 | 15 | 168 | 384 |
| | 4 | 15 | 168 | 519 |
| | 5 | 15 | 168 | 654 |
| | 6 | 15 | 168 | 789 |
| | 7 | 15 | 168 | 924 |
| | 8 | 15 | 168 | 1059 |
| | 9 | 15 | 168 | 1194 |
| | 10 | 15 | 168 | 1329 |
| | 11 | 15 | 168 | 1464 |
| | 12 | 15 | 168 | 1599 |
| | 13 | 15 | 168 | 1734 |
| | | | GCD | 3 |

VEHICLE RECEPTION APPARATUS FOR RECEIVING BROADCAST SIGNAL AND VEHICLE RECEPTION METHOD FOR RECEIVING BROADCAST SIGNAL

CROSS-REFERENCE TO RELATED APPLICATIONS

This application is a National Stage application under 35 U.S.C. § 371 of International Application No. PCT/KR2018/000855, filed on Jan. 18, 2018, which claims the benefit of earlier filing date and right of priority to Korean Application No. 10-2017-0175127, filed on Dec. 19, 2017, the contents of which are all hereby incorporated by reference herein in their entirety.

TECHNICAL FIELD

The present disclosure relates to a vehicle reception apparatus for receiving a broadcast signal and a vehicle reception method for receiving a broadcast signal.

Specifically, the present disclosure relates to an apparatus for receiving a broadcast signal in a vehicle through a receiver configured to receive the broadcast signal, and a method for the same.

BACKGROUND

A vehicle is an apparatus that can transport a user riding therein in a desired direction. One example of the vehicle is an automobile.

In some examples, vehicles may be equipped with sensors and electronic devices to provide user convenience. For example, research has been actively conducted on an advanced driver assistance system (ADAS) to provide user convenience for various operations in driving. Further, autonomous vehicles are under active development.

In addition, the present disclosure may be applied not only to a vehicle, but also to a moving means that moves along a predetermined route rather than in a direction desired by a user, such as a subway train, an aircraft, or a ship.

Unlike the existing terrestrial broadcasting system, a future generation broadcasting system is capable of mobile reception of high-definition broadcast services. For example, in the case of an in-vehicle antenna module, a smart antenna module may be installed to allow a vehicle to receive a broadcast service. In order for the antenna module of the vehicle to receive a broadcast signal and display the same in the vehicle, broadcast service data should be transmitted from the antenna module to an in-vehicle display device. There is a need for an interface that serves as a link between the in-vehicle antenna module and the in-vehicle display device.

In addition, data loss may occur in the process of transmitting broadcast service data in the vehicle through the in-vehicle interface. For example, data loss may occur due to a difference in the amount of data processing between broadcast service data received by the vehicle and broadcast service data delivered and displayed through the in-vehicle interface.

SUMMARY

An object of the present disclosure devised to solve the problem is to control and transfer broadcast service data between an in-vehicle antenna and an in-vehicle display device without loss.

Another object of the present disclosure is to provide an interface device and method for optimizing and transmitting broadcast service data between an in-vehicle antenna and an in-vehicle display device at a data transfer rate.

Another object of the present disclosure is to provide an encoding device and method for optimizing and transmitting broadcast service data between an in-vehicle antenna and an in-vehicle display device at a data transfer rate.

It will be appreciated by persons skilled in the art that the objects that could be achieved with the present disclosure are not limited to what have been particularly described hereinabove and the above and other objects that the present disclosure could achieve will be more clearly understood from the following detailed description.

The objects of the present disclosure can be achieved by providing a vehicle reception apparatus including a receiver configured to receive a broadcast signal, a demodulator configured to extract a Forward Error Correction (FEC) frame from data in the received broadcast signal, an encoder configured to encode the FEC frame, the encoder extracting a baseband (BB) frame from the FEC frame and storing the BB frame in a buffer in the encoder, an interface configured to receive the BB frame stored in the buffer from the buffer.

In the vehicle reception apparatus according to an embodiment of the present disclosure, the encoder may include a controller configured to control a size of the buffer, wherein the interface may transfer the size of the buffer and a size of padding data to be padded to the BB frame to the controller based on the BB frame received from the buffer.

Further, in the vehicle reception apparatus according to an embodiment of the present disclosure, the interface may acquire a transmission parameter from the received broadcast signal and acquire a BB frame size from the transmission parameter.

Specific details of other embodiments are included in the detailed description and drawings.

Embodiments of the present disclosure have at least one of the following effects.

First, a vehicle reception apparatus according to an embodiment of the present disclosure may receive a future broadcast service while moving in a vehicle.

Second, a vehicle reception apparatus according to an embodiment of the present disclosure may perform data communication for receiving and displaying a future broadcast service in a vehicle without transmission loss.

Third, a vehicle reception apparatus according to an embodiment of the present disclosure may maximize memory efficiency by controlling an encoder and an interface in a vehicle in order to receive and display a future broadcast service.

The effects of the present disclosure are not limited to the effects mentioned above, and other effects not mentioned will become apparent to those skilled in the art from the claims.

BRIEF DESCRIPTION OF THE DRAWINGS

The accompanying drawings, which are included to provide further understanding of the present disclosure and are incorporated in and constitute a part of this application, represent embodiments of the present disclosure together with detailed descriptions that explain the principles of the disclosure.

FIG. 1 is a view illustrating an external appearance of an example vehicle.

FIG. 17 illustrates PLS1 data according to an embodiment of the present disclosure.

FIG. 18 illustrates PLS2 data according to an embodiment of the present disclosure.

FIG. 28 illustrates a process of acquiring a BB frame size according to an embodiment of the present disclosure.

DESCRIPTION

Figure 2:
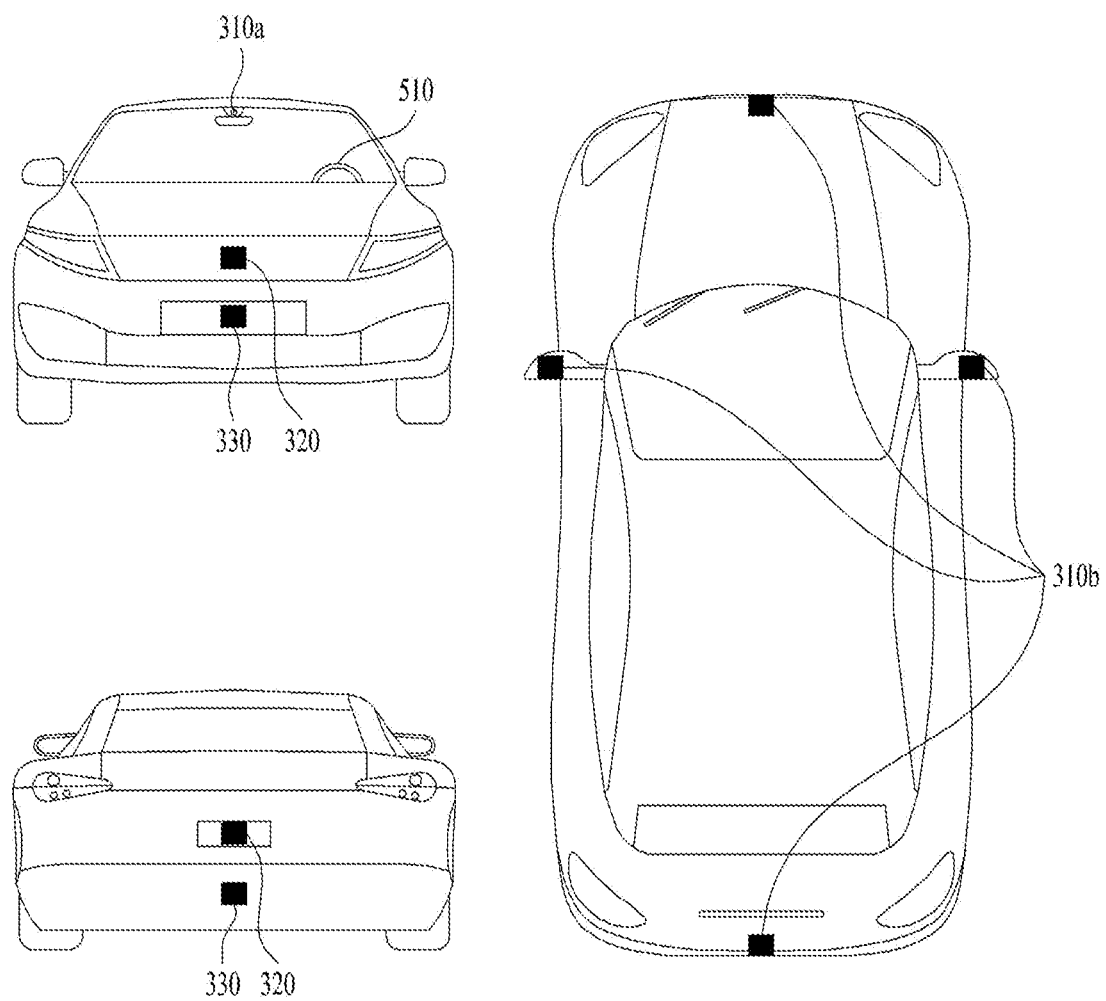
FIG. 2 shows the external appearance of the example vehicle viewed at different angles.

Hereinafter, exemplary embodiments disclosed herein will be described in detail with reference to the accompanying drawings. The same reference numbers will be used throughout the drawings to refer to the same or like parts, and redundant description thereof will be omitted. As used herein, the suffixes "module" and "unit" are added or used interchangeably to facilitate preparation of this specification and are not intended to suggest distinct meanings or functions. In the following description of the embodiments of the present disclosure, a detailed description of known technology will be omitted to avoid obscuring the subject matter of the present disclosure. The accompanying drawings are intended to facilitate understanding of the embodiments disclosed herein, and should not be construed as limiting the technical idea disclosed in the present specification. The disclosure is to cover all modifications, equivalents, and alternatives falling within the spirit and scope of the embodiments.

Terms including ordinal numbers such as first, second, etc. may be used to explain various elements. However, it will be appreciated that the elements are not limited to such terms. These terms are merely used to distinguish one element from another.

Stating that one constituent is "connected" or "linked" to another constituent should be understood as meaning that the one constituent may be directly connected or linked to the other constituent or another constituent may be interposed between the constituents. On the other hand, stating that one constituent is "directly connected" or "directly linked" to another should be understood as meaning that no other constituent is interposed between the constituents.

As used herein, the singular forms "a", "an", and "the" include plural referents unless context clearly dictates otherwise.

In this specification, terms such as "includes" or "has" are intended to indicate existence of characteristics, figures, steps, operations, constituents, components, or combinations thereof disclosed in the specification. The terms "includes" or "has" should be understood as not precluding possibility of existence or addition of one or more other characteristics, figures, steps, operations, constituents, components, or combinations thereof.

A vehicle as described in this specification may include, but not be limited to, an automobile and a motorcycle. Hereinafter, a description will be given based on an automobile.

A vehicle as described in this specification may include one or more of an internal combustion engine vehicle including an engine as a power source, a hybrid vehicle including both an engine and an electric motor as a power source, and an electric vehicle including an electric motor as a power source.

In the following description, "the left side of the vehicle" refers to the left side in the forward driving direction of the vehicle, and "the right side of the vehicle" refers to the right side in the forward driving direction of the vehicle.

FIG. 1 is a view of an example external appearance of an example vehicle.

FIG. 2 shows the external appearance of the example vehicle viewed at different angles.

Figure 3:
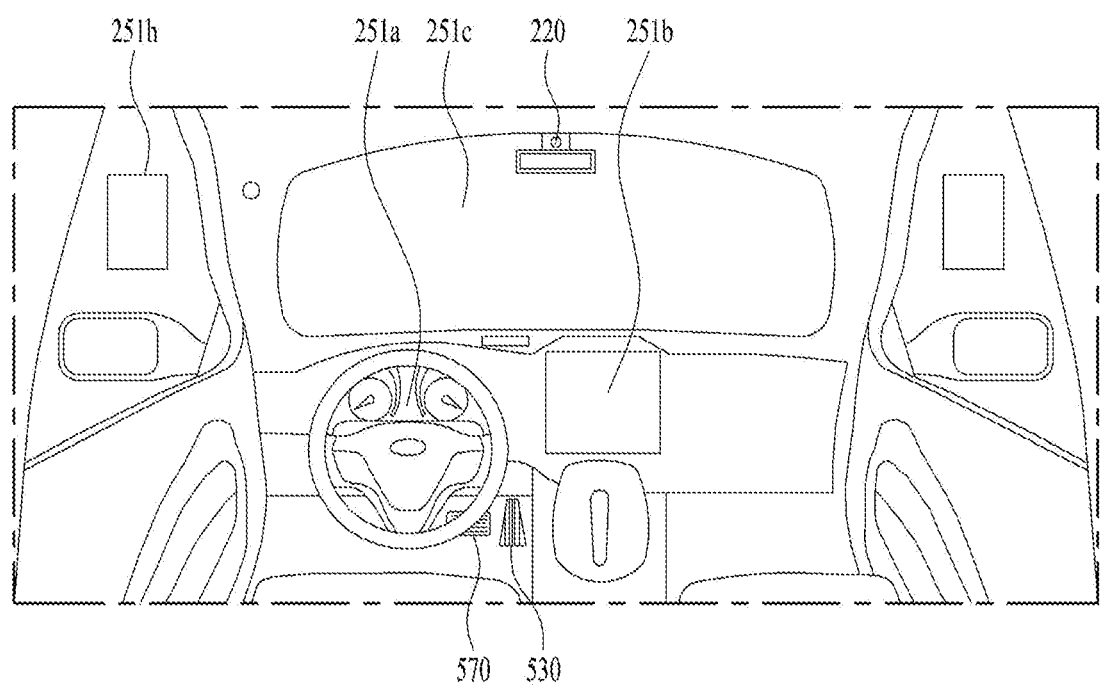
FIGS. 3 and 4 are views illustrating an example interior configuration of an example vehicle.
Figure 4:
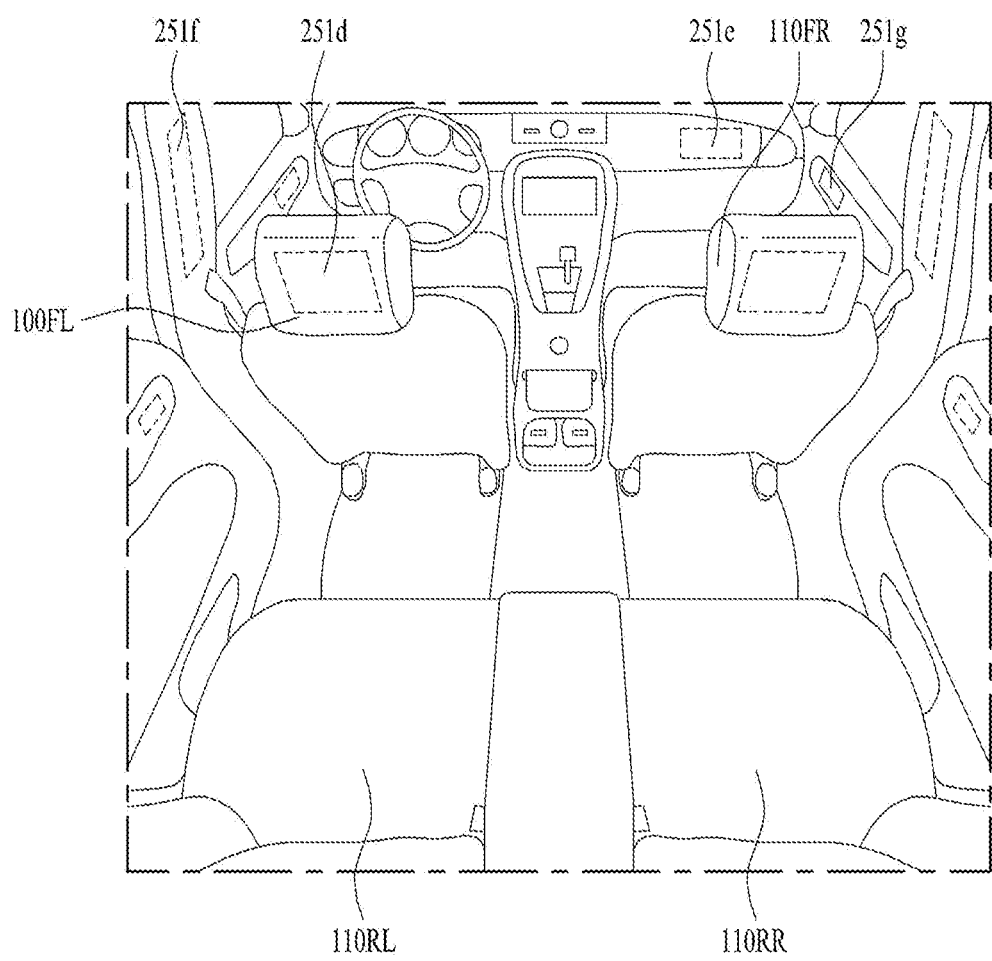

FIGS. 3 and 4 show an example internal configuration of an example vehicle.

Figure 5:
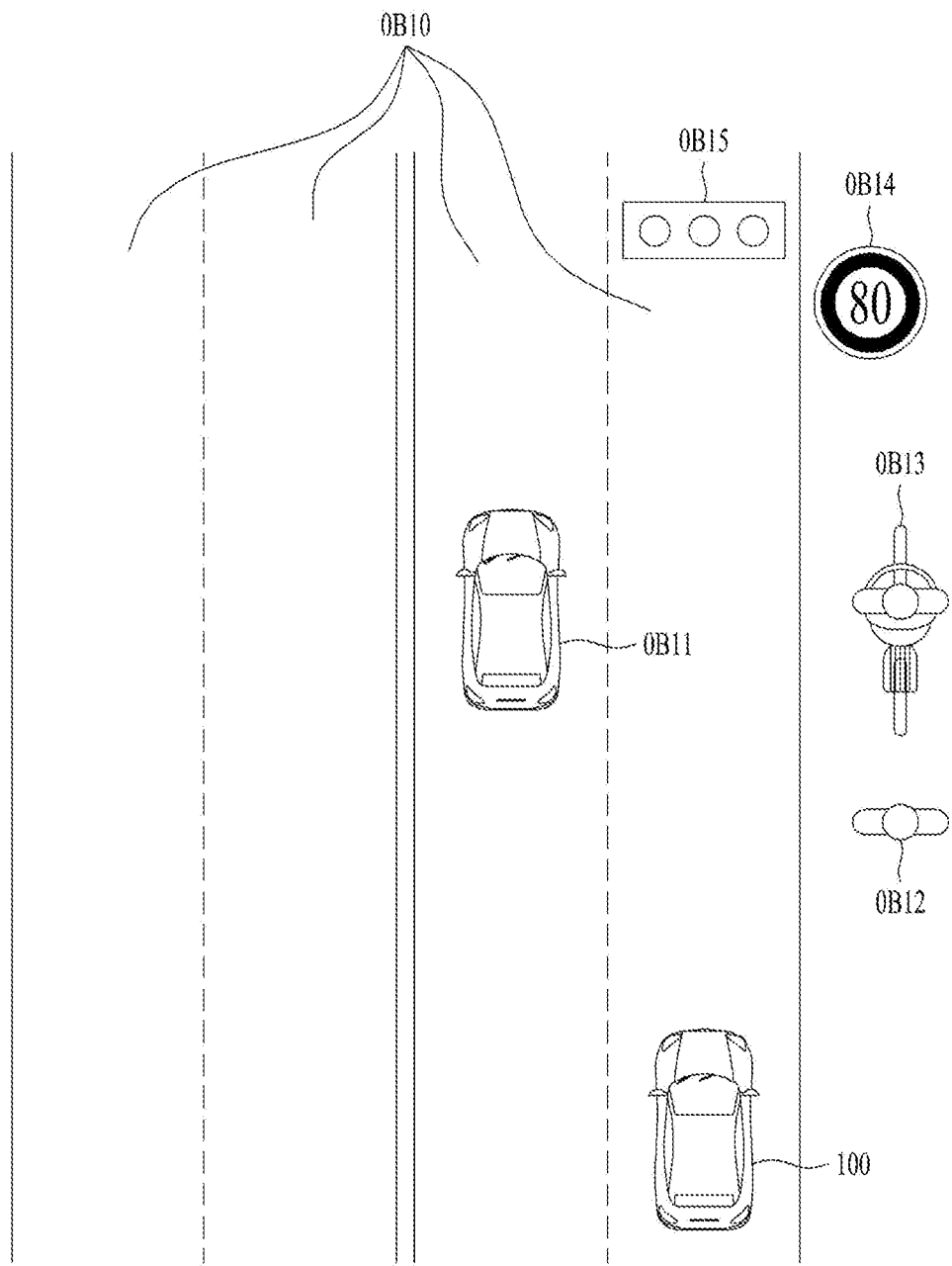
FIGS. 5 and 6 are views illustrating example objects.
Figure 6:
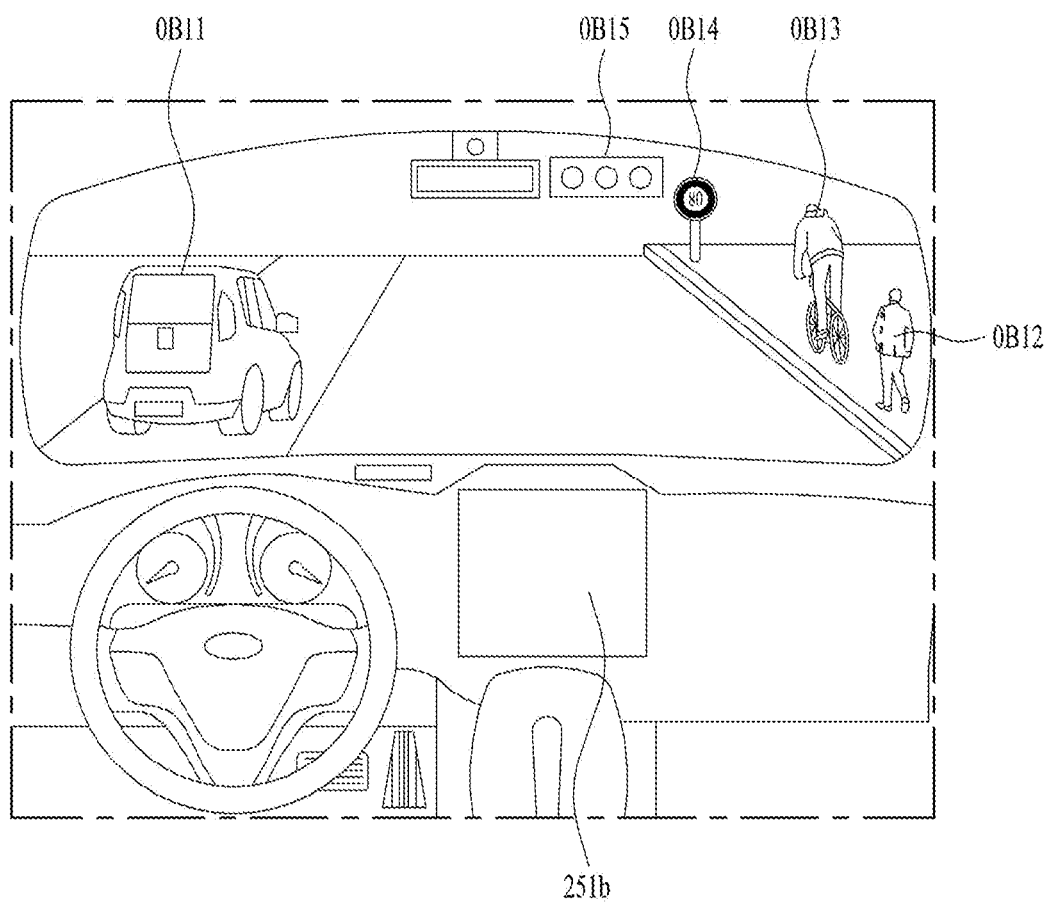

FIGS. 5 and 6 illustrate example objects.

Figure 7:
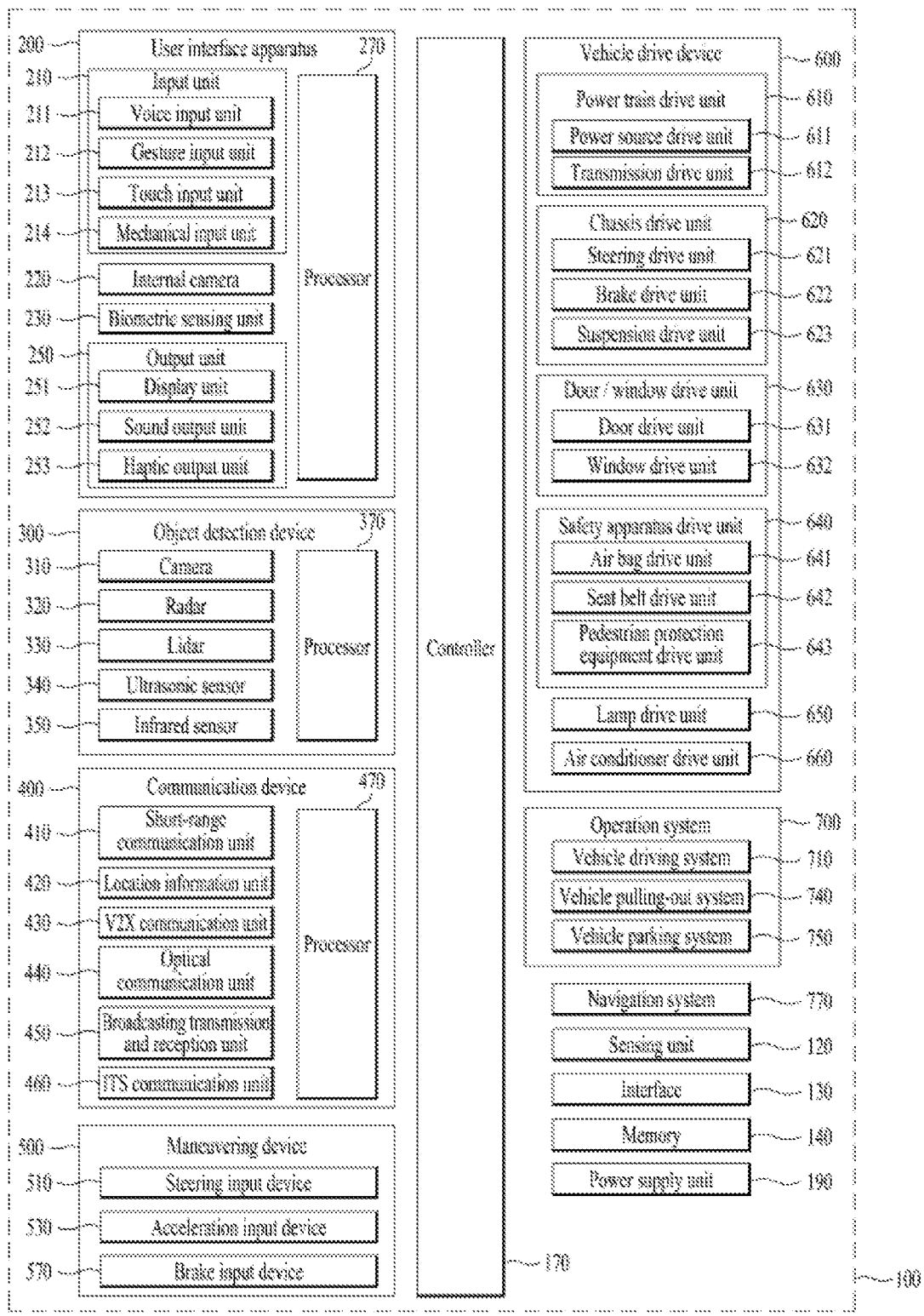
FIG. 7 is a block diagram illustrating an example vehicle.

FIG. 7 is a block diagram illustrating an example vehicle.

Referring to FIGS. 1 to 7, a vehicle 100 may include a plurality of wheels, which are rotated by a power source, and a steering input device 510 for controlling a driving direction of the vehicle 100.

The vehicle 100 may be an autonomous vehicle.

The vehicle 100 may be switched to an autonomous mode or a manual mode in response to a user input.

For example, in response to a user input received through a user interface device 200, the vehicle 100 may be switched from a manual mode to an autonomous mode, or vice versa.

The vehicle 100 may be switched to the autonomous mode or to the manual mode based on driving environment information.

The driving environment information may include at least one of the following: information on an object outside a vehicle, navigation information, or vehicle state information.

For example, the vehicle 100 may be switched from the manual mode to the autonomous mode, or vice versa, based on driving environment information generated by the object detection device 300.

In another example, the vehicle 100 may be switched from the manual mode to the autonomous mode, or vice versa, based on driving environment information received through a communication device 400.

The vehicle 100 may be switched from the manual mode to the autonomous mode, or vice versa, based on information, data, and a signal provided from an external device.

When the vehicle 100 operates in the autonomous mode, the autonomous vehicle 100 may operate based on an operation system 700.

For example, the autonomous vehicle 100 may operate based on information, data, or signals generated by a driving system 710, a vehicle pulling-out system 740, and a vehicle parking system 750.

While operating in the manual mode, the autonomous vehicle 100 may receive a user input for driving of the vehicle 100 through a maneuvering device 500. In response to the user input received through the maneuvering device 500, the vehicle 100 may operate.

As used herein, the term "overall length" is the length from the front end to the rear end of the vehicle 100, the term "overall width" is the width of the vehicle 100, and the term "overall height" is the height from the bottom of the wheel to the roof. In the following description, the term "overall length direction L" may be the reference direction for the measurement of the overall length of the vehicle 100, the term "overall width direction W" may be the reference direction for the measurement of the overall width of the vehicle 100, and the term "overall height direction H" may be the reference direction for the measurement of the overall height of the vehicle 100.

As illustrated in FIG. 7, the vehicle 100 may include the user interface device 200, the object detection device 300, the communication device 400, the maneuvering device 500, a vehicle drive device 600, the operation system 700, a navigation system 770, a sensing unit 120, an interface 130, a memory 140, a controller 170, and a power supply unit 190. The vehicle 100 may include one or more processors. In some embodiments, the individual devices such as the user interface device 200, the object detection device 300, and the communication device 400 may include one or more processors. In some embodiments, the controller 170 may include one or more processors.

In some embodiments, the vehicle 100 may further include other components in addition to the aforementioned components, or may not include some of the aforementioned components. The sensing unit 120 may sense the state of the vehicle. The sensing unit 120 may include an attitude sensor (for example, a yaw sensor, a roll sensor, or a pitch sensor), a collision sensor, a wheel sensor, a speed sensor, a gradient sensor, a weight sensor, a heading sensor, a gyro sensor, a position module, a vehicle forward/reverse movement sensor, a battery sensor, a fuel sensor, a tire sensor, a steering sensor based on the rotation of the steering wheel, an in-vehicle temperature sensor, an in-vehicle humidity sensor, an ultrasonic sensor, an illumination sensor, an accelerator pedal position sensor, and a brake pedal position sensor.

The sensing unit 120 may acquire sensing signals with regard to, for example, vehicle attitude information, vehicle collision information, vehicle driving direction information, vehicle location information (GPS information), vehicle angle information, vehicle speed information, vehicle acceleration information, vehicle tilt information, vehicle forward/reverse movement information, battery information, fuel information, tire information, vehicle lamp information, in-vehicle temperature information, in-vehicle humidity information, steering-wheel rotation angle information, outside illumination information, information about the pressure applied to an accelerator pedal, and information about the pressure applied to a brake pedal.

The sensing unit 120 may further include, for example, an accelerator pedal sensor, a pressure sensor, an engine speed sensor, an Air Flow-rate Sensor (AFS), an Air Temperature Sensor (ATS), a Water Temperature Sensor (WTS), a Throttle Position Sensor (TPS), a Top Dead Center (TDC) sensor, and a Crank Angle Sensor (CAS).

The sensing unit 120 may generate vehicle state information based on sensing data. The vehicle condition information may be information that is generated based on data sensed by a variety of sensors inside a vehicle.

For example, the vehicle state information may include vehicle position information, vehicle speed information, vehicle tilt information, vehicle weight information, vehicle direction information, vehicle battery information, vehicle fuel information, vehicle tire pressure information, vehicle steering information, in-vehicle temperature information, in-vehicle humidity information, pedal position information, vehicle engine temperature information, etc.

The interface 130 may serve as a passage for various kinds of external devices that are connected to the vehicle 100. For example, the interface 130 may have a port that is connectable to a mobile terminal and may be connected to the mobile terminal via the port. In this case, the interface 130 may exchange data with the mobile terminal.

In some embodiments, the interface 130 may serve as a passage for the supply of electrical energy to a mobile terminal connected thereto. When the mobile terminal is electrically connected to the interface 130, the interface 130 may provide electrical energy, supplied from the power supply unit 190, to the mobile terminal under control of the controller 170.

The memory 140 is electrically connected to the controller 170. The memory 140 may store basic data for each unit, control data for the operational control of each unit, and input/output data. The memory 140 may be any of various hardware storage devices, such as a ROM, a RAM, an EPROM, a flash drive, and a hard drive. The memory 140 may store various data for the overall operation of the vehicle 100, such as programs for the processing or control of the controller 170.

In some embodiments, the memory 140 may be integrally formed with the controller 170, or may be provided as an element of the controller 170.

The controller 170 may control the overall operation of each unit inside the vehicle 100. The controller 170 may be referred to as an Electronic Controller (ECU).

The power supply unit 190 may supply power required to operate each component under control of the controller 170. In particular, the power supply unit 190 may receive power from, for example, a battery inside the vehicle 100.

At least one processor and the controller 170 included in the vehicle 100 may be implemented using at least one selected from among Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, and electric units for the implementation of other functions.

Further, each of the sensing unit 120, the interface 130, the memory 140, the power supply unit 190, the user interface device 200, the object detection device 300, the communication device 400, the maneuvering device 500, the vehicle drive device 600, the operation system 700, and the navigation system 770 may have an individual processor or may be incorporated in the controller 170.

The user interface device 200 is provided to support communication between the vehicle 100 and a user. The user interface device 200 may receive a user input, and provide information generated in the vehicle 100 to the user. The vehicle 100 may enable User Interfaces (UI) or User Experience (UX) through the user interface device 200.

The user interface device 200 may include an input unit 210, an internal camera 220, a biometric sensing unit 230, an output unit 250, and a processor 270. Each component of the user interface device 200 may be separated from or integrated with the afore-described interface 130, structurally or operatively.

In some embodiments, the user interface device 200 may further include other components in addition to the aforementioned components, or may not include some of the aforementioned components.

The input unit 210 is configured to receive information from a user, and data collected in the input unit 210 may be analyzed by the processor 270 and then processed into a control command of the user.

The input unit 210 may be disposed inside the vehicle 100. For example, the input unit 210 may be disposed in a region of a steering wheel, a region of an instrument panel, a region of a seat, a region of each pillar, a region of a door, a region of a center console, a region of a head lining, a region of a sun visor, a region of a windshield, or a region of a window.

The input unit 210 may include a voice input unit 211, a gesture input unit 212, a touch input unit 213, and a mechanical input unit 214.

The voice input unit 211 may convert a voice input of a user into an electrical signal. The converted electrical signal may be provided to the processor 270 or the controller 170.

The voice input unit 211 may include one or more microphones.

The gesture input unit 212 may convert a gesture input of a user into an electrical signal. The converted electrical signal may be provided to the processor 270 or the controller 170.

The gesture input unit 212 may include at least one selected from among an infrared sensor and an image sensor for sensing a gesture input of a user.

In some embodiments, the gesture input unit 212 may sense a three-dimensional (3D) gesture input of a user. To this end, the gesture input unit 212 may include a plurality of light emitting units for outputting infrared light, or a plurality of image sensors.

The gesture input unit 212 may sense the 3D gesture input by employing a time of flight (TOF) scheme, a structured light scheme, or a disparity scheme.

The touch input unit 213 may convert a user's touch input into an electrical signal. The converted electrical signal may be provided to the processor 270 or the controller 170.

The touch input unit 213 may include a touch sensor for sensing a touch input of a user.

In some embodiments, the touch input unit 213 may be formed integral with a display unit 251 to implement a touch screen. The touch screen may provide an input interface and an output interface between the vehicle 100 and the user.

The mechanical input unit 214 may include at least one selected from among a button, a dome switch, a jog wheel, and a jog switch. An electrical signal generated by the mechanical input unit 214 may be provided to the processor 270 or the controller 170.

The mechanical input unit 214 may be located on a steering wheel, a center fascia, a center console, a cockpit module, a door, etc.

The processor 270 may start a learning mode of the vehicle 100 in response to a user input to at least one of the afore-described voice input unit 211, gesture input unit 212, touch input unit 213, or mechanical input unit 214. In the learning mode, the vehicle may learn a driving route and ambient environment of the vehicle 100. The learning mode will be described later in detail in relation to the object detection device 300 and the operation system 700.

The internal camera 220 may acquire images of the inside of the vehicle 100. The processor 270 may sense a user's condition based on the images of the inside of the vehicle 100. The processor 270 may acquire information on an eye gaze of the user. The processor 270 may sense a gesture of the user from the images of the inside of the vehicle 100.

The biometric sensing unit 230 may acquire biometric information of the user. The biometric sensing unit 230 may include a sensor for acquire biometric information of the user, and may utilize the sensor to acquire finger print information, heart rate information, etc. of the user. The biometric information may be used for user authentication.

The output unit 250 is configured to generate a visual, audio, or tactile output.

The output unit 250 may include at least one selected from among a display unit 251, a sound output unit 252, and a haptic output unit 253.

The display unit 251 may display graphic objects corresponding to various types of information.

The display unit 251 may include at least one selected from among a Liquid Crystal Display (LCD), a Thin Film Transistor-Liquid Crystal Display (TFT LCD), an Organic Light-Emitting Diode (OLED), a flexible display, a 3D display, and an e-ink display.

The display unit 251 may form an inter-layer structure together with the touch input unit 213, or may be integrally formed with the touch input unit 213 to implement a touch screen.

The display unit 251 may be implemented as a Head Up Display (HUD). When implemented as a HUD, the display unit 251 may include a projector module in order to output information through an image projected on a windshield or a window.

The display unit 251 may include a transparent display. The transparent display may be attached on the windshield or the window.

The transparent display may display a predetermined screen with a predetermined transparency. In order to achieve the transparency, the transparent display may include at least one selected from among a transparent Thin Film Electroluminescent (TFEL) display, an Organic Light Emitting Diode (OLED) display, a transparent Liquid Crystal Display (LCD), a transmissive transparent display, and a transparent Light Emitting Diode (LED) display. The transparency of the transparent display may be adjustable.

In some embodiments, the user interface device 200 may include a plurality of display units 251a to 251g.

The display unit 251 may be disposed in a region of a steering wheel, a region 251a, 251 b or 251e of an instrument panel, a region 251d of a seat, a region 251f of each pillar, a region 251g of a door, a region of a center console, a region of a head lining, a region of a sun visor, a region 251c of a windshield, or a region 251h of a window.

The sound output unit 252 converts an electrical signal from the processor 270 or the controller 170 into an audio signal, and outputs the audio signal. To this end, the sound output unit 252 may include one or more speakers.

The haptic output unit 253 generates a tactile output. For example, the haptic output unit 253 may operate to vibrate a steering wheel, a safety belt, and seats 110FL, 110FR, 110RL, and 110RR so as to allow a user to recognize the output.

The processor 270 may control the overall operation of each unit of the user interface device 200.

In some embodiments, the user interface device 200 may include a plurality of processors 270 or may not include the processor 270.

In a case where the user interface device 200 does not include the processor 270, the user interface device 200 may operate under control of the controller 170 or a processor of a different device inside the vehicle 100.

In some embodiments, the user interface device 200 may be referred to as a display device for a vehicle.

The user interface device 200 may operate under control of the controller 170.

The object detection device 300 is used to detect an object outside the vehicle 100. The object detection device 300 may generate object information based on sensing data.

The object information may include information about the presence of an object, location information of the object, information on distance between the vehicle and the object, and the speed of the object relative to the vehicle 100.

The object may include various objects related to travelling of the vehicle 100.

Referring to FIGS. 5 and 6, an object o may include a lane OB10, a nearby vehicle OB11, a pedestrian OB12, a two-wheeled vehicle OB13, a traffic signal OB14 and OB15, a light, a road, a structure, a bump, a geographical feature, an animal, etc.

The lane OB10 may be a lane in which the vehicle 100 is traveling (hereinafter, referred to as the current driving lane), a lane next to the current driving lane, and a lane in which a vehicle travelling in the opposite direction is travelling. The lane OB10 may include left and right lines that define the lane.

The nearby vehicle OB11 may be a vehicle that is travelling in the vicinity of the vehicle 100. The nearby vehicle OB11 may be a vehicle within a predetermined distance from the vehicle 100. For example, the nearby vehicle OB11 may be a vehicle that is preceding or following the vehicle 100.

The pedestrian OB12 may be a person in the vicinity of the vehicle 100. The pedestrian OB12 may be a person within a predetermined distance from the vehicle 100. For example, the pedestrian OB12 may be a person on a sidewalk or on the roadway.

The two-wheeled vehicle OB13 is a vehicle that is located in the vicinity of the vehicle 100 and moves with two wheels. The two-wheeled vehicle OB13 may be a vehicle that has two wheels within a predetermined distance from the vehicle 100. For example, the two-wheeled vehicle OB13 may be a motorcycle or a bike on a sidewalk or the roadway.

The traffic signal may include a traffic light OB15, a traffic sign plate OB14, and a pattern or text painted on a road surface.

The light may be light generated by a lamp provided in the nearby vehicle. The light may be light generated by a street light. The light may be solar light.

The road may include a road surface, a curve, and slopes, such as an upward slope and a downward slope.

The structure may be a body located around the road in the state of being fixed onto the ground. For example, the structure may include a streetlight, a roadside tree, a building, a traffic light, and a bridge.

The geographical feature may include a mountain and a hill.

In some embodiments, the object may be classified as a movable object or a stationary object. For example, the movable object may include a nearby vehicle and a pedestrian. For example, the stationary object may include a traffic signal, a road, and a structure.

The object detection device 300 may include a camera 310, a radar device 320, a lidar device 330, an ultrasonic sensor 340, an infrared sensor 350, and a processor 370. Each component of the object detection device may be separated from or integrated with the sensing unit, structurally or operatively.

In some embodiments, the object detection device 300 may further include other components in addition to the aforementioned components, or may not include some of the aforementioned components.

The camera 310 may be located at an appropriate position outside the vehicle 100 in order to acquire images of the outside of the vehicle 100. The camera 310 may be a mono camera, a stereo camera 310a, an around view monitoring (AVM) camera 310b, or a 360-degree camera.

Using various image processing algorithms, the camera 310 may acquire location information of an object, information on distance to the object, and information on speed relative to the object.

For example, based on change in size over time of an object in acquired images, the camera 310 may acquire information on distance to the object and information on speed relative to the object.

For example, the camera 310 may acquire the information on distance to the object and the information on speed relative to the object by utilizing a pin hole model or by profiling a road surface.

For example, the camera 310 may acquire the information on distance to the object and the information on the speed relative to the object, based on information on disparity of stereo images acquired by a stereo camera 310a.

For example, the camera 310 may be disposed near a front windshield in the vehicle 100 in order to acquire images of the front of the vehicle 100. Alternatively, the camera 310 may be disposed around a front bumper or a radiator grill.

In another example, the camera 310 may be disposed near a rear glass in the vehicle 100 in order to acquire images of the rear of the vehicle 100. Alternatively, the camera 310 may be disposed around a rear bumper, a trunk, or a tailgate.

In yet another example, the camera 310 may be disposed near at least one of the side windows in the vehicle 100 in order to acquire images of the side of the vehicle 100. Alternatively, the camera 310 may be disposed around a side mirror, a fender, or a door.

The camera 310 may provide an acquired image to the processor 370.

The radar 320 may include an electromagnetic wave transmission unit and an electromagnetic wave reception unit. The radar 320 may be realized as a pulse radar or a continuous wave radar depending on the principle of emission of an electronic wave. In addition, the radar 320 may be realized as a Frequency Modulated Continuous Wave (FMCW) type radar or a Frequency Shift Keying (FSK) type radar depending on the waveform of a signal.

The radar 320 may detect an object through the medium of an electromagnetic wave by employing a time of flight (TOF) scheme or a phase-shift scheme, and may detect a location of the detected object, the distance to the detected object, and the speed relative to the detected object.

The radar 320 may be located at an appropriate position outside the vehicle 100 in order to sense an object located in front of the vehicle 100, an object located to the rear of the vehicle 100, or an object located to the side of the vehicle 100.

The lidar 330 may include a laser transmission unit and a laser reception unit. The lidar 330 may be implemented by the TOF scheme or the phase-shift scheme.

The lidar 330 may be implemented as a drive type lidar or a non-drive type lidar.

When implemented as the drive type lidar, the lidar 330 may rotate by a motor and detect an object in the vicinity of the vehicle 100.

When implemented as the non-drive type lidar, the lidar 330 may utilize a light steering technique to detect an object located within a predetermined distance from the vehicle 100.

The lidar 330 may detect an object through the medium of laser light by employing the TOF scheme or the phase-shift scheme, and may detect a location of the detected object, the distance to the detected object, and the speed relative to the detected object.

The lidar 330 may be located at an appropriate position outside the vehicle 100 in order to sense an object located in front of the vehicle 100, an object located to the rear of the vehicle 100, or an object located to the side of the vehicle 100.

The ultrasonic sensor 340 may include an ultrasonic wave transmission unit and an ultrasonic wave reception unit. The ultrasonic sensor 340 may detect an object based on an ultrasonic wave, and may detect a location of the detected object, the distance to the detected object, and the speed relative to the detected object.

The ultrasonic sensor 340 may be located at an appropriate position outside the vehicle 100 in order to detect an object located in front of the vehicle 100, an object located to the rear of the vehicle 100, and an object located to the side of the vehicle 100.

The infrared sensor 350 may include an infrared light transmission unit and an infrared light reception unit. The infrared sensor 350 may detect an object based on infrared light, and may detect a location of the detected object, the distance to the detected object, and the speed relative to the detected object.

The infrared sensor 350 may be located at an appropriate position outside the vehicle 100 in order to sense an object located in front of the vehicle 100, an object located to the rear of the vehicle 100, or an object located to the side of the vehicle 100.

The processor 370 may control the overall operation of each unit of the object detection device 300.

The processor 370 may detect or classify an object by comparing data sensed by the camera 310, the radar 320, the lidar 330, the ultrasonic sensor 340, and the infrared sensor 350 with pre-stored data.

The processor 370 may detect and track an object based on acquired images. The processor 370 may, for example, calculate the distance to the object and the speed relative to the object.

For example, the processor 370 may acquire information on the distance to the object and information on the speed relative to the object based on a variation in size over time of the object in acquired images.

In another example, the processor 370 may acquire information on the distance to the object or information on the speed relative to the object by employing a pin hole model or by profiling a road surface.

In yet another example, the processor 370 may acquire information on the distance to the object and information on the speed relative to the object based on information on disparity of stereo images acquired from the stereo camera 310*a*.

The processor 370 may detect and track an object based on a reflection electromagnetic wave which is formed as a result of reflection a transmission electromagnetic wave by the object. Based on the electromagnetic wave, the processor 370 may, for example, calculate the distance to the object and the speed relative to the object.

The processor 370 may detect and track an object based on a reflection laser light which is formed as a result of reflection of transmission laser by the object. Based on the laser light, the processor 370 may, for example, calculate the distance to the object and the speed relative to the object.

The processor 370 may detect and track an object based on a reflection ultrasonic wave which is formed as a result of reflection of a transmission ultrasonic wave by the object. Based on the ultrasonic wave, the processor 370 may, for example, calculate the distance to the object and the speed relative to the object.

The processor 370 may detect and track an object based on reflection infrared light which is formed as a result of reflection of transmission infrared light by the object. Based on the infrared light, the processor 370 may, for example, calculate the distance to the object and the speed relative to the object.

As described before, once the vehicle 100 starts the learning mode in response to a user input to the input unit 210, the processor 370 may store data sensed by the camera 310, the radar 320, the lidar 330, the ultrasonic sensor 340, and the infrared sensor 350 in the memory 140.

Each step of the learning mode based on analysis of stored data, and an operating mode following the learning mode will be described later in detail in relation to the operation system 700. According to an implementation, the object detection device 300 may include a plurality of processors 370 or no processor 370. For example, the camera 310, the radar 320, the lidar 330, the ultrasonic sensor 340, and the infrared sensor 350 may include individual processors.

In a case where the object detection device 300 does not include the processor 370, the object detection device 300 may operate under control of the controller 170 or a processor inside the vehicle 100.

The object detection device 300 may operate under control of the controller 170.

The communication device 400 is configured to perform communication with an external device. Here, the external device may be a nearby vehicle, a mobile terminal, or a server.

To perform communication, the communication device 400 may include at least one selected from among a transmission antenna, a reception antenna, a Radio Frequency (RF) circuit capable of implementing various communication protocols, and an RF device.

The communication device 400 may include a short-range communication unit 410, a location information unit 420, a V2X communication unit 430, an optical communication unit 440, a broadcast transmission and reception unit 450, an Intelligent Transport Systems (ITS) communication unit 460, and a processor 470.

In some embodiments, the communication device 400 may further include other components in addition to the aforementioned components, or may not include some of the aforementioned components.

The short-range communication unit 410 is configured to perform short-range communication. The short-range communication unit 410 may support short-range communication using at least one selected from among Bluetooth™, Radio Frequency IDdentification (RFID), Infrared Data Association (IrDA), Ultra-WideBand (UWB), ZigBee, Near Field Communication (NFC), Wireless-Fidelity (Wi-Fi), Wi-Fi Direct, and Wireless USB (Wireless Universal Serial Bus).

The short-range communication unit 410 may form wireless area networks to perform short-range communication between the vehicle 100 and at least one external device.

The location information unit 420 is configured to acquire location information of the vehicle 100. For example, the location information unit 420 may include a Global Positioning System (GPS) module or a Differential Global Positioning System (DGPS) module.

The V2X communication unit 430 is configured to perform wireless communication between a vehicle and a server (that is, vehicle to infra (V2I) communication), wireless communication between a vehicle and a nearby vehicle (that is, vehicle to vehicle (V2V) communication), or wireless communication between a vehicle and a pedestrian (that is, vehicle to pedestrian (V2P) communication).

The optical communication unit 440 is configured to perform communication with an external device through the medium of light. The optical communication unit 440 may include a light emitting unit, which converts an electrical signal into an optical signal and transmits the optical signal to the outside, and a light receiving unit which converts a received optical signal into an electrical signal.

In some embodiments, the light emitting unit may be integrally formed with a lamp provided included in the vehicle 100.

The broadcast transmission and reception unit 450 is configured to receive a broadcast signal from an external broadcasting management server or transmit a broadcast signal to the broadcasting management server through a broadcasting channel. The broadcasting channel may include a satellite channel, and a terrestrial channel. The broadcast signal may include a TV broadcast signal, a radio broadcast signal, and a data broadcast signal.

The ITS communication unit 460 may exchange information, data, or signals with a traffic system. The ITS communication unit 460 may provide acquired information or data to the traffic system. The ITS communication unit 460 may receive information, data, or signals from the traffic system. For example, the ITS communication unit 460 may receive traffic information from the traffic system and provide the traffic information to the controller 170. In another example, the ITS communication unit 460 may receive a control signal from the traffic system, and provide the control signal to the controller 170 or a processor provided in the vehicle 100.

The processor 470 may control the overall operation of each unit of the communication device 400.

In some embodiments, the communication device 400 may include a plurality of processors 470, or may not include the processor 470.

In a case where the communication device 400 does not include the processor 470, the communication device 400 may operate under control of the controller 170 or a processor of a device inside of the vehicle 100.

In some embodiments, the communication device 400 may implement a vehicle display device, together with the user interface device 200. In this case, the vehicle display device may be referred to as a telematics device or an audio video navigation (AVN) device.

The communication device 400 may operate under control of the controller 170.

The maneuvering device 500 is configured to receive a user input for driving the vehicle 100.

In the manual mode, the vehicle 100 may operate based on a signal provided by the maneuvering device 500.

The maneuvering device 500 may include a steering input device 510, an acceleration input device 530, and a brake input device 570.

The steering input device 510 may receive a user input with regard to the direction of travel of the vehicle 100. The steering input device 510 may take the form of a wheel to enable a steering input through the rotation thereof. In some embodiments, the steering input device may be provided as a touchscreen, a touch pad, or a button.

The acceleration input device 530 may receive a user input for acceleration of the vehicle 100. The brake input device 570 may receive a user input for deceleration of the vehicle 100. Each of the acceleration input device 530 and the brake input device 570 may take the form of a pedal. In some embodiments, the acceleration input device or the break input device may be configured as a touch screen, a touch pad, or a button.

The maneuvering device 500 may operate under control of the controller 170.

The vehicle drive device 600 is configured to electrically control the operation of various devices of the vehicle 100.

The vehicle drive device 600 may include a power train drive unit 610, a chassis drive unit 620, a door/window drive unit 630, a safety apparatus drive unit 640, a lamp drive unit 650, and an air conditioner drive unit 660.

In some embodiments, the vehicle drive device 600 may further include other components in addition to the aforementioned components, or may not include some of the aforementioned components.

In some embodiments, the vehicle drive device 600 may include a processor. Each unit of the vehicle drive device 600 may include its own processor.

The power train drive unit 610 may control the operation of a power train.

The power train drive unit 610 may include a power source drive unit 611 and a transmission drive unit 612.

The power source drive unit 611 may control a power source of the vehicle 100.

In the case in which a fossil fuel-based engine is the power source, the power source drive unit 611 may perform electronic control of the engine. As such the power source drive unit 611 may control, for example, the output torque of the engine. The power source drive unit 611 may adjust the output toque of the engine under control of the controller 170.

In a case where an electric motor is the power source, the power source drive unit 611 may control the motor. The power train drive unit 610 may control, for example, the RPM and toque of the motor under control of the controller 170.

The transmission drive unit 612 may control a transmission.

The transmission drive unit 612 may adjust the state of the transmission. The transmission drive unit 612 may adjust a state of the transmission to a drive (D), reverse (R), neutral (N), or park (P) state.

In some embodiments, in a case where an engine is the power source, the transmission drive unit 612 may adjust a gear-engaged state to the drive position D.

The chassis drive unit 620 may control the operation of a chassis.

The chassis drive unit 620 may include a steering drive unit 621, a brake drive unit 622, and a suspension drive unit 623.

The steering drive unit 621 may perform electronic control of a steering apparatus provided inside the vehicle 100. The steering drive unit 621 may change the direction of travel of the vehicle 100.

The brake drive unit 622 may perform electronic control of a brake apparatus provided inside the vehicle 100. For example, the brake drive unit 622 may reduce the speed of the vehicle 100 by controlling the operation of a brake located at a wheel.

In some embodiments, the brake drive unit 622 may control a plurality of brakes individually. The brake drive unit 622 may apply a different degree-braking force to each wheel.

The suspension drive unit 623 may perform electronic control of a suspension apparatus inside the vehicle 100. For example, when the road surface is uneven, the suspension drive unit 623 may control the suspension apparatus so as to reduce the vibration of the vehicle 100.

In some embodiments, the suspension drive unit 623 may control a plurality of suspensions individually.

The door/window drive unit 630 may perform electronic control of a door apparatus or a window apparatus inside the vehicle 100.

The door/window drive unit 630 may include a door drive unit 631 and a window drive unit 632.

The door drive unit 631 may control the door apparatus. The door drive unit 631 may control opening or closing of a plurality of doors included in the vehicle 100. The door drive unit 631 may control opening or closing of a trunk or a tail gate. The door drive unit 631 may control opening or closing of a sunroof.

The window drive unit 632 may perform electronic control of the window apparatus. The window drive unit 632 may control opening or closing of a plurality of windows included in the vehicle 100.

The safety apparatus drive unit 640 may perform electronic control of various safety apparatuses provided inside the vehicle 100.

The safety apparatus drive unit 640 may include an airbag drive unit 641, a safety belt drive unit 642, and a pedestrian protection equipment drive unit 643.

The airbag drive unit 641 may perform electronic control of an airbag apparatus inside the vehicle 100. For example, upon detection of a dangerous situation, the airbag drive unit 641 may control an airbag to be deployed.

The safety belt drive unit 642 may perform electronic control of a seatbelt apparatus inside the vehicle 100. For example, upon detection of a dangerous situation, the safety belt drive unit 642 may control passengers to be fixed onto seats 110FL, 110FR, 110RL, and 110RR with safety belts.

The pedestrian protection equipment drive unit 643 may perform electronic control of a hood lift and a pedestrian airbag. For example, upon detection of a collision with a pedestrian, the pedestrian protection equipment drive unit 643 may control a hood lift and a pedestrian airbag to be deployed.

The lamp drive unit 650 may perform electronic control of various lamp apparatuses provided inside the vehicle 100.

The air conditioner drive unit 660 may perform electronic control of an air conditioner inside the vehicle 100. For example, when the inner temperature of the vehicle 100 is high, an air conditioner drive unit 660 may operate the air conditioner so as to supply cool air to the inside of the vehicle 100.

The vehicle drive device 600 may include a processor. Each unit of the vehicle drive device 600 may include its own processor.

The vehicle drive device 600 may operate under control of the controller 170.

The operation system 700 is a system for controlling the overall driving operation of the vehicle 100. The operation system 700 may operate in the autonomous driving mode.

The operation system 700 may include the driving system 710, the vehicle pulling-out system 740, and the vehicle parking system 750.

In some embodiments, the operation system 700 may further include other components in addition to the aforementioned components, or may not include some of the aforementioned component.

In some embodiments, the operation system 700 may include a processor. Each unit of the operation system 700 may include its own processor.

In some embodiments, the operation system 700 may control driving in the autonomous mode based on learning. In this case, the learning mode and an operating mode based on the premise of completion of learning may be performed. A description will be given below of a method of executing the learning mode and the operating mode by the processor of the operation system 700.

The learning mode may be performed in the aforedescribed manual mode. In the learning mode, the processor of the operation system 700 may learn a driving route and ambient environment of the vehicle 100.

The learning of the driving route may include generating map data for a route in which the vehicle 100 drives. Particularly, the processor of the operation system 700 may generate map data based on information detected through the object detection device 300 during driving from a departure to a destination.

The learning of the ambient environment may include storing and analyzing information about an ambient environment of the vehicle 100 during driving and parking. Particularly, the processor of the operation system 700 may store and analyze the information about the ambient environment of the vehicle based on information detected through the object detection device 300 during parking of the vehicle 100, for example, information about a location, size, and a fixed (or mobile) obstacle of a parking space.

The operating mode may be performed in the aforedescribed autonomous mode. The operating mode will be described based on the premise that the driving route or the ambient environment has been learned in the learning mode.

The operating mode may be performed in response to a user input through the input unit 210, or when the vehicle 100 reaches the learned driving route and parking space, the operating mode may be performed automatically.

The operating mode may include a semi-autonomous operating mode requiring some user's manipulations of the maneuvering device 500, and a full autonomous operating mode requiring no user's manipulation of the maneuvering device 500.

In some embodiments, the processor of the operation system 700 may drive the vehicle 100 along the learned driving route by controlling the driving system 710 in the operating mode.

In some embodiments, the processor of the operation system 700 may pull out the vehicle 100 from the learned parking space by controlling the vehicle pulling-out system 740 in the operating mode.

In some embodiments, the processor of the operation system 700 may park the vehicle 100 in the learned parking space by controlling the vehicle parking system 750 in the operating mode. In some embodiments, in a case where the operation system 700 is implemented as software, the operation system 700 may be a subordinate concept of the controller 170.

In some embodiments, the operation system 700 may be a concept including at least one selected from among the user interface device 200, the object detection device 300, the communication device 400, the vehicle drive device 600, and the controller 170.

The driving system 710 may perform driving of the vehicle 100.

The driving system 710 may perform driving of the vehicle 100 by providing a control signal to the vehicle drive device 600 in response to reception of navigation information from the navigation system 770.

The driving system 710 may perform driving of the vehicle 100 by providing a control signal to the vehicle drive device 600 in response to reception of object information from the object detection device 300.

The driving system 710 may perform driving of the vehicle 100 by providing a control signal to the vehicle drive device 600 in response to reception of a signal from an external device through the communication device 400.

In some embodiments, the driving system 710 may be a system that drives the vehicle 100, including at least one of the user interface device 200, the object detection device 300, the communication device 400, the maneuvering device 500, the vehicle drive device 600, the navigation system 770, the sensing unit 120, or the controller 170.

The driving system 710 may be referred to as a vehicle driving control device.

The vehicle pulling-out system 740 may perform an operation of pulling the vehicle 100 out of a parking space.

The vehicle pulling-out system 740 may perform an operation of pulling the vehicle 100 out of a parking space, by providing a control signal to the vehicle drive device 600 in response to reception of navigation information from the navigation system 770.

The vehicle pulling-out system 740 may perform an operation of pulling the vehicle 100 out of a parking space, by providing a control signal to the vehicle drive device 600 in response to reception of object information from the object detection device 300.

The vehicle pulling-out system 740 may perform an operation of pulling the vehicle 100 out of a parking space, by providing a control signal to the vehicle drive device 600 in response to reception of a signal from an external device.

In some embodiments, the vehicle pulling-out system 740 may be a system that performs pulling-out of the vehicle 100, including at least one of the user interface device 200, the object detection device 300, the communication device 400, the maneuvering device 500, the vehicle drive device 600, the navigation system 770, the sensing unit 120, or the controller 170.

The vehicle pulling-out system 740 may be referred to as a vehicle pulling-out control device.

The vehicle parking system 750 may perform an operation of parking the vehicle 100 in a parking space.

The vehicle parking system 750 may perform an operation of parking the vehicle 100 in a parking space, by providing a control signal to the vehicle drive device 600 in response to reception of navigation information from the navigation system 770.

The vehicle parking system 750 may perform an operation of parking the vehicle 100 in a parking space, by providing a control signal to the vehicle drive device 600 in response to reception of object information from the object detection device 300.

The vehicle parking system 750 may perform an operation of parking the vehicle 100 in a parking space, by providing a control signal to the vehicle drive device 600 in response to reception of a signal from an external device.

In some embodiments, the vehicle parking system 750 may be a system that performs parking of the vehicle 100, including at least one of the user interface device 200, the object detection device 300, the communication device 400, the maneuvering device 500, the vehicle drive device 600, the navigation system 770, the sensing unit 120, or the controller 170.

The vehicle parking system 750 may be referred to as a vehicle parking control device.

The navigation system 770 may provide navigation information. The navigation information may include at least one selected from among map information, information on a set destination, information on a route to the set destination, information on various objects along the route, lane information, and information on a current location of the vehicle.

The navigation system 770 may include a memory and a processor. The memory may store navigation information. The processor may control the operation of the navigation system 770.

In some embodiments, the navigation system 770 may update pre-stored information by receiving information from an external device through the communication device 400.

In some embodiments, the navigation system 770 may be classified as an element of the user interface device 200.

The present disclosure provides apparatuses and methods for transmitting and receiving broadcast signals for future broadcast services. Future broadcast services according to an embodiment of the present disclosure include a terrestrial broadcast service, a mobile broadcast service, a UHDTV service, etc. The present disclosure may process broadcast signals for the future broadcast services through non-MIMO (Multiple Input Multiple Output) or MIMO according to one embodiment. A non-MIMO scheme according to an embodiment of the present disclosure may include a MISO (Multiple Input Single Output) scheme, a SISO (Single Input Single Output) scheme, etc.

While MISO or MIMO uses two antennas in the following for convenience of description, the present disclosure is applicable to systems using two or more antennas. The present disclosure may define three physical (PHY) profiles (base, handheld and advanced profiles) each optimized to minimize receiver complexity while attaining the performance required for a particular use case. The PHY profiles are subsets of all configurations that a corresponding receiver should implement.

The three PHY profiles share most of the functional blocks but differ slightly in specific blocks and/or parameters. Additional PHY profiles may be defined in the future. For the system evolution, future profiles may also be multiplexed with the existing profiles in a single RF channel through a future extension frame (FEF). The details of each PHY profile are described below.

1. Base Profile

The base profile represents a main use case for fixed receiving devices that are usually connected to a roof-top antenna. The base profile also includes portable devices that could be transported to a place but belong to a relatively stationary reception category. Use of the base profile could be extended to handheld devices or even vehicular by some improved implementations, but those use cases are not expected for the base profile receiver operation.

Target SNR range of reception is from approximately 10 to 20 dB, which includes the 15 dB SNR reception capability of the existing broadcast system (e.g. ATSC A/53). The receiver complexity and power consumption is not as critical as in the battery-operated handheld devices, which will use the handheld profile. Key system parameters for the base profile are listed in Table 1 below.

TABLE 1

| | |
|---|---|
| LDPC codeword length | 16K, 64K bits |
| Constellation size | 4~10 bpcu (bits per channel use) |
| Time de-interleaving memory size | $\leq 2^{19}$ data cells |
| Pilot patterns | Pilot pattern for fixed reception |
| FFT size | 16K, 32K points |

2. Handheld Profile

The handheld profile is designed for use in handheld and vehicular devices that operate with battery power. The devices may be moving with pedestrian or vehicle speed. The power consumption as well as the receiver complexity is very important for the implementation of the devices of the handheld profile. The target SNR range of the handheld profile is approximately 0 to 10 dB, but may be configured to reach below 0 dB when intended for deeper indoor reception.

In addition to low SNR capability, resilience to the Doppler Effect caused by receiver mobility is the most important performance attribute of the handheld profile. Key system parameters for the handheld profile are listed in Table 2 below.

TABLE 2

| | |
|---|---|
| LDPC codeword length | 16K bits |
| Constellation size | 2~8 bpcu |
| Time de-interleaving memory size | $\leq 2^{18}$ data cells |
| Pilot patterns | Pilot pattern for mobile and indoor reception |
| FFT size | 8K, 16K points |

3. Advanced Profile

The advanced profile provides highest channel capacity at the cost of more implementation complexity. This profile requires using MIMO transmission and reception, and UHDTV service is a target use case for which this profile is specifically designed. The increased capacity may also be used to allow an increased number of services in a given bandwidth, e.g., multiple SDTV or HDTV services.

The target SNR range of the advanced profile is approximately 20 to 30 dB. MIMO transmission may initially use existing elliptically-polarized transmission equipment, with extension to full-power cross-polarized transmission in the future. Key system parameters for the advanced profile are listed in Table 3 below.

TABLE 3

| | |
|---|---|
| LDPC codeword length | 16K, 64K bits |
| Constellation size | 8~12 bpcu |
| Time de-interleaving memory size | $\leq 2^{19}$ data-cells |
| Pilot patterns | Pilot patterns for fixed reception |
| FFT size | 16K, 32K points |

In this case, the base profile may be used as a profile for both the terrestrial broadcast service and the mobile broadcast service. That is, the base profile may be used to define a concept of a profile which includes the mobile profile. Also, the advanced profile may be divided advanced profile for a base profile with MIMO and advanced profile for a handheld profile with MIMO. Moreover, the three profiles may be changed according to intention of the designer.

The following terms and definitions may apply to the present disclosure. The following terms and definitions may be changed according to design.

Auxiliary stream: sequence of cells carrying data of as yet undefined modulation and coding, which may be used for future extensions or as required by broadcasters or network operators Base data pipe: data pipe that carries service signaling data Baseband frame (or BBFRAME): set of Kbch bits which form the input to one FEC encoding process (BCH and LDPC encoding)

Cell: modulation value that is carried by one carrier of the OFDM transmission

Coded block: LDPC-encoded block of PLS1 data or one of the LDPC-encoded blocks of PLS2 data Data pipe: logical channel in the physical layer that carries service data or related metadata, which may carry one or multiple service(s) or service component(s).

Data pipe unit: a basic unit for allocating data cells to a DP in a frame.

Data symbol: OFDM symbol in a frame which is not a preamble symbol (the frame signaling symbol and frame edge symbol is included in the data symbol)

DP_ID: this 8-bit field identifies uniquely a DP within the system identified by the SYSTEM_ID Dummy cell: cell carrying a pseudo-random value used to fill the remaining capacity not used for PLS signaling, DPs or auxiliary streams Emergency alert channel: part of a frame that carries EAS information data Frame: physical layer time slot that starts with a preamble and ends with a frame edge symbol Frame repetition unit: a set of frames belonging to same or different physical layer profile including a FEF, which is repeated eight times in a super-frame Fast information channel: a logical channel in a frame that carries the mapping information between a service and the corresponding base DP FECBLOCK: set of LDPC-encoded bits of a DP data FFT size: nominal FFT size used for a particular mode, equal to the active symbol period Ts expressed in cycles of the elementary period T Frame signaling symbol: OFDM symbol with higher pilot density used at the start of a frame in certain combinations of FFT size, guard interval and scattered pilot pattern, which carries a part of the PLS data Frame edge symbol: OFDM symbol with higher pilot density used at the end of a frame in certain combinations of FFT size, guard interval and scattered pilot pattern Frame-group: the set of all the frames having the same PHY profile type in a super-frame.

Future extension frame: physical layer time slot within the super-frame that could be used for future extension, which starts with a preamble Futurecast UTB system: proposed physical layer broadcasting system, of which the input is one or more MPEG2-TS or IP or general stream(s) and of which the output is an RF signal Input stream: A stream of data for an ensemble of services delivered to the end users by the system.

Normal data symbol: data symbol excluding the frame signaling symbol and the frame edge symbol PHY profile: subset of all configurations that a corresponding receiver should implement PLS: physical layer signaling data consisting of PLS1 and PLS2

PLS1: a first set of PLS data carried in the FSS symbols having a fixed size, coding and modulation, which carries basic information about the system as well as the parameters needed to decode the PLS2

NOTE: PLS1 data remains constant for the duration of a frame-group.

PLS2: a second set of PLS data transmitted in the FSS symbol, which carries more detailed PLS data about the system and the DPs PLS2 dynamic data: PLS2 data that may dynamically change frame-by-frame PLS2 static data: PLS2 data that remains static for the duration of a frame-group Preamble signaling data: signaling data carried by the preamble symbol and used to identify the basic mode of the system Preamble symbol: fixed-length pilot symbol that carries basic PLS data and is located in the beginning of a frame NOTE: The preamble symbol is mainly used for fast initial band scan to detect the system signal, its timing, frequency offset, and FFT-size.

Reserved for future use: not defined by the present document but may be defined in future Super-frame: set of eight frame repetition units Time interleaving block (TI block): set of cells within which time interleaving is carried out, corresponding to one use of the time interleaver memory TI group: unit over which dynamic capacity allocation for a particular DP is carried out, made up of an integer, dynamically varying number of XFECBLOCKs NOTE: The TI group may be mapped directly to one frame or may be mapped to multiple frames. It may contain one or more TI blocks.

Type 1 DP: DP of a frame where all DPs are mapped into the frame in TDM fashion

Type 2 DP: DP of a frame where all DPs are mapped into the frame in FDM fashion

XFECBLOCK: set of $N_{cells}$ cells carrying all the bits of one LDPC FECBLOCK

Figure 8:
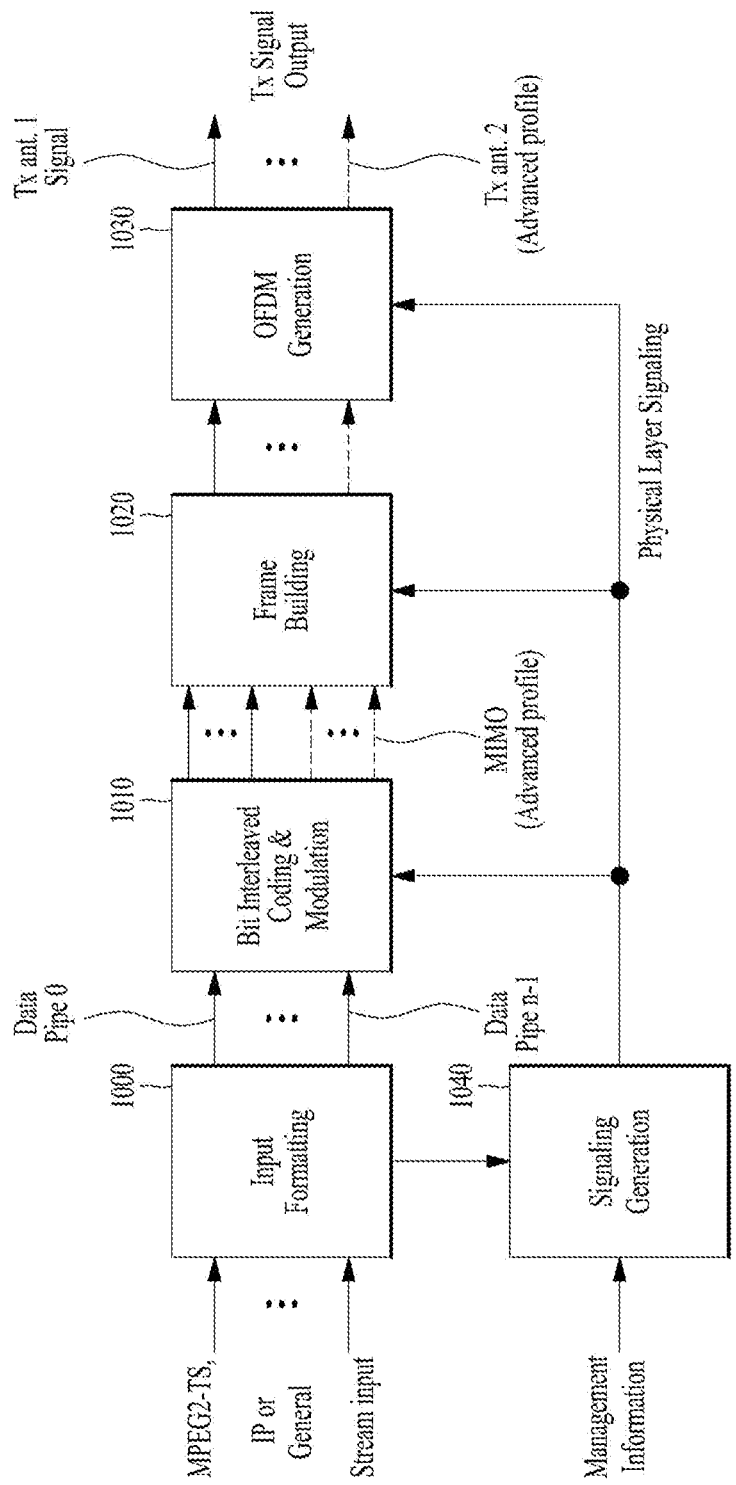
FIG. 8 illustrates a structure of a broadcast signal transmission transmitting for future broadcast services according to an embodiment of the present disclosure.

FIG. 8 illustrates a structure of a broadcast signal transmission transmitting for future broadcast services according to an embodiment of the present disclosure.

The apparatus for transmitting broadcast signals for future broadcast services according to an embodiment of the present disclosure may include an input formatting block 1000, a BICM (Bit interleaved coding & modulation) block 1010, a frame building block 1020, an OFDM (Orthogonal Frequency Division Multiplexing) generation block 1030 and a signaling generation block 1040. A description will be given of the operation of each module of the apparatus for transmitting broadcast signals.

IP stream/packets and MPEG2-TS are the main input formats, other stream types are handled as General Streams. In addition to these data inputs, Management Information is input to control the scheduling and allocation of the corresponding bandwidth for each input stream. One or multiple TS stream(s), IP stream(s) and/or General Stream(s) inputs are simultaneously allowed.

The input formatting block 1000 may demultiplex each input stream into one or multiple data pipe(s), to each of which an independent coding and modulation is applied. The data pipe (DP) is the basic unit for robustness control, thereby affecting quality-of-service (QoS). One or multiple service(s) or service component(s) may be carried by a single DP. Details of operations of the input formatting block 1000 will be described later.

The data pipe is a logical channel in the physical layer that carries service data or related metadata, which may carry one or multiple service(s) or service component(s).

Also, the data pipe unit: a basic unit for allocating data cells to a DP in a frame.

In the BICM block 1010, parity data is added for error correction and the encoded bit streams are mapped to complex-value constellation symbols. The symbols are interleaved across a specific interleaving depth that is used for the corresponding DP. For the advanced profile, MIMO encoding is performed in the BICM block 1010 and the additional data path is added at the output for MIMO transmission. Details of operations of the BICM block 1010 will be described later.

The Frame Building block 1020 may map the data cells of the input DPs into the OFDM symbols within a frame. After mapping, the frequency interleaving is used for frequency-domain diversity, especially to combat frequency-selective fading channels. Details of operations of the Frame Building block 1020 will be described later.

After inserting a preamble at the beginning of each frame, the OFDM Generation block 1030 may apply conventional OFDM modulation having a cyclic prefix as guard interval. For antenna space diversity, a distributed MISO scheme is applied across the transmitters. In addition, a Peak-to-Average Power Reduction (PAPR) scheme is performed in the time domain. For flexible network planning, this proposal provides a set of various FFT sizes, guard interval lengths and corresponding pilot patterns. Details of operations of the OFDM Generation block 1030 will be described later.

The Signaling Generation block 1040 may create physical layer signaling information used for the operation of each functional block. This signaling information is also transmitted so that the services of interest are properly recovered at the receiver side. Details of operations of the Signaling Generation block 1040 will be described later.

Figure 9:
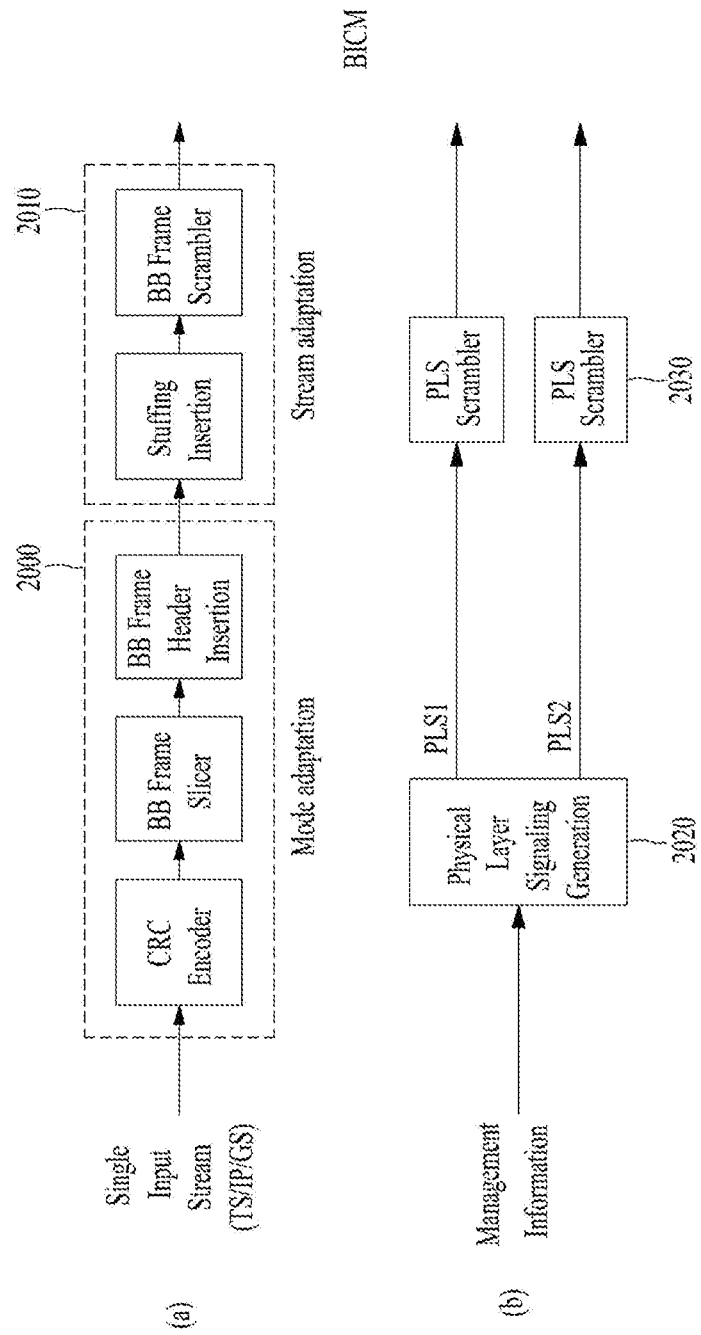
FIG. 9 illustrates an input formatting block according to an embodiment of the present disclosure.

FIG. 9 illustrates an input formatting block according to one embodiment of the present disclosure. FIG. 9 shows an input formatting module when the input signal is a single input stream.

The input formatting block illustrated in FIG. 9 corresponds to an embodiment of the input formatting block 1000 described with reference to FIG. 8.

The input to the physical layer may be composed of one or multiple data streams. Each data stream is carried by one DP. The mode adaptation modules slice the incoming data stream into data fields of the baseband frame (BBF). The system supports three types of input data streams: MPEG2-TS, Internet protocol (IP) and Generic stream (GS). MPEG2-TS is characterized by fixed length (188 byte) packets with the first byte being a sync-byte (0x47). An IP stream is composed of variable length IP datagram packets, as signaled within IP packet headers. The system supports both IPv4 and IPv6 for the IP stream. GS may be composed of variable length packets or constant length packets, signaled within encapsulation packet headers.

(a) shows a mode adaptation block 2000 and a stream adaptation 2010 for signal DP and (b) shows a PLS generation block 2020 and a PLS scrambler 2030 for generating and processing PLS data. A description will be given of the operation of each block.

The Input Stream Splitter splits the input TS, IP, GS streams into multiple service or service component (audio, video, etc.) streams. The mode adaptation module 2010 includes a CRC Encoder, BB (baseband) frame slicer, and BB Frame Header Insertion block.

The CRC Encoder provides three kinds of CRC encoding for error detection at the user packet (UP) level, i.e., CRC-8, CRC-16, and CRC-32. The computed CRC bytes are appended after the UP. CRC-8 is used for TS stream and CRC-32 for IP stream. In the case where the GS stream does not provide the CRC encoding, the proposed CRC encoding should be applied.

The BB frame slicer maps the input into an internal logical-bit format. The first received bit is defined to be the MSB. The BB frame slicer allocates a number of input bits equal to the available data field capacity. To allocate a number of input bits equal to the BBF payload, the UP packet stream is sliced to fit the data field of BBF.

The BB frame header insertion block may insert fixed length BBF header of 2 bytes is inserted in front of the BB Frame. The BBF header includes STUFFI (1 bit), SYNCD (13 bits), and RFU (2 bits). In addition to the fixed 2-Byte BBF header, BBF may have an extension field (1 or 3 bytes) at the end of the 2-byte BBF header.

The stream adaptation 2010 is comprised of a stuffing insertion block and a BB scrambler. The stuffing insertion block may insert stuffing field into a payload of a BB frame. If the input data to the stream adaptation is sufficient to fill a BB-Frame, STUFFI is set to '0' and the BBF has no stuffing field. Otherwise STUFFI is set to '1' and the stuffing field is inserted immediately after the BBF header. The stuffing field comprises two bytes of the stuffing field header and a variable size of stuffing data.

The BB scrambler scrambles complete BBF for energy dispersal. The scrambling sequence is synchronous with the BBF. The scrambling sequence is generated by the feedback shift register.

The PLS generation block 2020 may generate physical layer signaling (PLS) data. The PLS provides the receiver with a means to access physical layer DPs. The PLS data consists of PLS1 data and PLS2 data.

The PLS1 data is a first set of PLS data carried in the FSS symbols in the frame having a fixed size, coding and modulation, which carries basic information about the system as well as the parameters needed to decode the PLS2 data. The PLS1 data provides basic transmission parameters including parameters required to enable the reception and decoding of the PLS2 data. Also, the PLS1 data remains constant for the duration of a frame-group.

The PLS2 data is a second set of PLS data transmitted in the FSS symbol, which carries more detailed PLS data about the system and the DPs. The PLS2 contains parameters that provide sufficient information for the receiver to decode the desired DP. The PLS2 signaling further consists of two types of parameters, PLS2 Static data (PLS2-STAT data) and PLS2 dynamic data (PLS2-DYN data). The PLS2 Static data is PLS2 data that remains static for the duration of a frame-group and the PLS2 dynamic data is PLS2 data that may dynamically change frame-by-frame.

Details of the PLS data will be described later.

The PLS scrambler 2030 may scramble the generated PLS data for energy dispersal.

The above-described blocks may be omitted or replaced by blocks having similar or identical functions.

Figure 10:
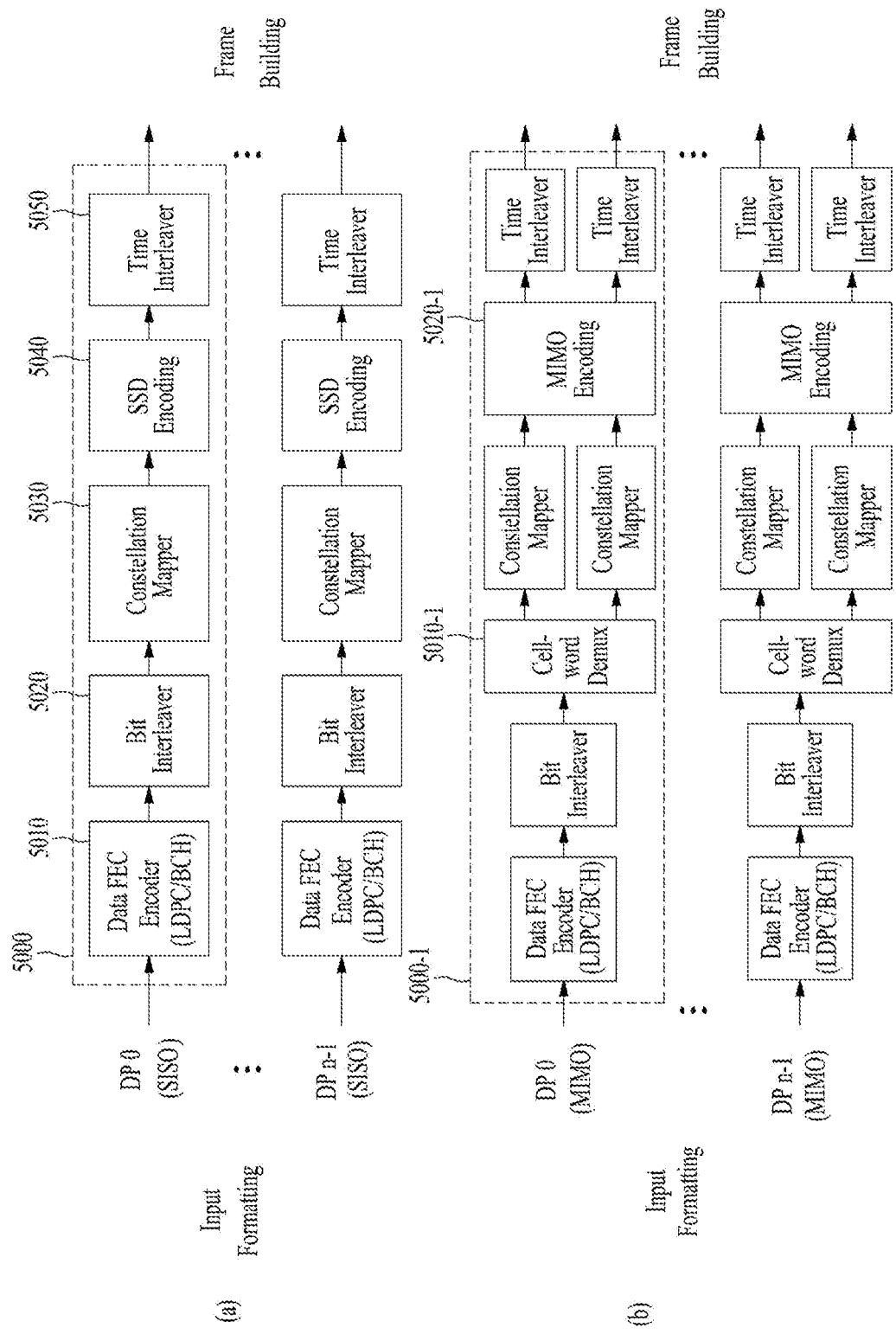
FIG. 10 illustrates a BICM block according to an embodiment of the present disclosure.

FIG. 10 illustrates a BICM block according to an embodiment of the present disclosure.

The BICM block illustrated in FIG. 5 corresponds to an embodiment of the BICM block 1010 described with reference to FIG. 1.

As described above, the apparatus for transmitting broadcast signals for future broadcast services according to an embodiment of the present disclosure may provide a terrestrial broadcast service, mobile broadcast service, UHDTV service, etc.

Since QoS (quality of service) depends on characteristics of a service provided by the apparatus for transmitting broadcast signals for future broadcast services according to an embodiment of the present disclosure, data corresponding to respective services needs to be processed through different schemes. Accordingly, the a BICM block according to an embodiment of the present disclosure may independently process DPs input thereto by independently applying SISO, MISO and MIMO schemes to the data pipes respectively corresponding to data paths. Consequently, the apparatus for transmitting broadcast signals for future broadcast services according to an embodiment of the present disclosure may control QoS for each service or service component transmitted through each DP.

(a) shows the BICM block shared by the base profile and the handheld profile and (b) shows the BICM block of the advanced profile.

The BICM block shared by the base profile and the handheld profile and the BICM block of the advanced profile may include plural processing blocks for processing each DP.

A description will be given of each processing block of the BICM block for the base profile and the handheld profile and the BICM block for the advanced profile.

A processing block 5000 of the BICM block for the base profile and the handheld profile may include a Data FEC encoder 5010, a bit interleaver 5020, a constellation mapper 5030, an SSD (Signal Space Diversity) encoding block 5040 and a time interleaver 5050.

The Data FEC encoder 5010 may perform the FEC encoding on the input BBF to generate FECBLOCK procedure using outer coding (BCH), and inner coding (LDPC). The outer coding (BCH) is optional coding method. Details of operations of the Data FEC encoder 5010 will be described later.

The bit interleaver 5020 may interleave outputs of the Data FEC encoder 5010 to achieve optimized performance with combination of the LDPC codes and modulation scheme while providing an efficiently implementable structure. Details of operations of the bit interleaver 5020 will be described later.

The constellation mapper 5030 may modulate each cell word from the bit interleaver 5020 in the base and the handheld profiles, or cell word from the Cell-word demultiplexer 5010-1 in the advanced profile using either QPSK, QAM-16, non-uniform QAM (NUQ-64, NUQ-256, NUQ- 1024) or non-uniform constellation (NUC-16, NUC-64, NUC-256, NUC-1024) to provide a power-normalized constellation point, $e_1$. This constellation mapping is applied only for DPs. Observe that QAM-16 and NUQs are square shaped, while NUCs have arbitrary shape. When each constellation is rotated by any multiple of 90 degrees, the rotated constellation exactly overlaps with its original one. This "rotation-sense" symmetric property makes the capacities and the average powers of the real and imaginary components equal to each other. Both NUQs and NUCs are defined specifically for each code rate and the particular one used is signaled by the parameter DP_MOD filed in PLS2 data.

The SSD encoding block 5040 may precode cells in two (2D), three (3D), and four (4D) dimensions to increase the reception robustness under difficult fading conditions.

The time interleaver 5050 may operates at the DP level. The parameters of time interleaving (TI) may be set differently for each DP. Details of operations of the time interleaver 5050 will be described later.

A processing block 5000-1 of the BICM block for the advanced profile may include the Data FEC encoder, bit interleaver, constellation mapper, and time interleaver.

However, the processing block 5000-1 is distinguished from the processing block 5000 further includes a cell-word demultiplexer 5010-1 and a MIMO encoding block 5020-1.

Also, the operations of the Data FEC encoder, bit interleaver, constellation mapper, and time interleaver in the processing block 5000-1 correspond to those of the Data FEC encoder 5010, bit interleaver 5020, constellation mapper 5030, and time interleaver 5050 described and thus description thereof is omitted.

The cell-word demultiplexer 5010-1 is used for the DP of the advanced profile to divide the single cell-word stream into dual cell-word streams for MIMO processing. Details of operations of the cell-word demultiplexer 5010-1 will be described later.

The MIMO encoding block 5020-1 may process the output of the cell-word demultiplexer 5010-1 using the MIMO encoding scheme. The MIMO encoding scheme was optimized for broadcasting signal transmission. The MIMO technology is a promising way to get a capacity increase but it depends on channel characteristics. Especially for broadcasting, the strong LOS component of the channel or a difference in the received signal power between two antennas caused by different signal propagation characteristics makes it difficult to get capacity gain from MIMO. The proposed MIMO encoding scheme overcomes this problem using a rotation-based pre-coding and phase randomization of one of the MIMO output signals.

MIMO encoding is intended for a 2×2 MIMO system requiring at least two antennas at both the transmitter and the receiver. Two MIMO encoding modes are defined in this proposal; full-rate spatial multiplexing (FR-SM) and full-rate full-diversity spatial multiplexing (FRFD-SM). The FR-SM encoding provides capacity increase with relatively small complexity increase at the receiver side while the FRFD-SM encoding provides capacity increase and additional diversity gain with a great complexity increase at the receiver side. The proposed MIMO encoding scheme has no restriction on the antenna polarity configuration.

MIMO processing is required for the advanced profile frame, which means all DPs in the advanced profile frame are processed by the MIMO encoder. MIMO processing is applied at DP level. Pairs of the Constellation Mapper outputs NUQ ($e_{1,i}$ and $e_{2,i}$) are fed to the input of the MIMO encoder. Paired MIMO encoder outputs (g1,i and g2,i) are transmitted by the same carrier k and OFDM symbol l of their respective TX antennas.

The above-described blocks may be omitted or replaced by blocks having similar or identical functions.

Figure 11:
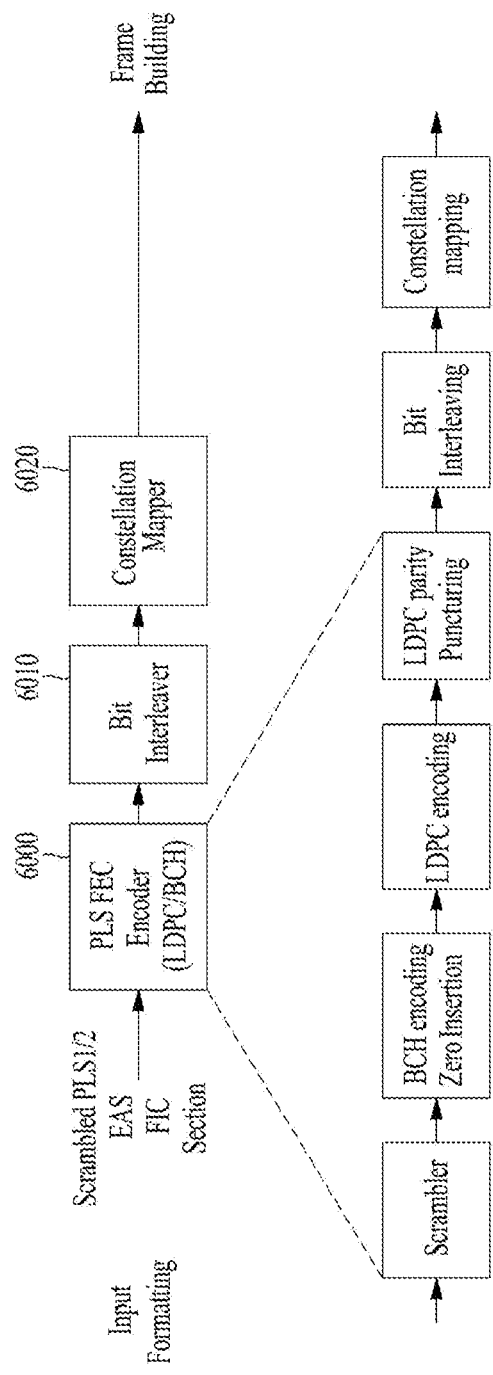
FIG. 11 illustrates a BICM block according to another embodiment of the present disclosure.

FIG. 11 illustrates a BICM block according to another embodiment of the present disclosure.

The BICM block illustrated in FIG. 11 corresponds to an embodiment of the BICM block 1010 described with reference to FIG. 8.

FIG. 11 illustrates a BICM block for protection of physical layer signaling (PLS), emergency alert channel (EAC) and fast information channel (FIC). EAC is a part of a frame that carries EAS information data and FIC is a logical channel in a frame that carries the mapping information between a service and the corresponding base DP. Details of the EAC and FIC will be described later.

Referring to FIG. 11, the BICM block for protection of PLS, EAC and FIC may include a PLS FEC encoder 6000, a bit interleaver 6010 and a constellation mapper 6020.

Also, the PLS FEC encoder 6000 may include a scrambler, BCH encoding/zero insertion block, LDPC encoding block and LDPC parity puncturing block. Description will be given of each block of the BICM block.

The PLS FEC encoder 6000 may encode the scrambled PLS 1/2 data, EAC and FIC section.

The scrambler may scramble PLS1 data and PLS2 data before BCH encoding and shortened and punctured LDPC encoding.

The BCH encoding/zero insertion block may perform outer encoding on the scrambled PLS 1/2 data using the shortened BCH code for PLS protection and insert zero bits after the BCH encoding. For PLS1 data only, the output bits of the zero insertion may be permuted before LDPC encoding.

The LDPC encoding block may encode the output of the BCH encoding/zero insertion block using LDPC code. To generate a complete coded block, $C_{ldpc}$, parity bits, $P_{ldpc}$ are encoded systematically from each zero-inserted PLS information block, $I_{ldpc}$ and appended thereafter.

$$C_{ldpc}=[I_{ldpc}\ P_{ldpc}]=[i_0,i_1,\ldots,i_{K_{ldpc}-1},p_0,p_1,\ldots,p_{N_{ldpc}-K_{ldpc}-1}]\quad \text{Equation 1}$$

The LDPC code parameters for PLS1 and PLS2 are as following table 4.

TABLE 4

| Signaling Type | $K_{sig}$ | $K_{bch}$ | $N_{bch\_parity}$ | $K_{ldpc}$ $(=N_{bch})$ | $N_{ldpc}$ | $N_{ldpc\_parity}$ | Code rate | $Q_{ldpc}$ |
|---|---|---|---|---|---|---|---|---|
| PLS1 | 342 | 1020 | 60 | 1080 | 4320 | 3240 | 1/4 | 36 |
| PLS2 | <1021 | | | | | | | |
| | >1020 | 2100 | | 2160 | 7200 | 5040 | 3/10 | 56 |

The LDPC parity puncturing block may perform puncturing on the PLS1 data and PLS 2 data.

When shortening is applied to the PLS1 data protection, some LDPC parity bits are punctured after LDPC encoding. Also, for the PLS2 data protection, the LDPC parity bits of PLS2 are punctured after LDPC encoding. These punctured bits are not transmitted.

The bit interleaver 6010 may interleave the each shortened and punctured PLS1 data and PLS2 data.

The constellation mapper 6020 may map the bit ineterlaeved PLS1 data and PLS2 data onto constellations.

The above-described blocks may be omitted or replaced by blocks having similar or identical functions.

Figure 12:
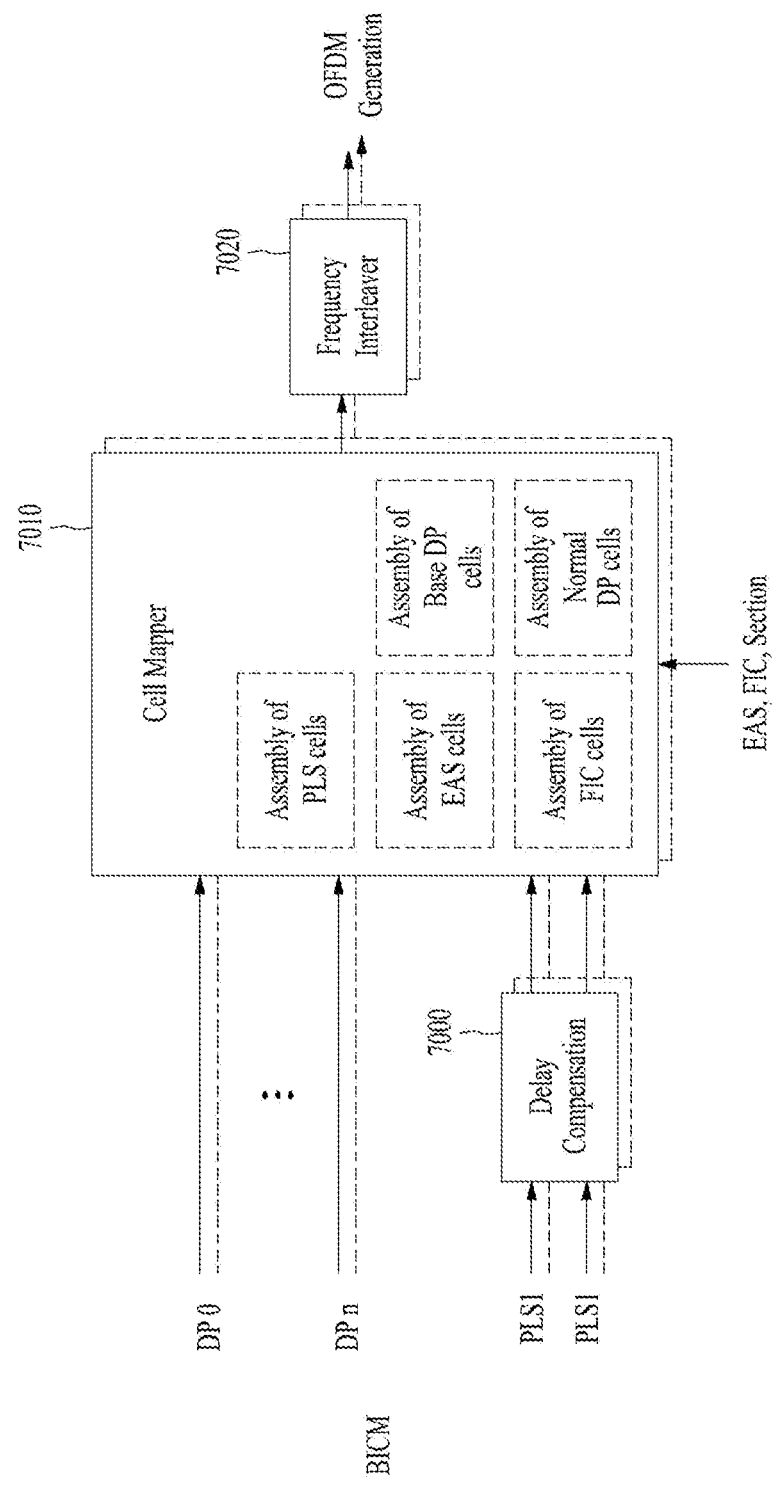
FIG. 12 illustrates a frame building block according to one embodiment of the present disclosure.

FIG. 12 illustrates a frame building block according to one embodiment of the present disclosure.

The frame building block illustrated in FIG. 12 corresponds to an embodiment of the frame building block 1020 described with reference to FIG. 8.

Referring to FIG. 12, the frame building block may include a delay compensation block 7000, a cell mapper 7010 and a frequency interleaver 7020. Description will be given of each block of the frame building block.

The delay compensation block 7000 may adjust the timing between the data pipes and the corresponding PLS data to ensure that they are co-timed at the transmitter end. The PLS data is delayed by the same amount as data pipes are by addressing the delays of data pipes caused by the Input Formatting block and BICM block. The delay of the BICM block is mainly due to the time interleaver 5050. In-band signaling data carries information of the next TI group so that they are carried one frame ahead of the DPs to be signaled. The delay compensating block delays in-band signaling data accordingly.

The cell mapper 7010 may map PLS, EAC, FIC, DPs, auxiliary streams and dummy cells into the active carriers of the OFDM symbols in the frame. The basic function of the cell mapper 7010 is to map data cells produced by the TIs for each of the DPs, PLS cells, and EAC/FIC cells, if any, into arrays of active OFDM cells corresponding to each of the OFDM symbols within a frame. Service signaling data (such as PSI (program specific information)/SI) may be separately gathered and sent by a data pipe. The Cell Mapper operates according to the dynamic information produced by the scheduler and the configuration of the frame structure. Details of the frame will be described later.

The frequency interleaver 7020 may randomly interleave data cells received from the cell mapper 7010 to provide frequency diversity. Also, the frequency interleaver 7020 may operate on very OFDM symbol pair comprised of two sequential OFDM symbols using a different interleaving-seed order to get maximum interleaving gain in a single frame.

The above-described blocks may be omitted or replaced by blocks having similar or identical functions.

Figure 13:
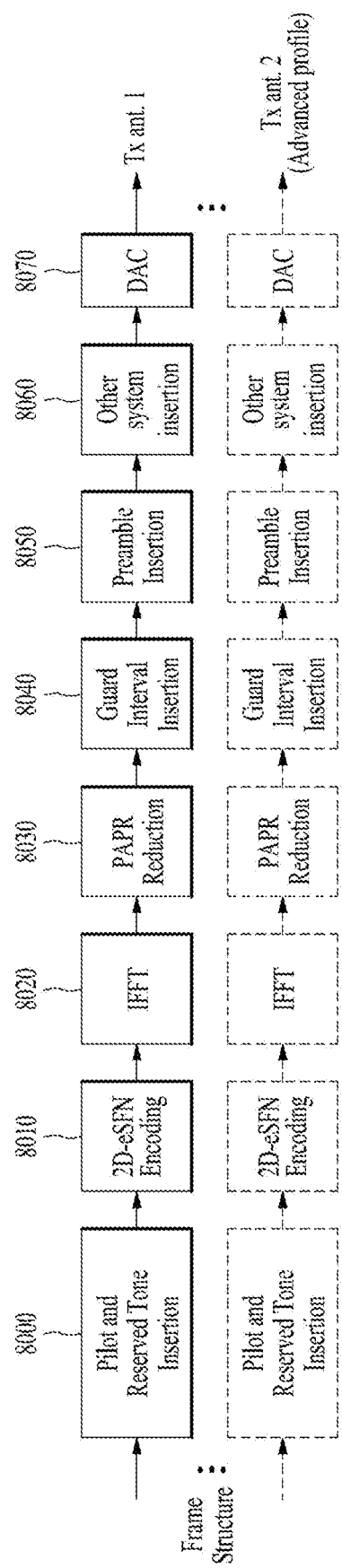
FIG. 13 illustrates an orthogonal frequency division multiplexing (OFDM) generation block according to an embodiment of the present disclosure.

FIG. 13 illustrates an OFDM generation block according to an embodiment of the present disclosure.

The OFDM generation block illustrated in FIG. 13 corresponds to an embodiment of the OFDM generation block 1030 described with reference to FIG. 8.

The OFDM generation block modulates the OFDM carriers by the cells produced by the Frame Building block, inserts the pilots, and produces the time domain signal for transmission. Also, this block subsequently inserts guard intervals, and applies PAPR (Peak-to-Average Power Radio) reduction processing to produce the final RF signal.

Referring to FIG. 13, the OFDM generation block may include a pilot and reserved tone insertion block 8000, a 2D-eSFN encoding block 8010, an IFFT (Inverse Fast Fourier Transform) block 8020, a PAPR reduction block 8030, a guard interval insertion block 8040, a preamble insertion block 8050, other system insertion block 8060 and a DAC block 8070. Description will be given of each block of the frame building block.

The pilot and reserved tone insertion block 8000 may insert pilots and the reserved tone.

Various cells within the OFDM symbol are modulated with reference information, known as pilots, which have transmitted values known a priori in the receiver. The information of pilot cells is made up of scattered pilots, continual pilots, edge pilots, FSS (frame signaling symbol) pilots and FES (frame edge symbol) pilots. Each pilot is transmitted at a particular boosted power level according to pilot type and pilot pattern. The value of the pilot information is derived from a reference sequence, which is a series of values, one for each transmitted carrier on any given symbol. The pilots may be used for frame synchronization, frequency synchronization, time synchronization, channel estimation, and transmission mode identification, and also may be used to follow the phase noise.

Reference information, taken from the reference sequence, is transmitted in scattered pilot cells in every symbol except the preamble, FSS and FES of the frame. Continual pilots are inserted in every symbol of the frame. The number and location of continual pilots depends on both the FFT size and the scattered pilot pattern. The edge carriers are edge pilots in every symbol except for the preamble symbol. They are inserted in order to allow frequency interpolation up to the edge of the spectrum. FSS pilots are inserted in FSS(s) and FES pilots are inserted in FES. They are inserted in order to allow time interpolation up to the edge of the frame.

The system according to an embodiment of the present disclosure supports the SFN network, where distributed MISO scheme is optionally used to support very robust transmission mode. The 2D-eSFN is a distributed MISO scheme that uses multiple TX antennas, each of which is located in the different transmitter site in the SFN network.

The 2D-eSFN encoding block 8010 may process a 2D-eSFN processing to distorts the phase of the signals transmitted from multiple transmitters, in order to create both time and frequency diversity in the SFN configuration. Hence, burst errors due to low flat fading or deep-fading for a long time may be mitigated.

The IFFT block 8020 may modulate the output from the 2D-eSFN encoding block 8010 using OFDM modulation scheme. Any cell in the data symbols which has not been designated as a pilot (or as a reserved tone) carries one of the data cells from the frequency interleaver. The cells are mapped to OFDM carriers.

The PAPR reduction block 8030 may perform a PAPR reduction on input signal using various PAPR reduction algorithms in the time domain.

The guard interval insertion block 8040 may insert guard intervals and the preamble insertion block 8050 may insert preamble in front of the signal. Details of a structure of the preamble will be described later.

The other system insertion block 8060 may multiplex signals of a plurality of broadcast transmission/reception systems in the time domain such that data of two or more different broadcast transmission/reception systems providing broadcast services may be simultaneously transmitted in the same RF signal bandwidth. In this case, the two or more different broadcast transmission/reception systems refer to systems providing different broadcast services. The different broadcast services may refer to a terrestrial broadcast service, mobile broadcast service, etc. Data related to respective broadcast services may be transmitted through different frames.

The DAC block 8070 may convert an input digital signal into an analog signal and output the analog signal. The signal output from the DAC block 7800 may be transmitted through multiple output antennas according to the physical layer profiles. A Tx antenna according to an embodiment of the present disclosure may have vertical or horizontal polarity.

The above-described blocks may be omitted or replaced by blocks having similar or identical functions according to design.

Figure 14:
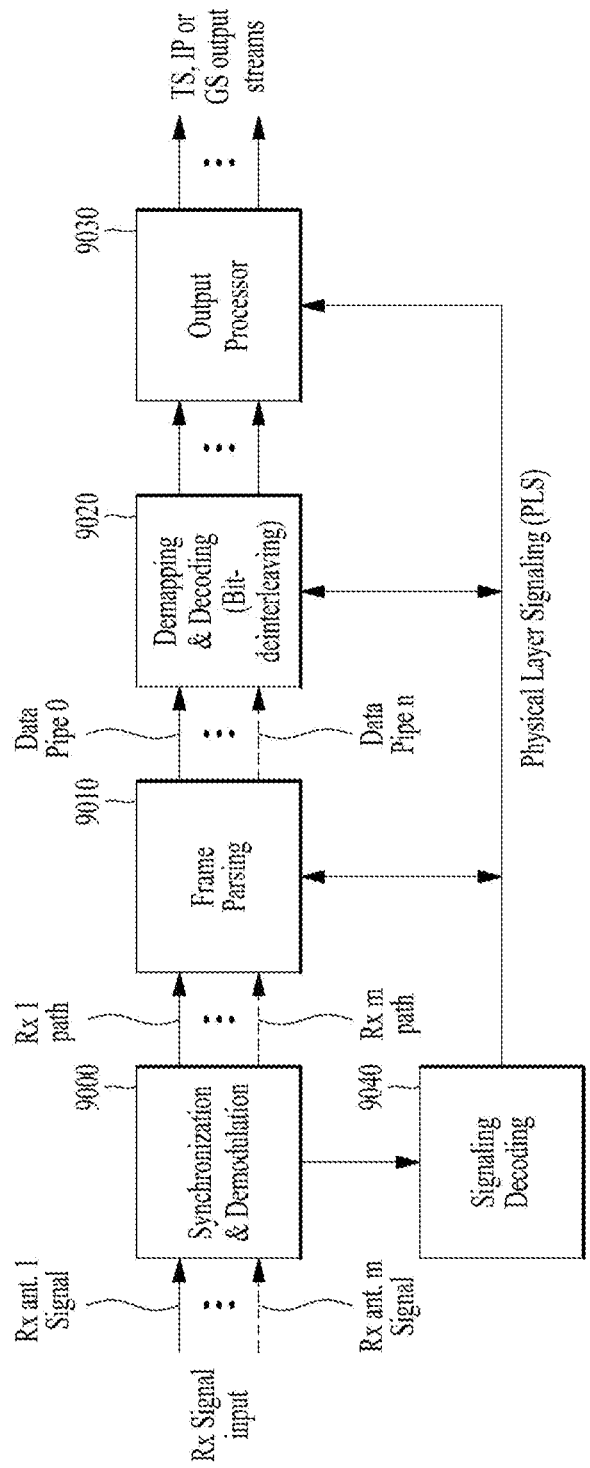
FIG. 14 illustrates a structure of an apparatus for receiving broadcast signals for future broadcast services according to an embodiment of the present disclosure.

FIG. 14 illustrates a structure of an apparatus for receiving broadcast signals for future broadcast services according to an embodiment of the present disclosure.

The apparatus for receiving broadcast signals for future broadcast services according to an embodiment of the present disclosure may correspond to the apparatus for transmitting broadcast signals for future broadcast services, described with reference to FIG. 8.

The apparatus for receiving broadcast signals for future broadcast services according to an embodiment of the present disclosure may include a synchronization & demodulation module 9000, a frame parsing module 9010, a demapping & decoding module 9020, an output processor 9030 and a signaling decoding module 9040. A description will be given of operation of each module of the apparatus for receiving broadcast signals.

The synchronization & demodulation module 9000 may receive input signals through m Rx antennas, perform signal detection and synchronization with respect to a system corresponding to the apparatus for receiving broadcast signals and carry out demodulation corresponding to a reverse procedure of the procedure performed by the apparatus for transmitting broadcast signals.

The frame parsing module 9010 may parse input signal frames and extract data through which a service selected by a user is transmitted. If the apparatus for transmitting broadcast signals performs interleaving, the frame parsing module 9010 may carry out deinterleaving corresponding to a reverse procedure of interleaving. In this case, the positions of a signal and data that need to be extracted may be obtained by decoding data output from the signaling decoding module 9040 to restore scheduling information generated by the apparatus for transmitting broadcast signals.

The demapping & decoding module 9020 may convert the input signals into bit domain data and then deinterleave the same as necessary. The demapping & decoding module 9020 may perform demapping for mapping applied for transmission efficiency and correct an error generated on a transmission channel through decoding. In this case, the demapping & decoding module 9020 may obtain transmission parameters necessary for demapping and decoding by decoding the data output from the signaling decoding module 9040.

The output processor 9030 may perform reverse procedures of various compression/signal processing procedures which are applied by the apparatus for transmitting broadcast signals to improve transmission efficiency. In this case, the output processor 9030 may acquire necessary control information from data output from the signaling decoding module 9040. The output of the output processor 8300 corresponds to a signal input to the apparatus for transmitting broadcast signals and may be MPEG-TSs, IP streams (v4 or v6) and generic streams.

The signaling decoding module 9040 may obtain PLS information from the signal demodulated by the synchronization & demodulation module 9000. As described above, the frame parsing module 9010, demapping & decoding module 9020 and output processor 9030 may execute functions thereof using the data output from the signaling decoding module 9040.

Figures 15, 16:
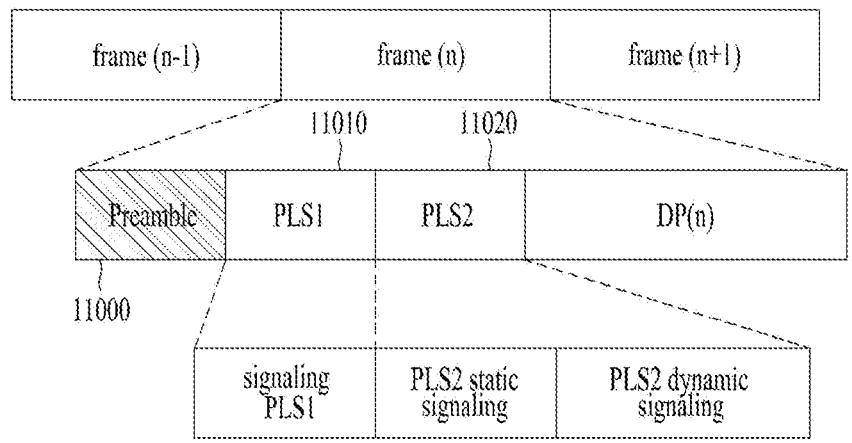
FIG. 15 illustrates a structure of a frame according to an embodiment of the present disclosure.
FIG. 16 illustrates a signaling hierarchy structure of the frame according to an embodiment of the present disclosure.

FIG. 15 illustrates a signaling hierarchy structure of the frame according to an embodiment of the present disclosure.

FIG. 15 illustrates the signaling hierarchy structure, which is split into three main parts: the preamble signaling data 11000, the PLS1 data 11010 and the PLS2 data 11020. The purpose of the preamble, which is carried by the preamble symbol in every frame, is to indicate the transmission type and basic transmission parameters of that frame. The PLS1 enables the receiver to access and decode the PLS2 data, which contains the parameters to access the DP of interest. The PLS2 is carried in every frame and split into two main parts: PLS2-STAT data and PLS2-DYN data. The static and dynamic portion of PLS2 data is followed by padding, if necessary.

FIG. 16 illustrates preamble signaling data according to an embodiment of the present disclosure.

Preamble signaling data carries 21 bits of information that are needed to enable the receiver to access PLS data and trace DPs within the frame structure. Details of the preamble signaling data are as follows:

PHY_PROFILE: This 3-bit field indicates the PHY profile type of the current frame. The mapping of different PHY profile types is given in Table 5 below.

TABLE 5

| Value | PHY profile |
|---|---|
| 000 | Base profile |
| 001 | Handheld profile |
| 010 | Advanced profiled |
| 011~110 | Reserved |
| 111 | FEF |

FFT_SIZE: This 2 bit field indicates the FFT size of the current frame within a frame-group, as described in Table 6 below.

TABLE 6

| Value | FFT size |
|---|---|
| 00 | 8K FFT |
| 01 | 16K FFT |
| 10 | 32K FFT |
| 11 | Reserved |

GI_FRACTION: This 3 bit field indicates the guard interval fraction value in the current super-frame, as described in Table 7 below.

TABLE 7

| Value | GI_FRACTION |
|---|---|
| 000 | 1/5 |
| 001 | 1/10 |
| 010 | 1/20 |
| 011 | 1/40 |
| 100 | 1/80 |
| 101 | 1/160 |
| 110-111 | Reserved |

EAC_FLAG: This 1 bit field indicates whether the EAC is provided in the current frame. If this field is set to '1', emergency alert service (EAS) is provided in the current frame. If this field set to '0', EAS is not carried in the current frame. This field may be switched dynamically within a super-frame.

PILOT_MODE: This 1-bit field indicates whether the pilot mode is mobile mode or fixed mode for the current frame in the current frame-group. If this field is set to '0', mobile pilot mode is used. If the field is set to '1', the fixed pilot mode is used.

PAPR_FLAG: This 1-bit field indicates whether PAPR reduction is used for the current frame in the current frame-group. If this field is set to value '1', tone reservation is used for PAPR reduction. If this field is set to '0', PAPR reduction is not used.

FRU_CONFIGURE: This 3-bit field indicates the PHY profile type configurations of the frame repetition units (FRU) that are present in the current super-frame. All profile types conveyed in the current super-frame are identified in this field in all preambles in the current super-frame. The 3-bit field has a different definition for each profile, as show in Table 8 below.

TABLE 8

| | Current PHY_ PROFILE = '000' (base) | Current PHY_ PROFILE = '001' (handheld) | Current PHY_ PROFILE = '010' (advanced) | Current PHY_ PROFILE = '111' (FEF) |
|---|---|---|---|---|
| FRU_CONFIGURE = 000 | Only base profile present | Only handheld profile present | Only advanced profile present | Only FEF present |
| FRU_CONFIGURE = 1XX | Handheld profile present | Base profile present | Base profile present | Base profile present |
| FRU_CONFIGURE = X1X | Advanced profile present | Advanced profile present | Handheld profile present | Handheld profile present |
| FRU_CONFIGURE = XX1 | FEF present | FEF present | FEF present | Advanced profile present |

RESERVED: This 7-bit field is reserved for future use.

FIG. 17 illustrates PLS1 data according to an embodiment of the present disclosure.

PLS1 data provides basic transmission parameters including parameters required to enable the reception and decoding of the PLS2. As above mentioned, the PLS1 data remain unchanged for the entire duration of one frame-group. The detailed definition of the signaling fields of the PLS1 data are as follows:

PREAMBLE_DATA: This 20-bit field is a copy of the preamble signaling data excluding the EAC_FLAG.

NUM_FRAME_FRU: This 2-bit field indicates the number of the frames per FRU.

PAYLOAD_TYPE: This 3-bit field indicates the format of the payload data carried in the frame-group. PAYLOAD_TYPE is signaled as shown in table 9.

TABLE 9

| value | Payload type |
|---|---|
| 1XX | TS stream is transmitted |
| X1X | IP stream is transmitted |
| XX1 | GS stream is transmitted |

NUM_FSS: This 2-bit field indicates the number of FSS symbols in the current frame.

SYSTEM_VERSION: This 8-bit field indicates the version of the transmitted signal format. The SYSTEM_VERSION is divided into two 4-bit fields, which are a major version and a minor version.

Major version: The MSB four bits of SYSTEM_VERSION field indicate major version information. A change in the major version field indicates a non-backward-compatible change. The default value is '0000'. For the version described in this standard, the value is set to '0000'.

Minor version: The LSB four bits of SYSTEM_VERSION field indicate minor version information. A change in the minor version field is backward-compatible.

CELL_ID: This is a 16-bit field which uniquely identifies a geographic cell in an ATSC network. An ATSC cell coverage area may consist of one or more frequencies, depending on the number of frequencies used per Futurecast UTB system. If the value of the CELL_ID is not known or unspecified, this field is set to '0'.

NETWORK_ID: This is a 16-bit field which uniquely identifies the current ATSC network.

SYSTEM_ID: This 16-bit field uniquely identifies the Futurecast UTB system within the ATSC network. The Futurecast UTB system is the terrestrial broadcast system whose input is one or more input streams (TS, IP, GS) and whose output is an RF signal. The Futurecast UTB system carries one or more PHY profiles and FEF, if any. The same Futurecast UTB system may carry different input streams and use different RF frequencies in different geographical areas, allowing local service insertion. The frame structure and scheduling is controlled in one place and is identical for all transmissions within a Futurecast UTB system. One or more Futurecast UTB systems may have the same SYSTEM_ID meaning that they all have the same physical layer structure and configuration.

The following loop consists of FRU_PHY_PROFILE, FRU_FRAME_LENGTH, FRU_GI_FRACTION, and RESERVED which are used to indicate the FRU configuration and the length of each frame type. The loop size is fixed so that four PHY profiles (including a FEF) are signaled within the FRU. If NUM_FRAME_FRU is less than 4, the unused fields are filled with zeros.

FRU_PHY_PROFILE: This 3-bit field indicates the PHY profile type of the (i+1)th (i is the loop index) frame of the associated FRU. This field uses the same signaling format as shown in Table 8.

FRU_FRAME_LENGTH: This 2-bit field indicates the length of the (i+1)th frame of the associated FRU. Using FRU_FRAME_LENGTH together with FRU_GI_FRACTION, the exact value of the frame duration may be obtained.

FRU_GI_FRACTION: This 3-bit field indicates the guard interval fraction value of the (i+1)th frame of the associated FRU. FRU_GI_FRACTION is signaled according to the table 7.

RESERVED: This 4-bit field is reserved for future use.

The following fields provide parameters for decoding the PLS2 data.

PLS2_FEC_TYPE: This 2-bit field indicates the FEC type used by the PLS2 protection. The FEC type is signaled according to table 10. The details of the LDPC codes will be described later.

TABLE 10

| Content | PLS2 FEC type |
|---|---|
| 00 | 4K-¼ and 7K-³⁄₁₀ LDPC codes |
| 01~11 | Reserved |

PLS2_MOD: This 3-bit field indicates the modulation type used by the PLS2. The modulation type is signaled according to table 11.

TABLE 11

| Value | PLS2_MODE |
|---|---|
| 000 | BPSK |
| 001 | QPSK |
| 010 | QAM-16 |
| 011 | NUQ-64 |
| 100~111 | Reserved |

PLS2_SIZE_CELL: This 15-bit field indicates $C_{total\_partial\_block}$, the size (specified as the number of QAM cells) of the collection of full coded blocks for PLS2 that is carried in the current frame-group. This value is constant during the entire duration of the current frame-group.

PLS2_STAT_SIZE_BIT: This 14-bit field indicates the size, in bits, of the PLS2-STAT for the current frame-group. This value is constant during the entire duration of the current frame-group.

PLS2_DYN_SIZE_BIT: This 14-bit field indicates the size, in bits, of the PLS2-DYN for the current frame-group. This value is constant during the entire duration of the current frame-group.

PLS2_REP_FLAG: This 1-bit flag indicates whether the PLS2 repetition mode is used in the current frame-group. When this field is set to value '1', the PLS2 repetition mode is activated. When this field is set to value '0', the PLS2 repetition mode is deactivated.

PLS2_REP_SIZE_CELL: This 15-bit field indicates $C_{total\_partial\_block}$, the size (specified as the number of QAM cells) of the collection of partial coded blocks for PLS2 carried in every frame of the current frame-group, when PLS2 repetition is used. If repetition is not used, the value of this field is equal to 0. This value is constant during the entire duration of the current frame-group.

PLS2_NEXT_FEC_TYPE: This 2-bit field indicates the FEC type used for PLS2 that is carried in every frame of the next frame-group. The FEC type is signaled according to the table 10.

PLS2_NEXT_MOD: This 3-bit field indicates the modulation type used for PLS2 that is carried in every frame of the next frame-group. The modulation type is signaled according to the table 11.

PLS2_NEXT_REP_FLAG: This 1-bit flag indicates whether the PLS2 repetition mode is used in the next frame-group. When this field is set to value '1', the PLS2 repetition mode is activated. When this field is set to value '0', the PLS2 repetition mode is deactivated.

PLS2_NEXT_REP_SIZE_CELL: This 15-bit field indicates $C_{total\_full\_block}$. The size (specified as the number of QAM cells) of the collection of full coded blocks for PLS2 that is carried in every frame of the next frame-group, when PLS2 repetition is used. If repetition is not used in the next frame-group, the value of this field is equal to 0. This value is constant during the entire duration of the current frame-group.

PLS2_NEXT_REP_STAT_SIZE_BIT: This 14-bit field indicates the size, in bits, of the PLS2-STAT for the next frame-group. This value is constant in the current frame-group.

PLS2_NEXT_REP_DYN_SIZE_BIT: This 14-bit field indicates the size, in bits, of the PLS2-DYN for the next frame-group. This value is constant in the current frame-group.

PLS2_AP_MODE: This 2-bit field indicates whether additional parity is provided for PLS2 in the current frame-group. This value is constant during the entire duration of the current frame-group. Table 12 below shows the values of this field. When this field is set to '00', additional parity is not used for the PLS2 in the current frame-group.

TABLE 12

| Value | PLS2-AP mode |
|---|---|
| 00 | AP is not provided |
| 01 | AP1 mode |
| 10~11 | Reserved |

PLS2_AP_SIZE_CELL: This 15-bit field indicates the size (specified as the number of QAM cells) of the additional parity bits of the PLS2. This value is constant during the entire duration of the current frame-group.

PLS2_NEXT_AP_MODE: This 2-bit field indicates whether additional parity is provided for PLS2 signaling in every frame of next frame-group. This value is constant during the entire duration of the current frame-group. The table 12 defines the values of this field PLS2_NEXT_AP_SIZE_CELL: This 15-bit field indicates the size (specified as the number of QAM cells) of the additional parity bits of the PLS2 in every frame of the next frame-group. This value is constant during the entire duration of the current frame-group.

RESERVED: This 32-bit field is reserved for future use.

CRC_32: A 32-bit error detection code, which is applied to the entire PLS1 signaling.

FIG. 18 illustrates PLS2 data according to an embodiment of the present disclosure.

FIG. 18 illustrates PLS2-STAT data of the PLS2 data. The PLS2-STAT data are the same within a frame-group, while the PLS2-DYN data provide information that is specific for the current frame.

The details of fields of the PLS2-STAT data are as follows:

FIC_FLAG: This 1-bit field indicates whether the FIC is used in the current frame-group. If this field is set to '1', the FIC is provided in the current frame. If this field set to '0', the FIC is not carried in the current frame. This value is constant during the entire duration of the current frame-group.

AUX_FLAG: This 1-bit field indicates whether the auxiliary stream(s) is used in the current frame-group. If this field is set to '1', the auxiliary stream is provided in the current frame. If this field set to '0', the auxiliary stream is not carried in the current frame. This value is constant during the entire duration of current frame-group.

NUM_DP: This 6-bit field indicates the number of DPs carried within the current frame. The value of this field ranges from 1 to 64, and the number of DPs is NUM_DP+1.

DP_ID: This 6-bit field identifies uniquely a DP within a PHY profile.

DP_TYPE: This 3-bit field indicates the type of the DP. This is signaled according to Table 13 below.

TABLE 13

| Value | DP Type |
|---|---|
| 000 | DP Type 1 |
| 001 | DP Type 2 |
| 010~111 | reserved |

DP_GROUP_ID: This 8-bit field identifies the DP group with which the current DP is associated. This may be used by a receiver to access the DPs of the service components associated with a particular service, which will have the same DP_GROUP_ID.

BASE_DP_ID: This 6-bit field indicates the DP carrying service signaling data (such as PSI/SI) used in the Management layer. The DP indicated by BASE_DP_ID may be either a normal DP carrying the service signaling data along with the service data or a dedicated DP carrying only the service signaling data DP_FEC_TYPE: This 2-bit field indicates the FEC type used by the associated DP. The FEC type is signaled according to Table 14 below.

TABLE 14

| Value | FEC_TYPE |
|---|---|
| 00 | 16K LDPC |
| 01 | 64K LDPC |
| 10~11 | Reserved |

DP_COD: This 4-bit field indicates the code rate used by the associated DP. The code rate is signaled according to Table 15 below.

TABLE 15

| Value | Code rate |
|---|---|
| 0000 | 5/15 |
| 0001 | 6/15 |
| 0010 | 7/15 |
| 0011 | 8/15 |
| 0100 | 9/15 |
| 0101 | 10/15 |
| 0110 | 11/15 |
| 0111 | 12/15 |
| 1000 | 13/15 |
| 1001~1111 | Reserved |

DP_MOD: This 4-bit field indicates the modulation used by the associated DP. The modulation is signaled according to Table 16 below.

TABLE 16

| Value | Modulation |
|---|---|
| 0000 | QPSK |
| 0001 | QAM-16 |
| 0010 | NUQ-64 |
| 0011 | NUQ-256 |
| 0100 | NUQ-1024 |
| 0101 | NUC-16 |
| 0110 | NUC-64 |
| 0111 | NUC-256 |
| 1000 | NUC-1024 |
| 1001~1111 | reserved |

DP_SSD_FLAG: This 1-bit field indicates whether the SSD mode is used in the associated DP. If this field is set to value '1', SSD is used. If this field is set to value '0', SSD is not used.

The following field appears only if PHY_PROFILE is equal to '010', which indicates the advanced profile:

DP_MIMO: This 3-bit field indicates which type of MIMO encoding process is applied to the associated DP. The type of MIMO encoding process is signaled according to the table 17.

TABLE 17

| Value | MIMO encoding |
|---|---|
| 000 | FR-SM |
| 001 | FRFD-SM |
| 010~111 | reserved |

DP_TI_TYPE: This 1-bit field indicates the type of time-interleaving. A value of '0' indicates that one TI group corresponds to one frame and contains one or more TI-blocks. A value of '1' indicates that one TI group is carried in more than one frame and contains only one TI-block.

DP_TI_LENGTH: The use of this 2-bit field (the allowed values are only 1, 2, 4, 8) is determined by the values set within the DP_TI_TYPE field as follows:

If the DP_TI_TYPE is set to the value '1', this field indicates $P_1$, the number of the frames to which each TI group is mapped, and there is one TI-block per TI group ($N_{TI}=1$). The allowed $P_1$ values with 2-bit field are defined in Table 18 below.

If the DP_TI_TYPE is set to the value '0', this field indicates the number of TI-blocks NTI per TI group, and there is one TI group per frame ($P_1=1$). The allowed PI values with 2-bit field are defined in Table 18 below.

TABLE 18

| 2-bit field | $P_I$ | $N_{TI}$ |
|---|---|---|
| 00 | 1 | 1 |
| 01 | 2 | 2 |
| 10 | 4 | 3 |
| 11 | 8 | 4 |

DP_FRAME_INTERVAL: This 2-bit field indicates the frame interval ($I_{JUMP}$) within the frame-group for the associated DP and the allowed values are 1, 2, 4, 8 (the corresponding 2-bit field is '00', '01', '10', or '11', respectively). For DPs that do not appear every frame of the frame-group, the value of this field is equal to the interval between successive frames. For example, if a DP appears on the frames 1, 5, 9, 13, etc., this field is set to '4'. For DPs that appear in every frame, this field is set to '1'.

DP_TI_BYPASS: This 1-bit field determines the availability of time interleaver 5050. If time interleaving is not used for a DP, it is set to '1'. Whereas if time interleaving is used it is set to '0'.

DP_FIRST_FRAME_IDX: This 5-bit field indicates the index of the first frame of the super-frame in which the current DP occurs. The value of DP_FIRST_FRAME_IDX ranges from 0 to 31

DP_NUM_BLOCK_MAX: This 10-bit field indicates the maximum value of DP_NUM_BLOCKS for this DP. The value of this field has the same range as DP_NUM_BLOCKS.

DP_PAYLOAD_TYPE: This 2-bit field indicates the type of the payload data carried by the given DP. DP_PAYLOAD_TYPE is signaled according to Table 19 below.

TABLE 19

| Value | Payload Type |
|---|---|
| 00 | TS. |
| 01 | IP |
| 10 | GS |
| 11 | reserved |

DP_INBAND_MODE: This 2-bit field indicates whether the current DP carries in-band signaling information. The in-band signaling type is signaled according to Table 20 below.

TABLE 20

| Value | In-band mode |
|---|---|
| 00 | In-band signaling is not carried. |
| 01 | INBAND-PLS is carried only |
| 10 | INBAND-ISSY is carried only |
| 11 | INBAND-PLS and INBAND-ISSY are carried |

DP_PROTOCOL_TYPE: This 2-bit field indicates the protocol type of the payload carried by the given DP. It is signaled according to Table 21 below when input payload types are selected.

TABLE 21

| Value | If DP_PAYLOAD_TYPE Is TS | If DP_PAYLOAD_TYPE Is IP | If DP_PAYLOAD_TYPE Is GS |
|---|---|---|---|
| 00 | MPEG2-TS | IPv4 | (Note) |
| 01 | Reserved | IPv6 | Reserved |
| 10 | Reserved | Reserved | Reserved |
| 11 | Reserved | Reserved | Reserved |

DP_CRC_MODE: This 2-bit field indicates whether CRC encoding is used in the Input Formatting block. The CRC mode is signaled according to Table 22 below.

TABLE 22

| Value | CRC mode |
|---|---|
| 00 | Not used |
| 01 | CRC-8 |
| 10 | CRC-16 |
| 11 | CRC-32 |

DNP_MODE: This 2-bit field indicates the null-packet deletion mode used by the associated DP when DP_PAYLOAD_TYPE is set to TS ('00'). DNP_MODE is signaled according to Table 23 below. If DP_PAYLOAD_TYPE is not TS ('00'), DNP_MODE is set to the value '00'.

TABLE 23

| Value | Null-packet deletion mode |
|---|---|
| 00 | Not used |
| 01 | DNP-NORMAL |
| 10 | DNP-OFFSET |
| 11 | reserved |

ISSY_MODE: This 2-bit field indicates the ISSY mode used by the associated DP when DP_PAYLOAD_TYPE is set to TS ('00'). The ISSY_MODE is signaled according to Table 24 below. If DP_PAYLOAD_TYPE is not TS ('00'), ISSY_MODE is set to the value of '00'.

TABLE 24

| Value | ISSY mode |
|---|---|
| 00 | Not used |
| 01 | ISSY-UP |
| 10 | ISSY-BBF |
| 11 | reserved |

HC_MODE_TS: This 2-bit field indicates the TS header compression mode used by the associated DP when DP_PAYLOAD_TYPE is set to TS ('00'). The HC_MODE_TS is signaled according to Table 25 below.

TABLE 25

| Value | Header compression mode |
|---|---|
| 00 | HC_MODE_TS 1 |
| 01 | HC_MODE_TS 2 |
| 10 | HC_MODE_TS 3 |
| 11 | HC_MODE_TS 4 |

HC_MODE_IP: This 2-bit field indicates the IP header compression mode when DP_PAYLOAD_TYPE is set to IP ('01'). The HC_MODE_IP is signaled according to Table 26 below.

TABLE 26

| Value | Header compression mode |
|---|---|
| 00 | No compression |
| 01 | HC_MODE_IP 1 |
| 10~11 | reserved |

PID: This 13-bit field indicates the PID number for TS header compression when DP_PAYLOAD_TYPE is set to TS ('00') and HC_MODE_TS is set to '01' or '10'.

RESERVED: This 8-bit field is reserved for future use.

The following field appears only if FIC_FLAG is equal to '1':

FIC_VERSION: This 8-bit field indicates the version number of the FIC.

FIC_LENGTH_BYTE: This 13-bit field indicates the length, in bytes, of the FIC.

RESERVED: This 8-bit field is reserved for future use.

The following field appears only if AUX_FLAG is equal to '1':

NUM_AUX: This 4-bit field indicates the number of auxiliary streams. Zero means no auxiliary streams are used.

AUX_CONFIG_RFU: This 8-bit field is reserved for future use.

AUX_STREAM_TYPE: This 4-bit is reserved for future use for indicating the type of the current auxiliary stream.

AUX_PRIVATE_CONFIG: This 28-bit field is reserved for future use for signaling auxiliary streams.

Figure 19:
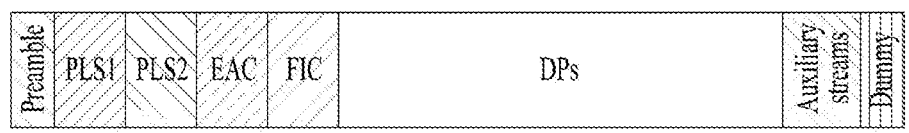
FIG. 19 illustrates PLS2 data according to another embodiment of the present disclosure.

FIG. 19 illustrates a logical structure of a frame according to an embodiment of the present disclosure.

As mentioned above, the PLS, EAC, FIC, DPs, auxiliary streams and dummy cells are mapped into the active carriers of the OFDM symbols in the frame. The PLS1 and PLS2 are first mapped into one or more FSS(s). After that, EAC cells, if any, are mapped immediately following the PLS field, followed next by FIC cells, if any. The DPs are mapped next after the PLS or EAC, FIC, if any. Type 1 DPs follows first, and Type 2 DPs next. The details of a type of the DP will be described later. In some case, DPs may carry some special data for EAS or service signaling data. The auxiliary stream or streams, if any, follow the DPs, which in turn are followed by dummy cells. Mapping them all together in the above mentioned order, i.e. PLS, EAC, FIC, DPs, auxiliary streams and dummy data cells exactly fill the cell capacity in the frame.

Figure 20:
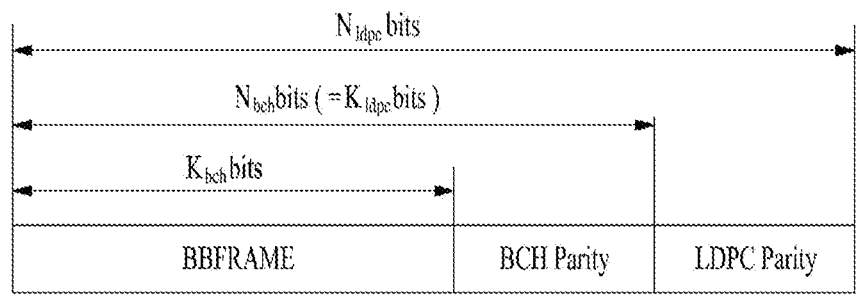
FIG. 20 illustrates a logical structure of a frame according to an embodiment of the present disclosure.

FIG. 20 illustrates an FEC structure according to an embodiment of the present disclosure.

FIG. 20 illustrates an FEC structure according to an embodiment of the present disclosure before bit interleaving. As above mentioned, Data FEC encoder may perform the FEC encoding on the input BBF to generate FECBLOCK procedure using outer coding (BCH), and inner coding (LDPC). The illustrated FEC structure corresponds to the FECBLOCK. Also, the FECBLOCK and the FEC structure have same value corresponding to a length of LDPC codeword.

The BCH encoding is applied to each BBF (Km, bits), and then LDPC encoding is applied to BCH-encoded BBF ($K_{ldpc}$ bits=$N_{bch}$ bits) as illustrated in FIG. 20.

The value of $N_{ldpc}$ is either 64800 bits (long FECBLOCK) or 16200 bits (short FECBLOCK).

Tables 27 and 28 below show FEC encoding parameters for a long FECBLOCK and a short FECBLOCK, respectively.

TABLE 27

| LDPC Rate | $N_{ldpc}$ | $K_{ldpc}$ | $K_{bch}$ | BCH error correction capability | $N_{bch}$-$K_{bch}$ |
|---|---|---|---|---|---|
| 5/15 | 64800 | 21600 | 21408 | 12 | 192 |
| 6/15 | | 25920 | 25728 | | |
| 7/15 | | 30240 | 30048 | | |
| 8/15 | | 34560 | 34368 | | |
| 9/15 | | 38880 | 38688 | | |
| 10/15 | | 43200 | 43008 | | |
| 11/15 | | 47520 | 47328 | | |
| 12/15 | | 51840 | 51648 | | |
| 13/15 | | 56160 | 55968 | | |

TABLE 28

| LDPC Rate | $N_{ldpc}$ | $K_{ldpc}$ | $K_{bch}$ | BCH error correction capability | $N_{bch}$-$K_{bch}$ |
|---|---|---|---|---|---|
| 5/15 | 16200 | 5400 | 5232 | 12 | 168 |
| 6/15 | | 6480 | 6312 | | |
| 7/15 | | 7560 | 7392 | | |
| 8/15 | | 8640 | 8472 | | |
| 9/15 | | 9720 | 9552 | | |
| 10/15 | | 10800 | 10632 | | |
| 11/15 | | 11880 | 11712 | | |
| 12/15 | | 12960 | 12792 | | |
| 13/15 | | 14040 | 13872 | | |

Details of operations of the BCH encoding and LDPC encoding are as follows:

A 12-error correcting BCH code is used for outer encoding of the BBF. The BCH generator polynomial for short FECBLOCK and long FECBLOCK are obtained by multiplying together all polynomials.

LDPC code is used to encode the output of the outer BCH encoding. To generate a completed $B_{ldpc}$ (FECBLOCK), $P_{ldpc}$ (parity bits) is encoded systematically from each $I_{ldpc}$ (BCH-encoded BBF), and appended to $I_{ldpc}$. The completed $B_{ldpc}$ (FECBLOCK) is represented as the following equation.

$$B_{ldpc}=[I_{ldpc}\ P_{ldpc}]=[i_0,i_1,\ldots,i_{K_{ldpc}-1},p_0,p_1,\ldots,p_{N_{ldpc}-K_{ldpc}-1}]$$ Equation 2

The parameters for long FECBLOCK and short FECBLOCK are given in the above table 28 and 29, respectively.

The detailed procedure to calculate $N_{ldpc}$-$K_{ldpc}$ parity bits for long FECBLOCK, is as follows:

1) Initialize the parity bits, $$p_0=p_1=p_2=\ldots=p_{N_{ldpc}-K_{ldpc}-1}=0$$ Equation 3

2) Accumulate the first information bit, $i_0$, at parity bit addresses specified in the first row of addresses of the parity check matrix. The details of addresses of parity check matrix will be described later. For example, for rate 13/15:

Equation 4

$p_{983} = p_{983} \oplus i_0$    $p_{2815} = p_{2815} \oplus i_0$ $p_{4837} = p_{4837} \oplus i_0$    $p_{4989} = p_{4989} \oplus i_0$ $p_{6138} = p_{6138} \oplus i_0$    $p_{6458} = p_{6458} \oplus i_0$ $p_{6921} = p_{6921} \oplus i_0$    $p_{6974} = p_{6974} \oplus i_0$ $p_{7572} = p_{7572} \oplus i_0$    $p_{8260} = p_{8260} \oplus i_0$ $p_{8496} = p_{8496} \oplus i_0$ 3) For the next 359 information bits, is, s=1, 2, . . . , 359 accumulate is at parity bit addresses using following expression.

$$\{x+(s\ \mathrm{mod}\ 360) \times Q_{ldpc}\} \mathrm{mod}(N_{ldpc}-K_{ldpc})$$ Equation 5 where x denotes the address of the parity bit accumulator corresponding to the first bit $i_0$, and $Q_{ldpc}$ is a code rate dependent constant specified in the addresses of parity check matrix. Continuing with the example, $Q_{ldpc}$=24 for rate 13/15, so for information bit $i_1$, the following operations are performed:

Equation 6

$p_{1007} = p_{1007} \oplus i_1$    $p_{2839} = p_{2839} \oplus i_1$ $p_{4861} = p_{4861} \oplus i_1$    $p_{5013} = p_{5013} \oplus i_1$ $p_{6162} = p_{6162} \oplus i_1$    $p_{6482} = p_{6482} \oplus i_1$ $p_{6945} = p_{6945} \oplus i_1$    $p_{6998} = p_{6998} \oplus i_1$ $p_{7596} = p_{7596} \oplus i_1$    $p_{8284} = p_{8284} \oplus i_1$ $p_{8520} = p_{8520} \oplus i_1$ 4) For the 361st information bit $i_{360}$, the addresses of the parity bit accumulators are given in the second row of the addresses of parity check matrix. In a similar manner the addresses of the parity bit accumulators for the following 359 information bits is, s=361, 362, . . . , 719 are obtained using Equation 6, where x denotes the address of the parity bit accumulator corresponding to the information bit $i_{360}$, i.e., the entries in the second row of the addresses of parity check matrix.

5) In a similar manner, for every group of 360 new information bits, a new row from addresses of parity check matrixes used to find the addresses of the parity bit accumulators.

After all of the information bits are exhausted, the final parity bits are obtained as follows:

6) Sequentially perform the following operations starting with i=1

$$p_i=p_i \oplus p_{i-1}, i=1,2,\ldots,N_{ldpc}-K_{ldpc}-1,$$ Equation 7 where final content of $p_i$, i=0, 1, ... $N_{ldpc}-K_{ldpc}-1$ is equal to the parity bit $p_i$.

TABLE 29

| Code Rate | $Q_{ldpc}$ |
|---|---|
| 5/15 | 120 |
| 6/15 | 108 |
| 7/15 | 96 |
| 8/15 | 84 |
| 9/15 | 72 |
| 10/15 | 60 |
| 11/15 | 48 |
| 12/15 | 36 |
| 13/15 | 24 |

This LDPC encoding procedure for a short FECBLOCK is in accordance with t LDPC encoding procedure for the long FECBLOCK, except for replacing Table 29 with Table 30, and replacing the addresses of parity check matrix for the long FECBLOCK with the addresses of parity check matrix for the short FECBLOCK.

TABLE 30

| Code Rate | $Q_{ldpc}$ |
|---|---|
| 5/15 | 30 |
| 6/15 | 27 |
| 7/15 | 24 |
| 8/15 | 21 |
| 9/15 | 18 |
| 10/15 | 15 |
| 11/15 | 12 |
| 12/15 | 9 |
| 13/15 | 6 |

Figure 21:
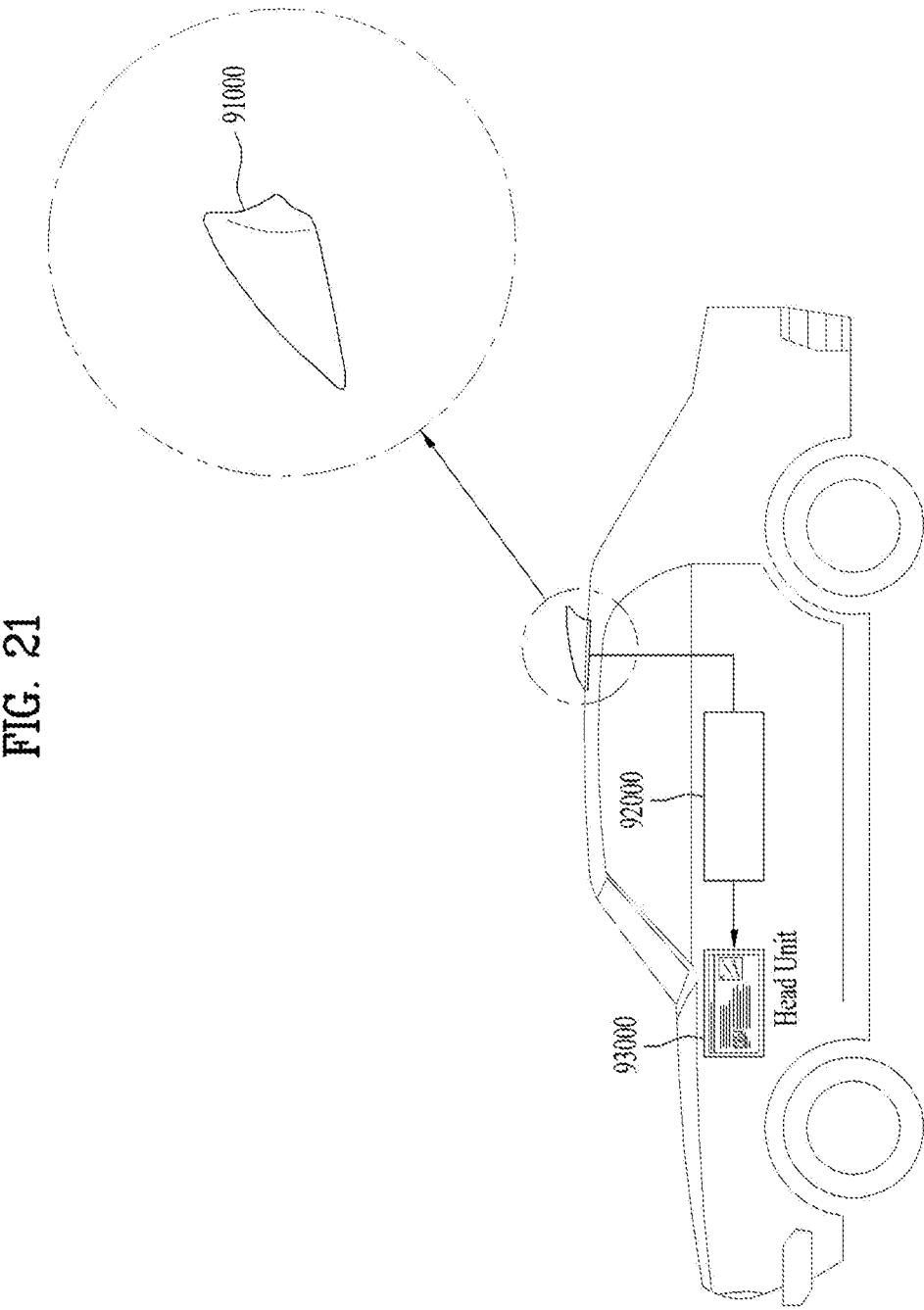
FIG. 21 shows a configuration of a vehicle according to an embodiment of the present disclosure.

FIG. 21 shows a configuration of a vehicle according to an embodiment of the present disclosure.

Referring to FIG. 21, a vehicle according to an embodiment of the present disclosure may include an antenna 91000, a vehicle reception apparatus 92000, and/or a head unit 93000.

The antenna 9100 may receive data. Here, the data may be a broadcast signal containing broadcast service data. According to an embodiment, the received broadcast signal may conform to the Advanced Television System Committee (ATSC) broadcast standard described above.

According to an embodiment, the broadcast signal received by the antenna 9100 is not limited to the ATSC broadcast standard, and may conform to broadcast standards such as Digital Video Broadcasting (DVB).

According to an embodiment, a smart antenna or the like may be used as the antenna.

The vehicle reception apparatus 92000 receives data through the antenna 91000, encodes the received data, and transfers the data to the head unit 93000. According to an embodiment, the vehicle reception apparatus 92000 may include all components capable of serially transferring data. Here, the components may be referred to as modules or units. According to an embodiment, the vehicle reception apparatus 92000 may transfer the received data using a component capable of serial transfer of data, such as an Ethernet cable.

According to an embodiment, the vehicle reception apparatus 92000 may include a receiver 103000, a demodulator 102000, an encoder 101000, and/or a processor 114000. Each component of the vehicle reception apparatus will be described in detail with reference to FIGS. 22 to 27.

The head unit 93000 receives data from the vehicle reception apparatus 92000 and displays the data to a vehicle occupant or a viewer.

According to an embodiment, the components of the vehicle illustrated in FIG. 21 may be included in the vehicle illustrated in FIG. 7, or may correspond to the respective components of the vehicle illustrated in FIG. 7.

Figure 22:
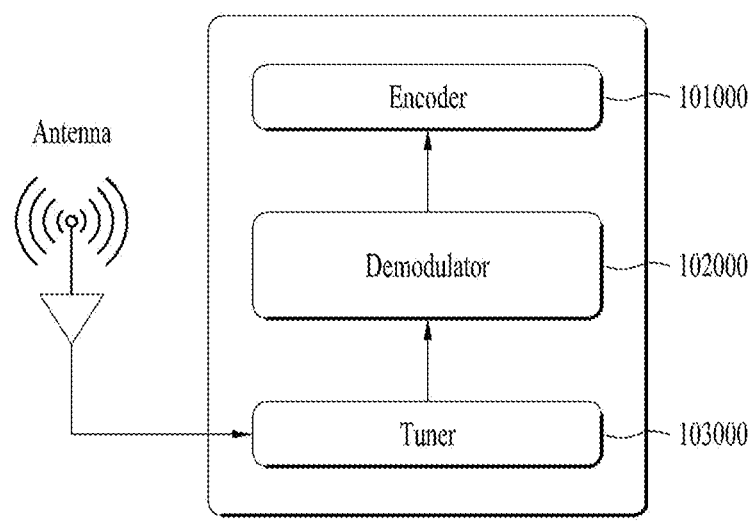
FIG. 22 shows a configuration of a vehicle reception apparatus according to an embodiment of the present disclosure.

FIG. 22 shows a configuration of a vehicle reception apparatus according to an embodiment of the present disclosure Referring to FIG. 22, a vehicle reception apparatus according to an embodiment of the present disclosure may include a tuner 103000, a demodulator 102000, and/or an encoder 101000.

The tuner 103000 receives a broadcast signal from the antenna 9100 and transfers the received data to the demodulator 102000. The data received by the tuner is broadcast service data conforming to broadcast standards such as ATSC or DVB.

Here, the tuner 103000 may correspond to the synchronization & demodulation module 9000 of FIG. 14. The synchronization & demodulation module 9000 is described above in detail with reference to FIG. 14.

Specifically, the tuner 103000 receives a broadcast signal containing broadcast service data in the form of a signal frame. The tuner 103000 may perform channel tuning to receive the broadcast signal. The tuner 103000 performs channel tuning by setting a frequency for the broadcast signal. The channel tuning process of the tuner 103000 will be described later with reference to FIG. 27.

The demodulator 102000 receives, from the tuner 103000, data obtained through signal detection and synchronization and demodulates broadcast service data included in the data.

According to an embodiment, the demodulator 102000 may correspond to the frame parsing module 9010 of FIG. 14 and the demapping & decoding (bit deinterleaving) module 9020. In other words, the demodulator 102000 receives, from the tuner 103000, data obtained through the signal detection and synchronization, performs frame parsing, demapping, and decoding of the data, and transfers the data to the encoder 101000.

Specifically, the demodulator 102000 receives a channel-tuned broadcast signal from the tuner 103000 and demodulates data in the broadcast signal. A signal frame in the broadcast signal containing broadcast service data includes a transmission parameter for transferring of a broadcast signal. The signal frame has the structure of the signal frame described with reference to FIGS. 15 and 19. The transmission parameter may correspond to the preamble described with reference to FIG. 16 and the PLS1 data (or L1 basic signaling information) and PLS2 (or L1 detail signaling information) described with reference to FIGS. 17 and 18. The PLS1 data or PLS2 data may be referred to as Layer 1 signaling information (or L1 signaling information). A specific process in which the demodulator 102000 acquires the transmission parameter will be described later with reference to FIG. 27.

According to an embodiment, the demodulator 102000 demodulates the data in the signal frame according to the transmission parameter, outputs a baseband (BB) frame containing broadcast service data, and transfers the frame to the encoder 101000. Here, the BB frame output to the encoder 101000 is a baseband packet or a baseband frame in a forward error correction (FEC) frame. The specific configuration of the FEC frame is described above with reference to FIG. 20.

According to an embodiment, the demodulator 102000 acquires setting information about the BB frame and transfers the same together with the BB frame to the encoder 101000. The setting information about the BB frame may include BB frame size information. The setting information about the BB frame may be referred to as a sideband signal or signaling information. The process of the demodulator 102000 acquiring the BB frame size information will be described later with reference to FIG. 27.

The encoder 101000 receives data containing the BB frame and the setting information about the BB frame from the demodulator 102000, and encodes and outputs the received data.

According to an embodiment, the encoder 101000 receives a BB frame. The detailed operation of the encoder 101000 will be described later with reference to FIGS. 23 to 27. According to an embodiment, the encoder 101000 may include a Universal Serial Bus (USB) encoder.

In addition, the encoder 101000 transfers the encoded data to an application processor (AP) or processor 114000. The detailed operation of the processor 114000 will be described below.

According to an embodiment, the encoder 101000 serves a medium in the process of transferring the BB frame that the demodulator 102000 demodulates and outputs and the setting information (e.g., BB frame size information) acquired from the BB frame to the processor 114000. The encoder 101000 transfers the BB frame and the setting information about the BB frame to the processor 114000, and the processor 114000 transfers information necessary for encoding to the encoder 101000. Hereinafter, a structure for data communication between the encoder 101000 and the processor 114000 and the operation thereof will be described in detail.

Figure 23:
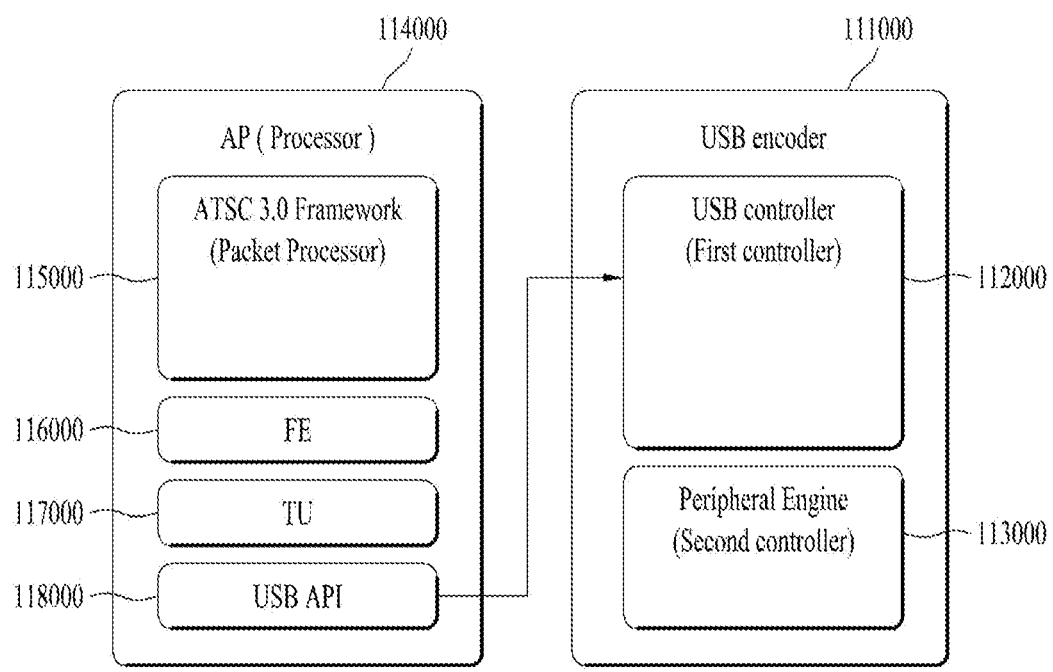
FIG. 23 shows an encoder and a processor of a vehicle reception apparatus according to an embodiment of the present disclosure.

FIG. 23 shows an encoder and a processor of a vehicle reception apparatus according to an embodiment of the present disclosure.

Referring to FIG. 23, a vehicle reception apparatus according to an embodiment of the present disclosure may include an encoder 111000 and a processor 114000.

The encoder 111000 may correspond to the encoder 101000 illustrated in FIG. 22.

The encoder 111000 may include a first controller (USB controller) 112000 and/or a second controller (peripheral engine) 113000.

According to an embodiment, the first controller 112000 may be referred to as a controller or a USB controller.

According to one embodiment, the second controller 113000 may be referred to as a peripheral engine.

Specifically, the second controller 113000 receives a BB frame from the demodulator 102000 and transfers the same to the first controller 112000 without data loss. The process of transferring the BB frame from the second controller 113000 to the first controller 112000 in the encoder 111000 will be described later with reference to FIG. 25.

The processor (application processor (AP)) 14000 may include an interface (Universal Serial Bus (USB) or Application Program Interface) 118000, a receiver (tuner) 117000, a front end 116000, and a packet processor (or framework) 115000.

The process of data flow between the encoder 111000 and the processor 114000 illustrated in FIG. 23 is configured as follows.

According to an embodiment, the encoder 111000 receives data from the demodulator 102000 and transfers the data to the processor 114000. Here, the data includes a BB frame (or a BB packet) containing broadcast service data and setting information about the BB frame. The encoder 11100 serves as a medium that allows the antenna to serially transfer the received broadcast signal to the processor 114000 in the vehicle without data loss.

Specifically, the second controller 113000 of the encoder 111000 receives data from the demodulator 102000. The second controller 113000 transfers the data to the first controller 112000. Here, the data includes a BB frame (or a BB packet) containing broadcast service data and setting information about the BB frame.

According to an embodiment, the encoder 111000 may include a buffer. The first controller 112000 of the encoder 111000 stores the BB frame of the received data in the buffer.

According to an embodiment, the buffer may have a variable size, and the first controller 112000 may control the variable size of the buffer. The encoder 111000 stores the BB frame received from the demodulator 102000 in the buffer until it transfers the frame to the processor 114000. When the buffer is filled with the BB frame by a size set by the first controller 112000, the encoder 111000 serially transfers the BB frame stored in the buffer to the processor 114000. The encoder 111000 may receive the setting information about the BB frame together with the BB frame from the demodulator 102000. The encoder 111000 may transfer the setting information about the BB frame to the processor 114000.

According to an embodiment, the first controller 112000 may further include a memory controller 123000 configured to control the size of the buffer. The detailed operation of the buffer will be described later with reference to FIG. 26. The detailed operation of the memory controller 12300 will be described later with reference to FIG. 24.

The interface 118000 receives the BB frame and the setting information about the BB frame from the encoder 111000.

The receiver 117000 receives the BB frame and the setting information about the BB frame from the interface 118000.

The front end 116000 receives the BB frame and the setting information about the BB frame from the receiver 117000.

According to an embodiment, the front end 116000 may acquire information necessary for encoding the BB frame of the encoder 111000 from the setting information about the BB frame. The front end 116000 transfers the acquired information to the encoder 111000. The process of transferring data and information between the processor 114000 and the encoder 111000 and the data control process of the encoder 111000 will be described below.

The packet processor (or framework) 115000 receives the BB frame from the front end 1116. The packet processor 115000 may output broadcast service data contained in the received BB frame, for example, video data or audio data, and transfer the same to the head unit 93000. According to an embodiment, the BB frame may include a TS (MPEG-2 Transport Stream) packet. The head unit 93000 may display the video data and the audio data.

According to an embodiment, the processor 114000 may be referred to as an application processor (AP). The packet processor 115000 may be referred to as an ATSC 3.0 framework. The front end 116000 may be referred to as FE. The receiver 117000 may be referred to as a tuner (TU). The encoder 111000 may be referred to as a USB (Universal Serial Bus) encoder. The first controller 112000 may be referred to as a USB controller. The second controller may be referred to as a peripheral engine.

Figure 24:
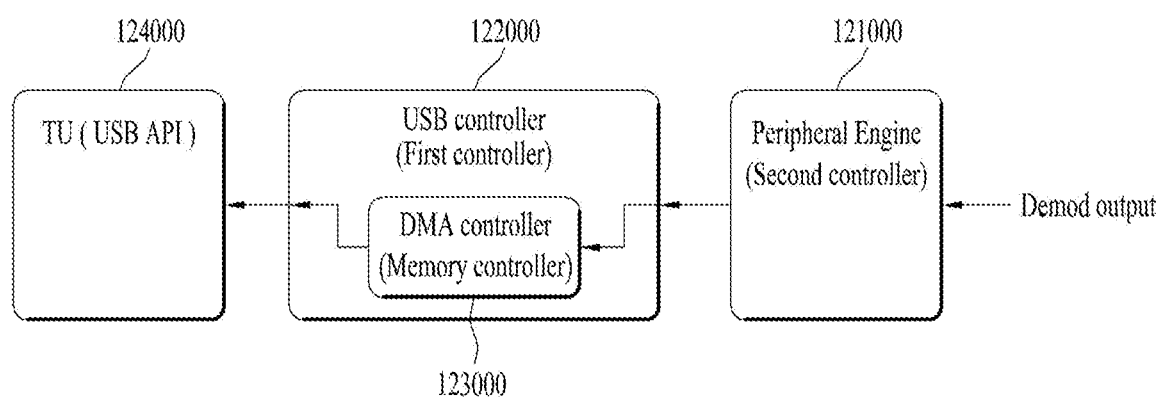
FIG. 24 illustrates a process of data processing between an encoder and a processor of a vehicle reception apparatus according to an embodiment of the present disclosure.

FIG. 24 illustrates a process of data processing between an encoder and a processor of a vehicle reception apparatus according to an embodiment of the present disclosure.

Referring to FIG. 24, the data processing process according to an embodiment of the present disclosure is performed through a second controller 121000, a first controller 122000, a memory controller 123000, and/or an interface 124000. Here, the interface 124000 corresponds to the interface 118000 included in the processor 114000 of FIG. 23 and is connected to the receiver 117000 of the processor 114000. In addition, the first controller 122000 and the second controller 121000 correspond to the first controller 112000 and the second controller 113000 included in the encoder 111000 of FIG. 23.

According to an embodiment, the interface 124000 may be referred to as a Universal Serial Bus Application Program Interface (USB API). The first controller 122000 may be referred to as a USB controller. The second controller 121000 may be referred to as a peripheral engine. The memory controller 123000 may be referred to as a DMA controller. Here, DMA stands for Direct Memory Access.

The second controller 121000 receives demodulated data from the demodulator 102000 shown in FIG. 22. The data received by the second controller 121000 is a BB frame (or BB packet).

The first controller 122000 receives the BB frame from the second controller 121000. The first controller 122000 receives a BB frame and stores the BB frame in the buffer in the encoder 111000. Here, the buffer enables data to be transferred between the encoder 111000 and the processor 114000 without data loss. The encoder 111000 should receive broadcast service data from the antenna and deliver the broadcast service data to the processor 114000, and the processor 114000 should receive the broadcast service data from the encoder 111000 and deliver the same to the head unit in the vehicle. The buffer storing the broadcast service data in the encoder 111000 price to match the data throughput of the broadcast service data received by the encoder with the data throughput of the broadcast service data output from the processor to the head unit, and prevents data transmission loss from occurring in the mutual data transmission process. In order to prevent such data transmission loss, the size of the buffer may be variably changed. The first controller 122000 may include a memory controller 123000 configured to control the size of the buffer. When the buffer is filled with a BB frame as much as the size of the buffer, the buffer transfers the BB frame stored in the buffer to the interface 124000.

The interface 124000 receives data containing a BB frame. Here, the received data is processed according to the data processing process of the interface 118000 in the processor 114000 described above with reference to FIG. 23.

Figure 25:
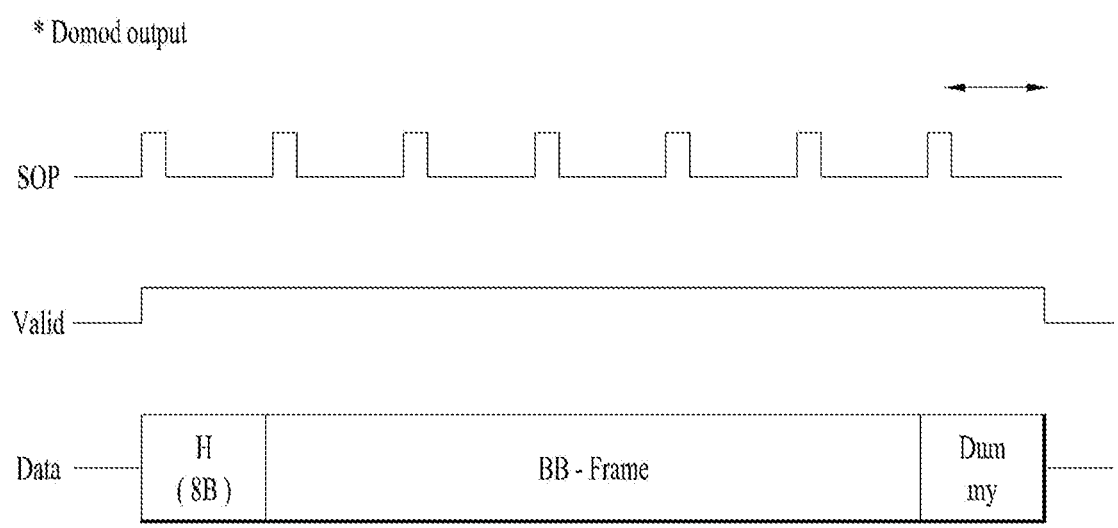
FIG. 25 illustrates a process in which the encoder of the vehicle reception apparatus receives data according to an embodiment of the present disclosure.

FIG. 25 illustrates a process in which the encoder of the vehicle reception apparatus receives data according to an embodiment of the present disclosure.

The data shown in FIG. 25 is a BB frame output from the demodulator 103000 and input to the encoder 111000.

According to an embodiment, the encoder 111000 of the vehicle reception apparatus may receive data from the demodulator 103000, and the data receiving process may be processed by the peripheral engine 121000 included in the encoder 11100. Here, the received data is a BB frame (or BB packet).

According to an embodiment, the encoder 111000 may transfer the received BB frame to the interface 124000.

FIG. 25 illustrates a process of receiving a BB frame from the demodulator 103000 and transferring the same to the interface 124000 through the second controller 121000 and the first controller 122000 in the encoder 111000.

Specifically, when a valid signal is activated (on) according to a Start of Packet (SOP) signal indicating the start point of a packet, the encoder 111000 transfers the BB frame to the interface 124000 according to the SOP signal and the valid signal. Here, the form of the data transferred to the interface 124000 is a BB frame further containing a header and dummy data.

According to an embodiment, an 8-byte header may be inserted before the BB frame. Here, the header contains information about the received BB frame. Specifically, the header may contain start information (start indicator) related to the BB frame. As illustrated in FIG. 25, the encoder 111000 may add a header to the front of the received BB frame and transfer the frame to the interface 124000.

According to an embodiment, the BB frame may include dummy data. Here, the dummy data may be set to an initial value having a certain size when a broadcast signal is received for the first time. As illustrated in FIG. 25, the encoder 111000 may add the dummy data to the back of the received BB frame and transfer the frame to the interface 124000.

Thereafter, while receiving a broadcast signal, the size of dummy data to be included in the BB frame may be determined in step 155000 of setting an optimum DMA buffer size, which will be described later with reference to FIG. 27. The encoder 111000 inserts the dummy data after the received BB frame according to the dummy data size set in the optimum DMA buffer size setting step 155000 and transfers the frame to the interface 124000.

Figure 26:
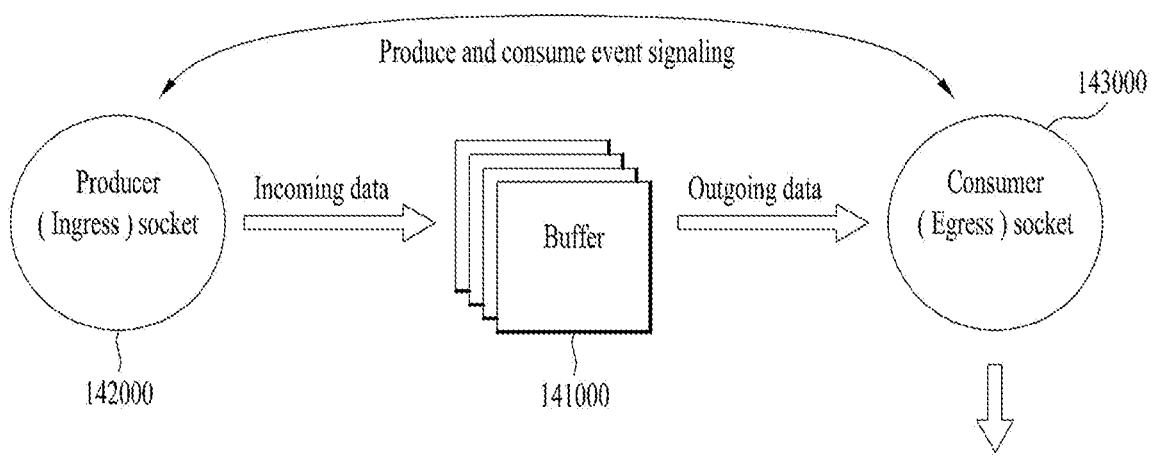
FIG. 26 illustrates a process in which the encoder of the vehicle reception apparatus controls data according to an embodiment of the present disclosure.

FIG. 26 illustrates a process in which the encoder of the vehicle reception apparatus controls data according to an embodiment of the present disclosure.

Referring to FIG. 26, the producer socket 142000 is a data output unit in the encoder 111000. The producer socket 142000 transfers a BB frame to a buffer 141000 in the encoder 111000. The buffer 141000 in the encoder 111000 stores data until data as large as the size of the buffer 141000 is received from the producer socket 142000. The consumer socket 143000 is an input unit of the interface 124000 configured to receive data from the encoder 111000. The buffer 141000 transfers a BB frame to the consumer socket 143000 when data as large as the size of the buffer is stored. The control process illustrated in FIG. 26 may be referred to as produce and consume event signaling between the encoder 111000 and the interface 124000 using the buffer 141000 as a medium.

According to one embodiment, the producer socket 142000 outputs data to the buffer 141000 to transfer the data from the encoder 111000 to the processor 114000. The producer socket 142000 represents a data output unit in the first controller 1222000 or the encoder 111000.

According to an embodiment, when the data stored in the buffer 141000 in the encoder 111000 is output, the consumer socket 143000 receives the data. The consumer socket 143000 represents a data receiver in the processor 114000 or the interface 124000. The data received by the consumer socket 143000 is processed in the processor 114000 according to the process described with reference to FIG. 23.

According to an embodiment, the buffer 141000 may have a certain size to prevent transmission loss in transferring data between the encoder 111000 and the processor 114000. Here, when all data as large as the certain size of the buffer is stored, the encoder 111000 transfers the data stored in the buffer to the processor 114000.

Figure 27:
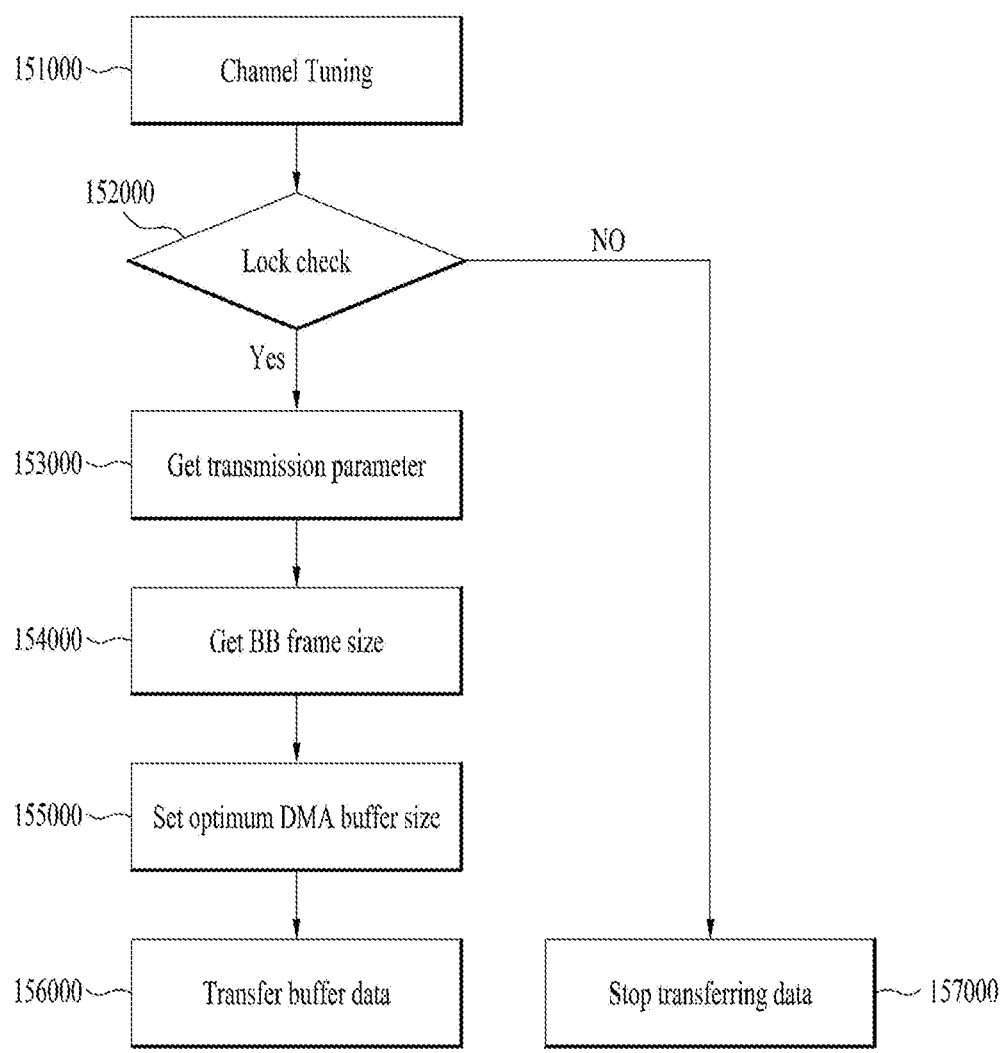
FIG. 27 shows a buffer control process according to an embodiment of the present disclosure.

FIG. 27 shows a buffer control process according to an embodiment of the present disclosure.

Referring to FIG. 27, a buffer control process according to an embodiment of the present disclosure may include a channel tuning step 151000, a lock check step 152000, a step 153000 of getting a transmission parameter, a step 154000 of getting a BB frame size, a step 155000 of setting an optimum DMA buffer size, and a step 156000 of transferring buffer data, and/or a step 157000 of stopping transferring the data.

According to an embodiment, the channel tuning step 151000 is performed in the receiver 103000 and the demodulator 102000. The lock check step 152000, the step 153000 of getting a transmission parameter, and the step 154000 of getting a BB frame size are performed by the demodulator 102000. The step 155000 of setting an optimum DMA buffer size and the step 156000 of transferring buffer data are performed by the interface 114000 or the front end 116000 in the interface 114000.

The channel tuning step 151000 is a step of performing channel tuning by the receiver 103000 of the vehicle reception apparatus according to an embodiment of the present disclosure to receive a broadcast signal. The receiver 103000 may receive a broadcast signal by setting a frequency and performing channel tuning according to conditions such as FFT (Fast Fourier Transform) and a guard interval (GI) of the broadcast signal.

According to an embodiment, the demodulator 102000 may be involved in the channel tuning step 151000. The demodulator 102000 may demodulate the data in the broadcast signal according to the transmission parameter in the broadcast signal and output data in the form of a BB frame.

The lock check step 152000 is a step in which the demodulator 102000 checks whether there is a broadcast signal received according to channel tuning. When there is no broadcast signal transferred to the vehicle reception apparatus, the step 157000 of stopping transferring data is performed after the lock check step 151000. When a broadcast signal is transferred to the vehicle reception apparatus, the demodulator 102000 performs the step 153000 of getting a transmission parameter.

The step 153000 of getting a transmission parameter is a step in which the demodulator 102000 acquires a transmission parameter from the broadcast signal. Here, the transmission parameter corresponds to a parameter related to a BB frame included in a preamble of a broadcast signal frame. Specifically, the transmission parameter includes the size of an FEC frame, a parity size of the LDPC (Low Density Parity Check) code, a parity size of the Ray-Chaudhuri and Hocquenghem (BCH) code, a code rate. The transmission parameter included in the signal frame for transferring broadcast service data are described above with reference to FIGS. 15 to 19.

The step 154000 of getting a BB frame size is a step in which the demodulator 102000 acquires a BB frame size from the transmission parameter. Here, the received broadcast signal contains an FEC frame, and the FEC frame includes an FEC frame payload, an LDPC code parity bit, and a BCH (Ray-Chaudhuri and Hocquenghem) code parity bit. According to an embodiment, the LDPC code may be called an inner code or the like, and the BCH code may be called an outer code or the like. According to an embodiment, applying the outer code to the FEC frame in a broadcast signal may be optional. In addition, the FEC frame payload represents a BB packet (or BB frame).

As described above with reference to FIG. 20, the size of the BB frame (or BB packet) included in the FEC frame means the size of a BB frame (or BB packet) excluding the LDPC parity bits and BCH parity bits from Nldpc bits, which are an FEC frame size (or length). A method of acquiring a BB frame size from the transmission parameter will be described later with reference to FIG. 28.

According to an embodiment, the demodulator 102000 transfers the acquired BB frame size together with the BB frame to the encoder 101000. The encoder 101000 transfers the received BB frame size and BB frame to the interface 114000.

The step 155000 of setting an optimum DMA buffer size is a step in which the interface 114000 sets an optimum size of the buffer 141000 in the encoder 101000 based on the BB frame size. In the step 155000 of setting an optimum DMA buffer size, the interface 114000 may calculate an optimum size of the buffer in the encoder 111000, and transfer the optimum buffer size to the encoder 111000.

According to an embodiment, the optimal size of the buffer 141000 is determined based on the BB frame size and a multiple of 188.

According to an embodiment, as described above with reference to FIG. 25, the BB frame may include a header and dummy data. When a broadcast signal is receive for the first time, the BB frame transferred to the interface 118000 may include dummy data as much as a predetermined initial value. Thereafter, while receiving a broadcast signal, the size of the dummy data to be included in the BB frame is determined and transferred to the encoder 111000 in the step 155000 of setting an optimum DMA buffer size. Thereafter, the encoder 111000 may pad the dummy data to the BB frame by the size thereof and transfer the frame to the interface 118000. According to an embodiment, the dummy data padded to the BB frame may be referred to as padding data.

According to an embodiment, the padding data and the optimum buffer size may be calculated as follows.

$$Padding = 188 - (bbFrameLength + 17)\%188;$$

$$AlignPacket = (bbFrameLength + 17 + padding) * alpha.$$

Specifically, the padding data Padding is calculated based on the BB frame size bbFrameLength. The padding data calculated based on the BB frame size is padded at the end of the BB frame in the form of dummy data.

According to an embodiment, the size of the padding data may be determined as a value obtained by subtracting, from 188 bytes, a result of modulo operation performed on the sum of the BB frame size (e.g., in bytes) and 17 bytes with 188 bytes, as in the equation above. Here, the data is indicated in bytes. However, according to an embodiment, the size of data may be indicated in bits.

In addition, the optimum buffer size AlignPacket is calculated based on the BB frame size, the padding data, and alpha. Here, the size of the buffer 141000 is determined according to the optimum buffer size AlignPacket.

According to an embodiment, the optimum buffer size AlignPacket may be determined by multiplying the value of alpha to the value by adding 17 bytes and the padding data size to the BB frame size, as in the equation above. Here, the data is indicated in bytes. However, according to an embodiment, the size of each data may be indicated in bits.

According to an embodiment, the value of alpha may be determined according to the performance of the vehicle reception apparatus according to an embodiment. According to an embodiment, the value of alpha is determined based on the bandwidth, latency, and the like of the interface 1118000. According to an embodiment, the value of alpha may be determined by measuring the performance of the interface 118000 in initializing the vehicle reception apparatus according to an embodiment of the present disclosure.

The performance of the buffer is determined according to the padding data, the optimum buffer size, and/or the value of alpha. Depending on the padding data, the optimum buffer size, and/or the value of alpha, the buffer may transfer data without loss between the encoder and the interface.

In the step 156000 of transferring buffer data, the optimum buffer size AlignPacket is transferred to the interface 1118000. The front end 16000 calculates the optimum buffer size AlignPacket, and transfers the optimum buffer size AlignPacket to the interface 1118000.

Thereafter, the interface 110000 receiving the optimum buffer size AlignPacket transfers the optimum buffer size AlignPacket to the first controller 112000 in the encoder 111000.

Thereafter, the first controller 112000 in the encoder 111000 receiving the optimum buffer size AlignPacket sets the size of the buffer 141000 in the encoder 111000 to the optimum buffer size AlignPacket.

In step 157000 of stopping transferring data, when there is no broadcast signal received in the lock check step 152000, the data transferring is terminated.

FIG. 28 illustrates a process of acquiring a BB frame size according to an embodiment of the present disclosure.

FIG. 28 illustrates a process of acquiring a BB frame size from an FEC frame in a broadcast signal.

Referring to FIG. 28, the length of an LDPC codeword may be 16K (16200 bits) or 64K (64800 bits). Here, the code rate of the LDPC may be represented by B and C. B is a numerator of the code rate, and C is a denominator of the code rate. D denotes an outer code parity (or BCH parity) size.

According to an embodiment, the BB frame size may be calculated based on the LDPC codeword, the code rate, the outer code parity. Here, dividing by 8 means that the BB frame size is expressed in bytes. According to an embodiment, the BB frame size may be expressed in bytes or bits.

According to an embodiment, the BB frame size illustrated in FIG. 28 may be acquired in step 154000 of getting a BB frame size in FIG. 28.

It is understood by those skilled in the art that various changes and modifications are possible in the present disclosure without departing from the spirit or scope of the present disclosure. Accordingly, the present disclosure is intended to cover changes and modifications of the disclosure provided within the scope of the appended claims and their equivalents.

In this specification, both an apparatus invention and a method invention are mentioned, and the descriptions of both the apparatus and method inventions may be applied to complement each other.

The examples of the present disclosure may be embodied as computer readable code on a medium on which a program is recorded. The computer readable medium includes all kinds of recording devices capable of storing data readable by a computer system is stored. Examples of computer-readable media include hard disk drives (HDDs), solid state disks (SSDs), silicon disk drives (SDDs), ROMs, RAMs, CD-ROMs, magnetic tapes, floppy disks, and optical data storage devices, and also include those implemented in the form of carrier waves (e.g., transmission over the Internet). The computer may include a processor or a controller. Accordingly, the above detailed description should not be construed as limiting in all respects, but should be considered illustrative. The scope of the present disclosure should be determined by rational interpretation of the appended claims, and all changes within the equivalent scope of the present disclosure are included in the scope of the present disclosure.

Various embodiments have been described in the best mode.

INDUSTRIAL APPLICABILITY

The present disclosure is applicable in a field related to a vehicle reception apparatus and method for receiving a broadcast signal.

It is apparent to those skilled in the art that various changes and modifications are possible in the present disclosure without departing from the spirit or scope of the present disclosure.

Accordingly, the present disclosure is intended to cover changes and modifications of the disclosure provided within the scope of the appended claims and their equivalents.

What is claimed is:

1. A reception apparatus for a vehicle comprising:
   a receiver configured to receive a broadcast signal;
   a demodulator configured to extract a baseband (BB) frame containing service data and a BB frame size based on the received broadcast signal;
   an encoder configured to receive, from the demodulator, the extracted BB frame and the extracted BB frame size, and store the received BB frame in a buffer; and
   an interface configured to receive, from the encoder, the stored BB frame and the BB frame size,
   wherein the interface is configured to:
      extract a padding data size for the BB frame from the BB frame size, and
      transmit the extracted padding data size to the encoder,
      wherein the padding data size is obtained by subtracting, from a predetermined size value, a value generated based on the BB frame size.

2. The apparatus of claim 1, wherein a size of the buffer is variable, and
   wherein the encoder pads a header and padding data to the extracted BB frame.

3. The apparatus of claim 1, wherein the demodulator is configured to:
   acquire a transmission parameter from the received broadcast signal; and
   acquire the BB frame size from the transmission parameter.

4. The apparatus of claim 3, wherein the transmission parameter comprises a size of a Forward Error Correction (FEC) frame, a parity bit size, and a code rate of the FEC frame.

5. The apparatus of claim 1, wherein the value generated based on the BB frame size is obtained by performing modulo operation on a sum of the BB frame size and a size value based on the predetermined size value.

6. The apparatus of claim 5, wherein the encoder is configured to determine a size of the buffer by multiplying a value obtained by adding the size value and the padding data size to the BB frame size by a value of alpha.

7. The apparatus of claim 6, wherein the value of alpha is based on a bandwidth and latency of the interface.

8. A method for receiving a broadcast signal in a vehicle, the method comprising:
   receiving a broadcast signal by a receiver;
   extracting, by a demodulator, a baseband (BB) frame containing service data and a BB frame size based on the received broadcast signal;

encoding, by an encoder, the BB frame and the BB frame size, wherein the encoding comprises storing the BB frame in a buffer; and receiving, by an interface, the stored BB frame and the BB frame size from the encoder; and processing, by the interface, the received BB frame, wherein processing the received BB frame comprises:
- extracting a padding data size of the BB frame based on the BB frame size, and
- transmitting the extracted padding data size to the encoder,
- wherein the padding data size is obtained by subtracting, from a predetermined size value, a value generated based on the BB frame size.

9. The method of claim 8, wherein a size of the buffer is variable, and
wherein the encoding comprises padding a header and padding data to the BB frame.

10. The method of claim 8, wherein the extraction by the demodulator comprises:
- acquiring a transmission parameter from the received broadcast signal; and
- acquiring the BB frame size from the transmission parameter.

11. The method of claim 10, wherein the transmission parameter comprises a size of a Forward Error Correction (FEC) frame, and a parity bit size, and a code rate of the FEC frame.

12. The method of claim 8, wherein the value generate based on the BB frame size is obtained by performing modulo operation on a sum of the BB frame size and a size value based on the predetermined size value.

13. The method of claim 12, further comprising determining, by the encoder, a size of the buffer by multiplying a value obtained by adding the size value and the padding data size to the BB frame size by a value of alpha.

14. The method of claim 13, wherein the value of alpha is based on a bandwidth and latency of the interface.

15. The apparatus of claim 5, wherein the predetermined size value is 188 bytes.

16. The apparatus of claim 6, wherein the size value is 17 bytes.

17. The method of claim 12, wherein the predetermined size value is 188 bytes.

18. The method of claim 13, wherein the size value is 17 bytes.

* * * * *